US012075427B2

(12) United States Patent
Takeda et al.

(10) Patent No.: US 12,075,427 B2
(45) Date of Patent: Aug. 27, 2024

(54) TECHNIQUES FOR RELEASING MULTIPLE SETS OF SEMI-PERSISTENT SCHEDULING AND CONFIGURED GRANT RESOURCES

(71) Applicant: QUALCOMM Incorporated, San Diego, CA (US)

(72) Inventors: Kazuki Takeda, Tokyo (JP); Alberto Rico Alvarino, San Diego, CA (US); Peter Gaal, San Diego, CA (US); Wanshi Chen, San Diego, CA (US); Xiaoxia Zhang, San Diego, CA (US); Tao Luo, San Diego, CA (US); Mostafa Khoshnevisan, San Diego, CA (US); Huilin Xu, Temecula, CA (US)

(73) Assignee: QUALCOMM Incorporated, San Diego, CA (US)

( * ) Notice: Subject to any disclaimer, the term of this patent is extended or adjusted under 35 U.S.C. 154(b) by 174 days.

(21) Appl. No.: 17/377,173

(22) Filed: Jul. 15, 2021

(65) Prior Publication Data
US 2022/0039070 A1 Feb. 3, 2022

Related U.S. Application Data

(60) Provisional application No. 63/058,370, filed on Jul. 29, 2020.

(51) Int. Cl.
*H04W 72/04* (2023.01)
*H04W 72/23* (2023.01)
*H04W 72/044* (2023.01)

(52) U.S. Cl.
CPC .......... *H04W 72/23* (2023.01); *H04W 72/044* (2013.01)

(58) Field of Classification Search
CPC ............... H04W 72/23; H04W 72/044; H04W 72/0453; H04L 5/0055; H04L 5/0053; H04L 5/0094; H04L 5/001; H04L 5/0007
See application file for complete search history.

(56) References Cited

U.S. PATENT DOCUMENTS

| 2010/0232373 | A1* | 9/2010 | Nory ..................... | H04W 72/23 |
| | | | | 370/329 |
| 2011/0081932 | A1* | 4/2011 | Astely ................... | H04W 28/26 |
| | | | | 455/509 |

(Continued)

OTHER PUBLICATIONS

Huawei, et al., "PDCCH Enhancement in Rel-11 Carrier Aggregation", 3GPP Draft, 3GPP TSG RAN WG1 Meeting #66 ,R1-112461, 3rd Generation Partnership Project (3GPP), Mobile Competence Centre, 650, Route Des Lucioles, F-06921, Sophia-Antipolis Cedex, France, vol. RAN WG1, No. Athens, Greece, Aug. 22-26, 2011, Aug. 16, 2011 (Aug. 16, 2011), XP050537553, 2 pages, [retrieved on Aug. 16, 2011] section 2.1, p. 1-p. 2.

(Continued)

*Primary Examiner* — Jamal Javaid
(74) *Attorney, Agent, or Firm* — Holland & Hart LLP

(57) ABSTRACT

Methods, systems, and devices for wireless communications are described. A user equipment (UE) may identify a configuration for communications with a base station on a set of component carriers, the configuration including at least a first set of resources on a first component carrier and a second set of resources on a second component carrier. The UE may receive, from the base station, a downlink control information (DCI) message on the first component carrier, the DCI message including one or more field values indicating that the UE is to release the first set of resources on the first component carrier and the second set of resources on the second component carrier. The UE may determine, based on the received DCI message, that the first set of resources and the second set of resources are released.

26 Claims, 16 Drawing Sheets

(56) References Cited

U.S. PATENT DOCUMENTS

2016/0227523 A1    8/2016  Desai et al.
2017/0223671 A1    8/2017  He et al.
2020/0163061 A1    5/2020  Tang
2022/0264608 A1*  8/2022  Bae ..................... H04L 1/0072

OTHER PUBLICATIONS

International Search Report and Written Opinion—PCT/US2021/042083—ISA/EPO—Nov. 15, 2021.

\* cited by examiner

TECHNIQUES FOR RELEASING MULTIPLE SETS OF SEMI-PERSISTENT SCHEDULING AND CONFIGURED GRANT RESOURCES

CROSS REFERENCE

The present application for patent claims the benefit of U.S. Provisional Patent Application No. 63/058,370 by Takeda et al., entitled "TECHNIQUES FOR RELEASING MULTIPLE SETS OF SEMI-PERSISTENT SCHEDULING AND CONFIGURED GRANT RESOURCES," filed Jul. 29, 2020, assigned to the assignee hereof, and expressly incorporated by reference herein.

FIELD OF TECHNOLOGY

The present disclosure relates to wireless communications, including techniques for releasing multiple sets of semi-persistent scheduling and configured grant resources.

BACKGROUND

Wireless communications systems are widely deployed to provide various types of communication content such as voice, video, packet data, messaging, broadcast, and so on. These systems may be capable of supporting communication with multiple users by sharing the available system resources (e.g., time, frequency, and power). Examples of such multiple-access systems include fourth generation (4G) systems such as Long Term Evolution (LTE) systems, LTE-Advanced (LTE-A) systems, or LTE-A Pro systems, and fifth generation (5G) systems which may be referred to as New Radio (NR) systems. These systems may employ technologies such as code division multiple access (CDMA), time division multiple access (TDMA), frequency division multiple access (FDMA), orthogonal frequency division multiple access (OFDMA), or discrete Fourier transform spread orthogonal frequency division multiplexing (DFT-S-OFDM). A wireless multiple-access communications system may include one or more base stations or one or more network access nodes, each simultaneously supporting communication for multiple communication devices, which may be otherwise known as user equipment (UE).

In some wireless communications systems, sets of communication resources (e.g., semi-persistent scheduling (SPS) grants for downlink resources, configured grants (CGs) for uplink resources) may be scheduled via downlink control information (DCI). In some cases, the network may require resources associated with an SPS grant and/or CG after the sets of resources have been indicated to the UE. In such cases, the base station may release (e.g., revoke or otherwise indicate as unavailable) sets of resources associated with a given SPS grant and/or CG via DCI signaling. However, limitations in the ability of DCI messages to release multiple sets of resources across multiple component carriers may lead to increased control signaling overhead within the wireless communications system.

SUMMARY

The described techniques relate to improved methods, systems, devices, and apparatuses that support techniques for releasing multiple sets of semi-persistent scheduling (SPS) and configured grant (CG) resources. Generally, the described techniques provide for releasing multiple sets of communication resources (e.g., SPS grants for downlink, CGs for uplink) via a single downlink control information (DCI) message. In some aspects, a single DCI message may be used to release multiple sets of resources across multiple component carriers. In some aspects, a UE may be configured (e.g., via radio resource control (RRC) signaling) with multiple configurations (e.g., tables, indices) that associate or otherwise map an indication of the DCI message with component carrier/resource pairs. That is, different values for the indication in the DCI message may indicate multiple different resources, each resource associated with one of the component carriers. In one example, the UE may identify multiple sets of resources across multiple component carriers which are to be released based on the configurations and indications in the DCI message, including hybrid automatic repeat request (HARQ) process number (HPN) field values, carrier indicator field (CIF) values, and the like. Upon receiving the indication(s), the UE may refer to the respective configuration, and then release the SPS and/or CG resources, across the multiple component carriers, that correspond to the received indication(s).

A method of wireless communication at a UE is described. The method may include identifying a communications configuration for a set of component carriers, the communications configuration including at least a first set of resources on a first component carrier of the set of component carriers and a second set of resources on a second component carrier of the set of component carriers, receiving, from a base station, a DCI message on the first component carrier, the DCI message including one or more field values indicating that the UE is to release a plurality of sets of resources on multiple component carriers, including at least the first set of resources on the first component carrier and the second set of resources on the second component carrier, and determining, based on the received DCI message, that the first set of resources and the second set of resources are released.

An apparatus for wireless communication at a UE is described. The apparatus may include a processor, memory coupled with the processor, and instructions stored in the memory. The instructions may be executable by the processor to cause the apparatus to identify a communications configuration for a set of component carriers, the communications configuration including at least a first set of resources on a first component carrier of the set of component carriers and a second set of resources on a second component carrier of the set of component carriers, receive, from a base station, a DCI message on the first component carrier, the DCI message including one or more field values indicating that the UE is to release a plurality of sets of resources on multiple component carriers, including at least the first set of resources on the first component carrier and the second set of resources on the second component carrier, and determine, based on the received DCI message, that the first set of resources and the second set of resources are released.

Another apparatus for wireless communication at a UE is described. The apparatus may include means for identifying a communications configuration for a set of component carriers, the communications configuration including at least a first set of resources on a first component carrier of the set of component carriers and a second set of resources on a second component carrier of the set of component carriers, receiving, from a base station, a DCI message on the first component carrier, the DCI message including one or more field values indicating that the UE is to release a plurality of sets of resources on multiple component carriers, including at least the first set of resources on the first component carrier and the second set of resources on the second component carrier, and determining, based on the received DCI message, that the first set of resources and the second set of resources are released.

A non-transitory computer-readable medium storing code for wireless communication at a UE is described. The code may include instructions executable by a processor to identify a communications configuration for a set of component carriers, the communications configuration including at least a first set of resources on a first component carrier of the set of component carriers and a second set of resources on a second component carrier of the set of component carriers, receive, from a base station, a DCI message on the first component carrier, the DCI message including one or more field values indicating that the UE is to release a plurality of sets of resources on multiple component carriers, including at least the first set of resources on the first component carrier and the second set of resources on the second component carrier, and determine, based on the received DCI message, that the first set of resources and the second set of resources are released.

Some examples of the method, apparatuses, and non-transitory computer-readable medium described herein may further include operations, features, means, or instructions for receiving, from the base station, a release configuration indicating sets of mapping pairs, each mapping pair identifying a component carrier of the set of component carriers and a resource for communications between the UE and the base station, where determining that the first set of resources and the second set of resources may be released may be based on the DCI message and the release configuration.

Some examples of the method, apparatuses, and non-transitory computer-readable medium described herein may further include operations, features, means, or instructions for identifying a first configuration including associations between a set of field values for DCI messages and a set of mapping pairs, each mapping pair of the set of mapping pairs identifying a component carrier of the set of component carriers and a resource for communications between the UE and the base station, where determining that the first set of resources and the second set of resources may be released may be based on the first configuration and the one or more field values of the received DCI message.

In some examples of the method, apparatuses, and non-transitory computer-readable medium described herein, the one or more field values include an HPN field value.

Some examples of the method, apparatuses, and non-transitory computer-readable medium described herein may further include operations, features, means, or instructions for identifying a first configuration for the first component carrier and a second configuration for the second component carrier, and selecting the first configuration based on the DCI message having been received on the first component carrier, where determining that the first set of resources and the second set of resources may be released may be based on the selected first configuration and the indication of the received DCI message.

Some examples of the method, apparatuses, and non-transitory computer-readable medium described herein may further include operations, features, means, or instructions for receiving a component carrier field value in the DCI message, the one or more field values including the component carrier field value, identifying a first configuration for the first component carrier and a second configuration for the second component carrier, and selecting the first configuration based on the component carrier field value, where determining that the first set of resources may be released may be based on the selected first configuration and the one or more field values.

In some examples of the method, apparatuses, and non-transitory computer-readable medium described herein, the component carrier field value includes a CIF value.

Some examples of the method, apparatuses, and non-transitory computer-readable medium described herein may further include operations, features, means, or instructions for receiving a component carrier field value in the DCI message, where determining that the first set of resources and the second set of resources may be released may be based on the component carrier field value and a second field value, the one or more field values including the component carrier field value and the second field value.

In some examples of the method, apparatuses, and non-transitory computer-readable medium described herein, determining that the first set of resources and the second set of resources may be released based on the component carrier field value and the second field value may include operations, features, means, or instructions for identifying the first component carrier and the second component carrier based on the component carrier field value, and identifying the first set of resources and the second set of resources based on the second field value.

In some examples of the method, apparatuses, and non-transitory computer-readable medium described herein, determining that the first set of resources and the second set of resources may be released based on the component carrier field value and the second field value may include operations, features, means, or instructions for identifying the first set of resources on the first component carrier and the second set of resources on the second component carrier based on a combination of the component carrier field value and the second field value.

In some examples of the method, apparatuses, and non-transitory computer-readable medium described herein, a format of the DCI message may be associated with cross-carrier scheduling.

Some examples of the method, apparatuses, and non-transitory computer-readable medium described herein may further include operations, features, means, or instructions for determining that the first set of resources and the second set of resources may be released based on a bit value of a redundancy version (RV) field of the DCI message, a modulation and coding scheme (MCS) field of the DCI message, a frequency domain resource assignment (FDRA) field of the DCI message, or any combination thereof.

Some examples of the method, apparatuses, and non-transitory computer-readable medium described herein may further include operations, features, means, or instructions for determining that a first FDRA field associated with the first component carrier, a second FDRA field associated with the second component carrier, or both, include a second type of frequency resource assignment field, and determining that the first set of resources and the second set of resources may be released based on a value of the first FDRA field, a value of the second FDRA field, or both, including a first value.

Some examples of the method, apparatuses, and non-transitory computer-readable medium described herein may further include operations, features, means, or instructions for determining that both the first FDRA field and the second FDRA field include the second type of frequency resource assignment field, and determining that the first set of resources and the second set of resources may be released based on the value of the first FDRA field and the value of the second FDRA field including the first value.

Some examples of the method, apparatuses, and non-transitory computer-readable medium described herein may further include operations, features, means, or instructions for determining that the DCI message may be configured to release one or more sets of resources based on a new data indicator (NDI) field of the DCI message, at least a portion of the DCI message being scrambled according to a coding scheme radio network temporary identifier (CS-RNTI), or both, where determining that the first set of resources and the second set of resources may be released may be based on determining that the DCI message may be configured to release one or more sets of resources.

Some examples of the method, apparatuses, and non-transitory computer-readable medium described herein may further include operations, features, means, or instructions for transmitting, to the base station, a UE capability message indicating that the UE may be configured to release two or more sets of resources via a single downlink control message, where receiving the DCI message may be based on transmitting the UE capability message.

In some examples of the method, apparatuses, and non-transitory computer-readable medium described herein, the first set of resources and the second set of resources include a set of downlink resources associated with an SPS grant, a set of uplink resources associated with a CG, or a combination thereof.

Some examples of the method, apparatuses, and non-transitory computer-readable medium described herein may further include operations, features, means, or instructions for determining a time period within which the first set of resources, the second set of resources, or both, may be not released based on a subcarrier spacing associated with the first set of resources, a subcarrier spacing associated with the second set of resources, a subcarrier spacing of the first component carrier, a subcarrier spacing of the second component carrier, or any combination thereof, where determining that the first set of resources and the second set of resources may be released may be based on receiving the DCI message outside of the time period.

In some examples of the method, apparatuses, and non-transitory computer-readable medium described herein, the time period includes a quantity of symbols preceding the first set of resources, the second set of resources, or both.

A method of wireless communication at a base station is described. The method may include identifying a communications configuration for a set of component carriers, the communications configuration including at least a first set of resources on a first component carrier of the set of component carriers and a second set of resources on a second component carrier of the set of component carriers, determining to release a plurality of sets of resources on multiple component carriers, including at least the first set of resources and the second set of resources, and transmitting, to a UE, a DCI message on the first component carrier, the DCI message including one or more field values indicating that the UE is to release the first set of resources on the first component carrier and the second set of resources on the second component carrier.

An apparatus for wireless communication at a base station is described. The apparatus may include a processor, memory coupled with the processor, and instructions stored in the memory. The instructions may be executable by the processor to cause the apparatus to identify a communications configuration for a set of component carriers, the communications configuration including at least a first set of resources on a first component carrier of the set of component carriers and a second set of resources on a second component carrier of the set of component carriers, determine to release a plurality of sets of resources on multiple component carriers, including at least the first set of resources and the second set of resources, and transmit, to a UE, a DCI message on the first component carrier, the DCI message including one or more field values indicating that the UE is to release the first set of resources on the first component carrier and the second set of resources on the second component carrier.

Another apparatus for wireless communication at a base station is described. The apparatus may include means for identifying a communications configuration for a set of component carriers, the communications configuration including at least a first set of resources on a first component carrier of the set of component carriers and a second set of resources on a second component carrier of the set of component carriers, determining to release a plurality of sets of resources on multiple component carriers, including at least the first set of resources and the second set of resources, and transmitting, to a UE, a DCI message on the first component carrier, the DCI message including one or more field values indicating that the UE is to release the first set of resources on the first component carrier and the second set of resources on the second component carrier.

A non-transitory computer-readable medium storing code for wireless communication at a base station is described. The code may include instructions executable by a processor to identify a communications configuration for a set of component carriers, the communications configuration including at least a first set of resources on a first component carrier of the set of component carriers and a second set of resources on a second component carrier of the set of component carriers, determine to release a plurality of sets of resources on multiple component carriers, including at least the first set of resources and the second set of resources, and transmit, to a UE, a DCI message on the first component carrier, the DCI message including one or more field values indicating that the UE is to release the first set of resources on the first component carrier and the second set of resources on the second component carrier.

Some examples of the method, apparatuses, and non-transitory computer-readable medium described herein may further include operations, features, means, or instructions for transmitting, to the UE, a release configuration indicating sets of mapping pairs, each mapping pair identifying a component carrier of the set of component carriers and a resource for communications between the UE and the base station, where the DCI message may be transmitted based on the release configuration.

Some examples of the method, apparatuses, and non-transitory computer-readable medium described herein may further include operations, features, means, or instructions for identifying a first configuration including associations between a set of field values for DCI messages and a set of mapping pairs, each mapping pair of the set of mapping pairs identifying a component carrier of the set of component carriers and a resource for communications between the UE and the base station, where the DCI message may be transmitted based on the first configuration and the one or more field values.

In some examples of the method, apparatuses, and non-transitory computer-readable medium described herein, the one or more field values include an HPN field value.

Some examples of the method, apparatuses, and non-transitory computer-readable medium described herein may further include operations, features, means, or instructions for identifying a first configuration for the first component carrier and a second configuration for the second component carrier, and selecting the first configuration based on the DCI message to be transmitted on the first component carrier, where the DCI message may be transmitted based on the selected first configuration.

Some examples of the method, apparatuses, and non-transitory computer-readable medium described herein may further include operations, features, means, or instructions for transmitting a component carrier field value in the DCI message, the one or more field values including the component carrier field value, identifying a first configuration for the first component carrier and a second configuration for the second component carrier, and selecting the first configuration based on the component carrier field value, where the DCI message may be transmitted based on the selected first configuration and the one or more field values.

In some examples of the method, apparatuses, and non-transitory computer-readable medium described herein, the component carrier field value includes a CIF value.

Some examples of the method, apparatuses, and non-transitory computer-readable medium described herein may further include operations, features, means, or instructions for transmitting a component carrier field value in the DCI message, where the DCI message may be transmitted based on the component carrier field value and a second field value, the one or more field values including the component carrier field value and the second field value.

In some examples of the method, apparatuses, and non-transitory computer-readable medium described herein, the component carrier field value identifies the first component carrier and the second component carrier, and the second field value identifies the first set of resources and the second set of resources.

In some examples of the method, apparatuses, and non-transitory computer-readable medium described herein, a combination of the component carrier field value and the second field value identifies the first set of resources on the first component carrier and the second set of resources on the second component carrier.

In some examples of the method, apparatuses, and non-transitory computer-readable medium described herein, a format of the DCI message may be associated with cross-carrier scheduling.

Some examples of the method, apparatuses, and non-transitory computer-readable medium described herein may further include operations, features, means, or instructions for receiving a UE capability message indicating that the UE may be configured to release two or more sets of resources via a single downlink control message, where transmitting the DCI message may be based on the received UE capability message.

In some examples of the method, apparatuses, and non-transitory computer-readable medium described herein, the first set of resources and the second set of resources include a set of downlink resources associated with an SPS grant, a set of uplink resources associated with a CG, or a combination thereof.

Some examples of the method, apparatuses, and non-transitory computer-readable medium described herein may further include operations, features, means, or instructions for determining a time period within which the first set of resources, the second set of resources, or both, may not be released based on a subcarrier spacing associated with the first set of resources, a subcarrier spacing associated with the second set of resources, a subcarrier spacing of the first component carrier, a subcarrier spacing of the second component carrier, or any combination thereof, where the DCI message may be transmitted within the time period.

In some examples of the method, apparatuses, and non-transitory computer-readable medium described herein, the time period includes a quantity of symbols preceding the first set of resources, the second set of resources, or both.

DETAILED DESCRIPTION

Figure 1:
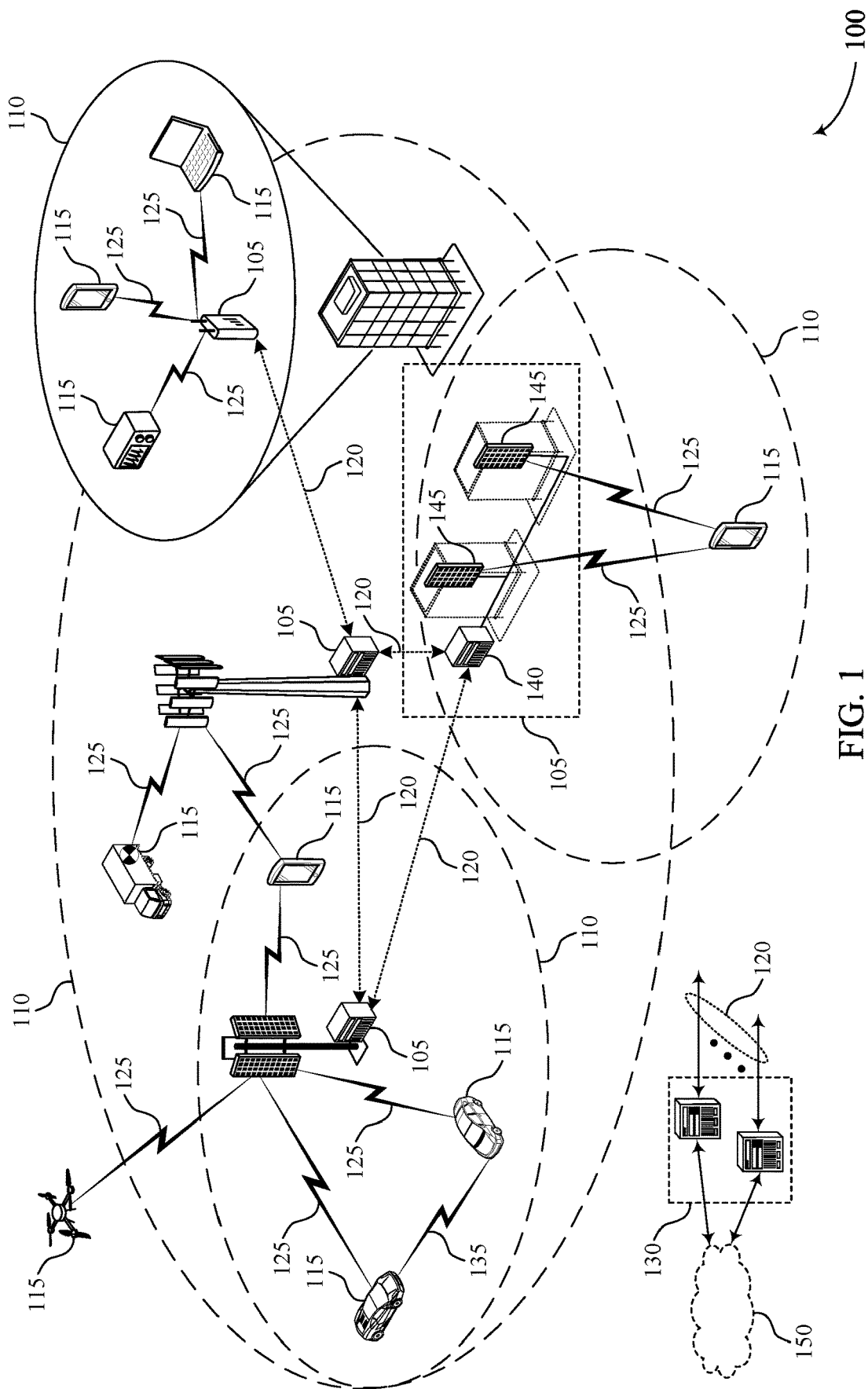
FIG. 1 illustrates an example of a wireless communications system that supports techniques for releasing multiple sets of semi-persistent scheduling and configured grant resources in accordance with aspects of the present disclosure.

In some wireless communications systems, sets of communication resources may be scheduled via downlink control information (DCI). For example, DCI messages may be used to signal semi-persistent scheduling (SPS) grants that schedule resources for downlink transmissions from the base station to the UE. DCI messages may also be used to signal configured grants (CGs) that schedule resources for uplink transmissions from the UE to the base station. Additionally, a UE may be configured to communicate on multiple component carriers, and multiple SPS and/or CG resources may be scheduled across these multiple component carriers. In some cases, the network may require resources associated with a SPS grant and/or CG after the sets of resources have been indicated to the UE. In such cases, the base station may release (e.g., revoke or otherwise indicate as unavailable) sets of resources associated with a given SPS grant and/or CG via DCI signaling. According to techniques of some wireless communications systems, DCI messages may be unable to release sets of resources across multiple component carriers. These limitations associated with releasing sets of resources may lead to increased control signaling overhead within the wireless communications system.

To address issues associated with releasing sets of resources at a UE and to decrease control signaling overhead associated with releasing resources, techniques for releasing multiple SPS and/or CG resources via a single DCI message are disclosed. In some aspects, a single DCI message may be used to release multiple sets of resources across multiple component carriers. In some aspects, a UE may be configured (e.g., via RRC signaling) with multiple configurations (e.g., tables, indices, storage objects) that associate an indication of the DCI message with component carrier/resource pairs. That is, different values for the indication in the DCI message may indicate multiple different resources, each resource associated with one of the component carriers. In cases where a configuration includes a table, each row of the table may indicate one or more component carrier/resource pairs. In one example, different hybrid automatic repeat request (HARQ) process number (HPN) field values (which may correspond to the respective rows of the table) may each be associated with one or more component carrier/resource pairs (e.g., HPN field value 1={CC1, SPS/CG index}, {CC2, SPS/CG index}). Upon receiving the indication in the DCI, the UE may refer to the configured table, and then release the SPS and/or CG resources, across the multiple component carriers, that correspond to the received indication.

In some aspects, the UE may be configured with a single configuration (e.g., single table), or multiple configurations (e.g., multiple tables), including resource/component carrier pairs. In cases where the UE is configured with multiple configurations, the UE may determine which configuration is to be used based on the component carrier on which the DCI message was received. Alternatively, a carrier indicator field (CIF) value in the DCI message may indicate which configuration is to be used. In these proposals, the UE may determine two or more sets of resources (e.g., SPS, CG, or both) which are to be released based on the field value indicated in the DCI message, and the corresponding sets of resources associated with the HPN field value indicated in the pertinent configuration.

In some cases, the UE may validate (e.g., confirm) that the DCI message is configured to release resources based on redundancy version (RV) values of the DCI message, modulation and coding scheme (MCS) values of the DCI message, frequency domain resource assignment (FDRA) field values of the DCI message, or any combination thereof. By enabling a single DCI message to release multiple sets of resources within and/or across multiple component carriers, control signaling within a wireless communications system may be reduced.

Aspects of the disclosure are initially described in the context of wireless communications systems. Aspects of the disclosure are additionally described in the context of example resource configurations and an example process flow. Aspects of the disclosure are further illustrated by and described with reference to apparatus diagrams, system diagrams, and flowcharts that relate to techniques for releasing multiple sets of SPS and CG resources.

FIG. 1 illustrates an example of a wireless communications system 100 that supports techniques for releasing multiple sets of SPS and CG resources in accordance with aspects of the present disclosure. The wireless communications system 100 may include one or more base stations 105, one or more UEs 115, and a core network 130. In some examples, the wireless communications system 100 may be a Long Term Evolution (LTE) network, an LTE-Advanced (LTE-A) network, an LTE-A Pro network, or a New Radio (NR) network. In some examples, the wireless communications system 100 may support enhanced broadband communications, ultra-reliable (e.g., mission critical) communications, low latency communications, communications with low-cost and low-complexity devices, or any combination thereof.

The base stations 105 may be dispersed throughout a geographic area to form the wireless communications system 100 and may be devices in different forms or having different capabilities. The base stations 105 and the UEs 115 may wirelessly communicate via one or more communication links 125. Each base station 105 may provide a coverage area 110 over which the UEs 115 and the base station 105 may establish one or more communication links 125. The coverage area 110 may be an example of a geographic area over which a base station 105 and a UE 115 may support the communication of signals according to one or more radio access technologies.

The UEs 115 may be dispersed throughout a coverage area 110 of the wireless communications system 100, and each UE 115 may be stationary, or mobile, or both at different times. The UEs 115 may be devices in different forms or having different capabilities. Some example UEs 115 are illustrated in FIG. 1. The UEs 115 described herein may be able to communicate with various types of devices, such as other UEs 115, the base stations 105, or network equipment (e.g., core network nodes, relay devices, integrated access and backhaul (IAB) nodes, or other network equipment), as shown in FIG. 1.

The base stations 105 may communicate with the core network 130, or with one another, or both. For example, the base stations 105 may interface with the core network 130 through one or more backhaul links 120 (e.g., via an S1, N2, N3, or other interface). The base stations 105 may communicate with one another over the backhaul links 120 (e.g., via an X2, Xn, or other interface) either directly (e.g., directly between base stations 105), or indirectly (e.g., via core network 130), or both. In some examples, the backhaul links 120 may be or include one or more wireless links.

One or more of the base stations 105 described herein may include or may be referred to by a person having ordinary skill in the art as a base transceiver station, a radio base station, an access point, a radio transceiver, a NodeB, an eNodeB (eNB), a next-generation NodeB or a giga-NodeB (either of which may be referred to as a gNB), a Home NodeB, a Home eNodeB, or other suitable terminology.

A UE 115 may include or may be referred to as a mobile device, a wireless device, a remote device, a handheld device, or a subscriber device, or some other suitable terminology, where the "device" may also be referred to as a unit, a station, a terminal, or a client, among other examples. A UE 115 may also include or may be referred to as a personal electronic device such as a cellular phone, a personal digital assistant (PDA), a tablet computer, a laptop computer, or a personal computer. In some examples, a UE 115 may include or be referred to as a wireless local loop (WLL) station, an Internet of Things (IoT) device, an Internet of Everything (IoE) device, or a machine type communications (MTC) device, among other examples, which may be implemented in various objects such as appliances, or vehicles, meters, among other examples.

The UEs 115 described herein may be able to communicate with various types of devices, such as other UEs 115 that may sometimes act as relays as well as the base stations 105 and the network equipment including macro eNBs or gNBs, small cell eNBs or gNBs, or relay base stations, among other examples, as shown in FIG. 1.

The UEs 115 and the base stations 105 may wirelessly communicate with one another via one or more communication links 125 over one or more carriers. The term "carrier" may refer to a set of radio frequency spectrum resources having a defined physical layer structure for supporting the communication links 125. For example, a carrier used for a communication link 125 may include a portion of a radio frequency spectrum band (e.g., a bandwidth part (BWP)) that is operated according to one or more physical layer channels for a given radio access technology (e.g., LTE, LTE-A, LTE-A Pro, NR). Each physical layer channel may carry acquisition signaling (e.g., synchronization signals, system information), control signaling that coordinates operation for the carrier, user data, or other signaling. The wireless communications system 100 may support communication with a UE 115 using carrier aggregation or multi-carrier operation. A UE 115 may be configured with multiple downlink component carriers and one or more uplink component carriers according to a carrier aggregation configuration. Carrier aggregation may be used with both frequency division duplexing (FDD) and time division duplexing (TDD) component carriers.

In some examples (e.g., in a carrier aggregation configuration), a carrier may also have acquisition signaling or control signaling that coordinates operations for other carriers. A carrier may be associated with a frequency channel (e.g., an evolved universal mobile telecommunication system terrestrial radio access (E-UTRA) absolute radio frequency channel number (EARFCN)) and may be positioned according to a channel raster for discovery by the UEs 115. A carrier may be operated in a standalone mode where initial acquisition and connection may be conducted by the UEs 115 via the carrier, or the carrier may be operated in a non-standalone mode where a connection is anchored using a different carrier (e.g., of the same or a different radio access technology).

The communication links 125 shown in the wireless communications system 100 may include uplink transmissions from a UE 115 to a base station 105, or downlink transmissions from a base station 105 to a UE 115. Carriers may carry downlink or uplink communications (e.g., in an FDD mode) or may be configured to carry downlink and uplink communications (e.g., in a TDD mode).

A carrier may be associated with a particular bandwidth of the radio frequency spectrum, and in some examples the carrier bandwidth may be referred to as a "system bandwidth" of the carrier or the wireless communications system 100. For example, the carrier bandwidth may be one of a number of determined bandwidths for carriers of a particular radio access technology (e.g., 1.4, 3, 5, 10, 15, 20, 40, or 80 megahertz (MHz)). Devices of the wireless communications system 100 (e.g., the base stations 105, the UEs 115, or both) may have hardware configurations that support communications over a particular carrier bandwidth or may be configurable to support communications over one of a set of carrier bandwidths. In some examples, the wireless communications system 100 may include base stations 105 or UEs 115 that support simultaneous communications via carriers associated with multiple carrier bandwidths. In some examples, each served UE 115 may be configured for operating over portions (e.g., a sub-band, a BWP) or all of a carrier bandwidth.

Signal waveforms transmitted over a carrier may be made up of multiple subcarriers (e.g., using multi-carrier modulation (MCM) techniques such as orthogonal frequency division multiplexing (OFDM) or discrete Fourier transform spread OFDM (DFT-S-OFDM)). In a system employing MCM techniques, a resource element may consist of one symbol period (e.g., a duration of one modulation symbol) and one subcarrier, where the symbol period and subcarrier spacing are inversely related. The number of bits carried by each resource element may depend on the modulation scheme (e.g., the order of the modulation scheme, the coding rate of the modulation scheme, or both). Thus, the more resource elements that a UE 115 receives and the higher the order of the modulation scheme, the higher the data rate may be for the UE 115. A wireless communications resource may refer to a combination of a radio frequency spectrum resource, a time resource, and a spatial resource (e.g., spatial layers or beams), and the use of multiple spatial layers may further increase the data rate or data integrity for communications with a UE 115.

The time intervals for the base stations 105 or the UEs 115 may be expressed in multiples of a basic time unit which may, for example, refer to a sampling period of $T_s=1/(\Delta f_{max} \cdot N_f)$ seconds, where $\Delta f_{max}$ may represent the maximum supported subcarrier spacing, and $N_f$ may represent the maximum supported discrete Fourier transform (DFT) size. Time intervals of a communications resource may be organized according to radio frames each having a specified duration (e.g., 10 milliseconds (ms)). Each radio frame may be identified by a system frame number (SFN) (e.g., ranging from 0 to 1023).

Each frame may include multiple consecutively numbered subframes or slots, and each subframe or slot may have the same duration. In some examples, a frame may be divided (e.g., in the time domain) into subframes, and each subframe may be further divided into a number of slots. Alternatively, each frame may include a variable number of slots, and the number of slots may depend on subcarrier spacing. Each slot may include a number of symbol periods (e.g., depending on the length of the cyclic prefix prepended to each symbol period). In some wireless communications systems 100, a slot may further be divided into multiple mini-slots containing one or more symbols. Excluding the cyclic prefix, each symbol period may contain one or more (e.g., $N_f$) sampling periods. The duration of a symbol period may depend on the subcarrier spacing or frequency band of operation.

A subframe, a slot, a mini-slot, or a symbol may be the smallest scheduling unit (e.g., in the time domain) of the wireless communications system 100 and may be referred to as a transmission time interval (TTI). In some examples, the TTI duration (e.g., the number of symbol periods in a TTI) may be variable. Additionally or alternatively, the smallest scheduling unit of the wireless communications system 100 may be dynamically selected (e.g., in bursts of shortened TTIs (sTTIs)).

Physical channels may be multiplexed on a carrier according to various techniques. A physical control channel and a physical data channel may be multiplexed on a downlink carrier, for example, using one or more of time division multiplexing (TDM) techniques, frequency division multiplexing (FDM) techniques, or hybrid TDM-FDM techniques. A control region (e.g., a control resource set (CORESET)) for a physical control channel may be defined by a number of symbol periods and may extend across the system bandwidth or a subset of the system bandwidth of the carrier. One or more control regions (e.g., CORESETs) may be configured for a set of the UEs 115. For example, one or more of the UEs 115 may monitor or search control regions for control information according to one or more search space sets, and each search space set may include one or multiple control channel candidates in one or more aggregation levels arranged in a cascaded manner. An aggregation level for a control channel candidate may refer to a number of control channel resources (e.g., control channel elements (CCEs)) associated with encoded information for a control information format having a given payload size. Search space sets may include common search space sets configured for sending control information to multiple UEs 115 and UE-specific search space sets for sending control information to a specific UE 115.

Each base station 105 may provide communication coverage via one or more cells, for example a macro cell, a small cell, a hot spot, or other types of cells, or any combination thereof. The term "cell" may refer to a logical communication entity used for communication with a base station 105 (e.g., over a carrier) and may be associated with an identifier for distinguishing neighboring cells (e.g., a physical cell identifier (PCID), a virtual cell identifier (VCID), or others). In some examples, a cell may also refer to a geographic coverage area 110 or a portion of a geographic coverage area 110 (e.g., a sector) over which the logical communication entity operates. Such cells may range from smaller areas (e.g., a structure, a subset of structure) to larger areas depending on various factors such as the capabilities of the base station 105. For example, a cell may be or include a building, a subset of a building, or exterior spaces between or overlapping with geographic coverage areas 110, among other examples.

In some examples, a base station 105 may be movable and therefore provide communication coverage for a moving geographic coverage area 110. In some examples, different geographic coverage areas 110 associated with different technologies may overlap, but the different geographic coverage areas 110 may be supported by the same base station 105. In other examples, the overlapping geographic coverage areas 110 associated with different technologies may be supported by different base stations 105. The wireless communications system 100 may include, for example, a heterogeneous network in which different types of the base stations 105 provide coverage for various geographic coverage areas 110 using the same or different radio access technologies.

The wireless communications system 100 may be configured to support ultra-reliable communications or low-latency communications, or various combinations thereof. For example, the wireless communications system 100 may be configured to support ultra-reliable low-latency communications (URLLC) or mission critical communications. The UEs 115 may be designed to support ultra-reliable, low-latency, or critical functions (e.g., mission critical functions). Ultra-reliable communications may include private communication or group communication and may be supported by one or more mission critical services such as mission critical push-to-talk (MCPTT), mission critical video (MCVideo), or mission critical data (MCData). Support for mission critical functions may include prioritization of services, and mission critical services may be used for public safety or general commercial applications. The terms ultra-reliable, low-latency, mission critical, and ultra-reliable low-latency may be used interchangeably herein.

In some examples, a UE 115 may also be able to communicate directly with other UEs 115 over a device-to-device (D2D) communication link 135 (e.g., using a peer-to-peer (P2P) or D2D protocol). One or more UEs 115 utilizing D2D communications may be within the geographic coverage area 110 of a base station 105. Other UEs 115 in such a group may be outside the geographic coverage area 110 of a base station 105 or be otherwise unable to receive transmissions from a base station 105. In some examples, groups of the UEs 115 communicating via D2D communications may utilize a one-to-many (1:M) system in which each UE 115 transmits to every other UE 115 in the group. In some examples, a base station 105 facilitates the scheduling of resources for D2D communications. In other cases, D2D communications are carried out between the UEs 115 without the involvement of a base station 105.

The core network 130 may provide user authentication, access authorization, tracking, Internet Protocol (IP) connectivity, and other access, routing, or mobility functions. The core network 130 may be an evolved packet core (EPC) or 5G core (5GC), which may include at least one control plane entity that manages access and mobility (e.g., a mobility management entity (MME), an access and mobility management function (AMF)) and at least one user plane entity that routes packets or interconnects to external networks (e.g., a serving gateway (S-GW), a Packet Data Network (PDN) gateway (P-GW), or a user plane function (UPF)). The control plane entity may manage non-access stratum (NAS) functions such as mobility, authentication, and bearer management for the UEs 115 served by the base stations 105 associated with the core network 130. User IP packets may be transferred through the user plane entity, which may provide IP address allocation as well as other functions. The user plane entity may be connected to the network operators IP services 150. The network operators IP services 150 may include access to the Internet, Intranet(s), an IP Multimedia Subsystem (IMS), or a Packet-Switched Streaming Service.

Some of the network devices, such as a base station 105, may include subcomponents such as an access network entity 140, which may be an example of an access node controller (ANC). Each access network entity 140 may communicate with the UEs 115 through one or more other access network transmission entities 145, which may be referred to as radio heads, smart radio heads, or transmission/reception points (TRPs). Each access network transmission entity 145 may include one or more antenna panels. In some configurations, various functions of each access network entity 140 or base station 105 may be distributed across various network devices (e.g., radio heads and ANCs) or consolidated into a single network device (e.g., a base station 105).

The wireless communications system 100 may operate using one or more frequency bands, typically in the range of 300 megahertz (MHz) to 300 gigahertz (GHz). Generally, the region from 300 MHz to 3 GHz is known as the ultra-high frequency (UHF) region or decimeter band because the wavelengths range from approximately one decimeter to one meter in length. The UHF waves may be blocked or redirected by buildings and environmental features, but the waves may penetrate structures sufficiently for a macro cell to provide service to the UEs 115 located indoors. The transmission of UHF waves may be associated with smaller antennas and shorter ranges (e.g., less than 100 kilometers) compared to transmission using the smaller frequencies and longer waves of the high frequency (HF) or very high frequency (VHF) portion of the spectrum below 300 MHz.

The wireless communications system 100 may utilize both licensed and unlicensed radio frequency spectrum bands. For example, the wireless communications system 100 may employ License Assisted Access (LAA), LTE-Unlicensed (LTE-U) radio access technology, or NR technology in an unlicensed band such as the 5 GHz industrial, scientific, and medical (ISM) band. When operating in unlicensed radio frequency spectrum bands, devices such as the base stations 105 and the UEs 115 may employ carrier sensing for collision detection and avoidance. In some examples, operations in unlicensed bands may be based on a carrier aggregation configuration in conjunction with component carriers operating in a licensed band (e.g., LAA). Operations in unlicensed spectrum may include downlink transmissions, uplink transmissions, P2P transmissions, or D2D transmissions, among other examples.

A base station 105 or a UE 115 may be equipped with multiple antennas, which may be used to employ techniques such as transmit diversity, receive diversity, multiple-input multiple-output (MIMO) communications, or beamforming. The antennas of a base station 105 or a UE 115 may be located within one or more antenna arrays or antenna panels, which may support MIMO operations or transmit or receive beamforming. For example, one or more base station antennas or antenna arrays may be co-located at an antenna assembly, such as an antenna tower. In some examples, antennas or antenna arrays associated with a base station 105 may be located in diverse geographic locations. A base station 105 may have an antenna array with a number of rows and columns of antenna ports that the base station 105 may use to support beamforming of communications with a UE 115. Likewise, a UE 115 may have one or more antenna arrays that may support various MIMO or beamforming operations. Additionally or alternatively, an antenna panel may support radio frequency beamforming for a signal transmitted via an antenna port.

The base stations 105 or the UEs 115 may use MIMO communications to exploit multipath signal propagation and increase the spectral efficiency by transmitting or receiving multiple signals via different spatial layers. Such techniques may be referred to as spatial multiplexing. The multiple signals may, for example, be transmitted by the transmitting device via different antennas or different combinations of antennas. Likewise, the multiple signals may be received by the receiving device via different antennas or different combinations of antennas. Each of the multiple signals may be referred to as a separate spatial stream and may carry bits associated with the same data stream (e.g., the same codeword) or different data streams (e.g., different codewords). Different spatial layers may be associated with different antenna ports used for channel measurement and reporting. MIMO techniques include single-user MIMO (SU-MIMO), where multiple spatial layers are transmitted to the same receiving device, and multiple-user MIMO (MU-MIMO), where multiple spatial layers are transmitted to multiple devices.

Beamforming, which may also be referred to as spatial filtering, directional transmission, or directional reception, is a signal processing technique that may be used at a transmitting device or a receiving device (e.g., a base station 105, a UE 115) to shape or steer an antenna beam (e.g., a transmit beam, a receive beam) along a spatial path between the transmitting device and the receiving device. Beamforming may be achieved by combining the signals communicated via antenna elements of an antenna array such that some signals propagating at particular orientations with respect to an antenna array experience constructive interference while others experience destructive interference. The adjustment of signals communicated via the antenna elements may include a transmitting device or a receiving device applying amplitude offsets, phase offsets, or both to signals carried via the antenna elements associated with the device. The adjustments associated with each of the antenna elements may be defined by a beamforming weight set associated with a particular orientation (e.g., with respect to the antenna array of the transmitting device or receiving device, or with respect to some other orientation).

A base station 105 or a UE 115 may use beam sweeping techniques as part of beam forming operations. For example, a base station 105 may use multiple antennas or antenna arrays (e.g., antenna panels) to conduct beamforming operations for directional communications with a UE 115. Some signals (e.g., synchronization signals, reference signals, beam selection signals, or other control signals) may be transmitted by a base station 105 multiple times in different directions. For example, the base station 105 may transmit a signal according to different beamforming weight sets associated with different directions of transmission. Transmissions in different beam directions may be used to identify (e.g., by a transmitting device, such as a base station 105, or by a receiving device, such as a UE 115) a beam direction for later transmission or reception by the base station 105.

Some signals, such as data signals associated with a particular receiving device, may be transmitted by a base station 105 in a single beam direction (e.g., a direction associated with the receiving device, such as a UE 115). In some examples, the beam direction associated with transmissions along a single beam direction may be determined based on a signal that was transmitted in one or more beam directions. For example, a UE 115 may receive one or more of the signals transmitted by the base station 105 in different directions and may report to the base station 105 an indication of the signal that the UE 115 received with a highest signal quality or an otherwise acceptable signal quality.

In some examples, transmissions by a device (e.g., by a base station 105 or a UE 115) may be performed using multiple beam directions, and the device may use a combination of digital precoding or radio frequency beamforming to generate a combined beam for transmission (e.g., from a base station 105 to a UE 115). The UE 115 may report feedback that indicates precoding weights for one or more beam directions, and the feedback may correspond to a configured number of beams across a system bandwidth or one or more sub-bands. The base station 105 may transmit a reference signal (e.g., a cell-specific reference signal (CRS), a channel state information reference signal (CSI-RS)), which may be precoded or unprecoded. The UE 115 may provide feedback for beam selection, which may be a precoding matrix indicator (PMI) or codebook-based feedback (e.g., a multi-panel type codebook, a linear combination type codebook, a port selection type codebook). Although these techniques are described with reference to signals transmitted in one or more directions by a base station 105, a UE 115 may employ similar techniques for transmitting signals multiple times in different directions (e.g., for identifying a beam direction for subsequent transmission or reception by the UE 115) or for transmitting a signal in a single direction (e.g., for transmitting data to a receiving device).

A receiving device (e.g., a UE 115) may try multiple receive configurations (e.g., directional listening) when receiving various signals from the base station 105, such as synchronization signals, reference signals, beam selection signals, or other control signals. For example, a receiving device may try multiple receive directions by receiving via different antenna subarrays, by processing received signals according to different antenna subarrays, by receiving according to different receive beamforming weight sets (e.g., different directional listening weight sets) applied to signals received at multiple antenna elements of an antenna array, or by processing received signals according to different receive beamforming weight sets applied to signals received at multiple antenna elements of an antenna array, any of which may be referred to as "listening" according to different receive configurations or receive directions. In some examples, a receiving device may use a single receive configuration to receive along a single beam direction (e.g., when receiving a data signal). The single receive configuration may be aligned in a beam direction determined based on listening according to different receive configuration directions (e.g., a beam direction determined to have a highest signal strength, highest signal-to-noise ratio (SNR), or otherwise acceptable signal quality based on listening according to multiple beam directions).

The wireless communications system 100 may be a packet-based network that operates according to a layered protocol stack. In the user plane, communications at the bearer or Packet Data Convergence Protocol (PDCP) layer may be IP-based. A Radio Link Control (RLC) layer may perform packet segmentation and reassembly to communicate over logical channels. A Medium Access Control (MAC) layer may perform priority handling and multiplexing of logical channels into transport channels. The MAC layer may also use error detection techniques, error correction techniques, or both to support retransmissions at the MAC layer to improve link efficiency. In the control plane, the Radio Resource Control (RRC) protocol layer may provide establishment, configuration, and maintenance of an RRC connection between a UE 115 and a base station 105 or a core network 130 supporting radio bearers for user plane data. At the physical layer, transport channels may be mapped to physical channels.

The UEs 115 and the base stations 105 may support retransmissions of data to increase the likelihood that data is received successfully. Hybrid automatic repeat request (HARQ) feedback is one technique for increasing the likelihood that data is received correctly over a communication link 125. HARQ may include a combination of error detection (e.g., using a cyclic redundancy check (CRC)), forward error correction (FEC), and retransmission (e.g., automatic repeat request (ARQ)). HARQ may improve throughput at the MAC layer in poor radio conditions (e.g., low signal-to-noise conditions). In some examples, a device may support same-slot HARQ feedback, where the device may provide HARQ feedback in a specific slot for data received in a previous symbol in the slot. In other cases, the device may provide HARQ feedback in a subsequent slot, or according to some other time interval.

The UEs 115 and the base stations 105 of the wireless communications system 100 may support techniques for releasing multiple SPS and/or CG resources via a single DCI message. In particular, techniques described herein may enable a single DCI message to release multiple sets of resources across multiple component carriers. By enabling a single DCI message to release multiple sets of resources within and/or across multiple component carriers, control signaling within a wireless communications system 100 may be reduced.

For example, a UE 115 of the wireless communications system 100 may be configured (e.g., via RRC signaling) with multiple configurations (e.g., tables, indices, storage objects) that associate indications within DCI messages with component carrier/resource pairs. That is, different values for the indication in a DCI message may indicate multiple different resources, each resource associated with one of the component carriers. In cases where a configuration includes a table, each row of the table may indicate one or more component carrier/resource pairs. In one example, different HPN field values may each be associated with one or more component carrier/resource pairs (e.g., HPN field value 1={CC1, SPS index}, {CC2, CG index}). In this regard, upon receiving a DCI message from a base station 105, the UE 115 may identify the indication(s) in the received DCI message, and determine that the DCI message is configured to release sets of resources. Upon identifying the indication in the DCI message, the UE 115 may refer to the respective configuration (e.g., table), and then release the SPS and/or CG resources, across the multiple component carriers, that correspond to the received indication within the DCI message.

In some aspects, the UE 115 may be configured with a single configuration, or multiple configurations, including resource/component carrier pairs. In cases where the UE 115 is configured with multiple configurations, the UE 115 may determine which configuration is to be used based on the component carrier on which the DCI message was received. Alternatively, a CIF value in the DCI message may indicate which configuration is to be used. In these proposals, the UE 115 may determine two or more sets of resources (e.g., SPS, CG, or both) which are to be released based on the field value indicated in the DCI message, and the corresponding sets of resources associated with the HPN field value indicated in the pertinent configuration. In some cases, the UE 115 may validate (e.g., confirm) that the DCI message is configured to release resources based on various fields or values in the DCI message, including an RV field, an MCS field, an FDRA field, or any combination thereof. By enabling a single DCI message to release multiple sets of resources within and/or across multiple component carriers, control signaling within a wireless communications system may be reduced.

Techniques described herein may enable a single DCI message to release multiple sets of resources within and/or across multiple component carriers. For example, techniques described herein may enable a single DCI message to release a first set of resources (e.g., SPS grant, CG) within a first component carrier at the UE 115, and release a second set of resources (e.g., SPS grant, CG) within a second component carrier at the UE 115. By enabling the release of multiple sets of resources within and/or across multiple component carriers, control signaling overhead within the wireless communications system 100 may be reduced, and flexibility of releasing sets of resources may be improved.

Figure 2:
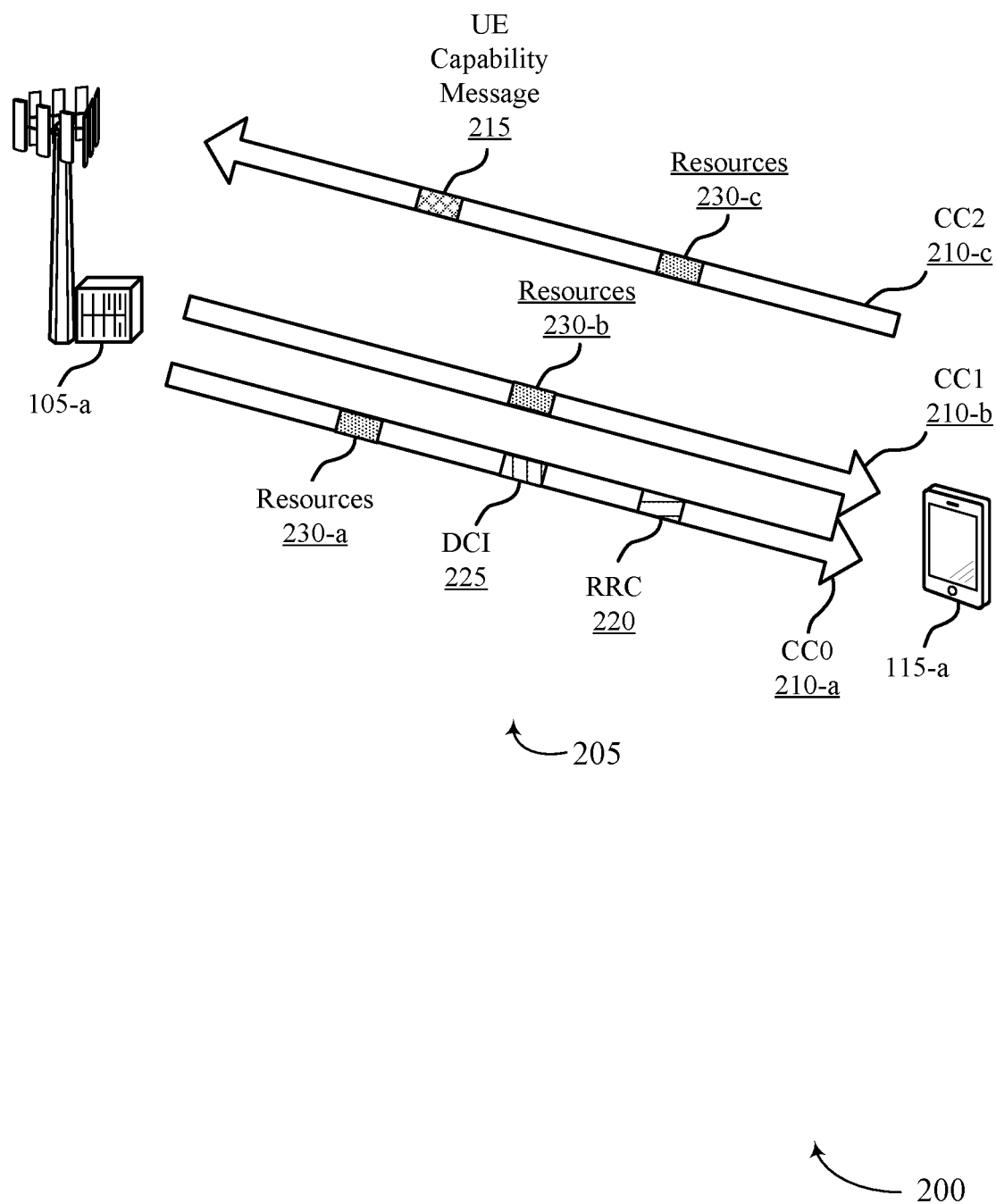
FIG. 2 illustrates an example of a wireless communications system that supports techniques for releasing multiple sets of semi-persistent scheduling and configured grant resources in accordance with aspects of the present disclosure.

FIG. 2 illustrates an example of a wireless communications system 200 that supports techniques for releasing multiple sets of SPS and CG resources in accordance with aspects of the present disclosure. In some examples, wireless communications system 200 may implement aspects of wireless communications system 100. The wireless communications system 200 may include a base station 105-a and a UE 115-a, which may be examples of UEs 115 and base stations 105, as described with reference to FIG. 1.

The UE 115-a may communicate with the base station 105-a using a communication link 205. In some cases, the communication link 205 may include an example of an access link (e.g., a Uu link). The communication link 205 may include a bi-directional link that can include both uplink and downlink communication. In one aspect, the UE 115-a may transmit uplink transmissions, such as uplink messages or uplink signals, to the base station 105-a using the communication link 205 and the base station 105-a may transmit downlink data transmissions, such as downlink messages or downlink signals, to the UE 115-a using the communication link 205. In some aspects, the communication link 205 may include a set of component carriers 210 for communications between the UE 115-a and the base station 105-a. For example, the communication link 205 may include a first component carrier 210-a (CC1), a second component carrier 210-b (CC2), and a third component carrier 210-c (CC3). Each of the component carriers 210-a, 210-b, and 210-c may be configured for uplink communications, downlink communications, or both. The communication link 205 may include any number of component carriers.

The UEs 115 and the base stations 105 of the wireless communications system 100 may support techniques for releasing multiple SPS and/or CG resources via a single DCI message. In particular, techniques described herein may enable a single DCI message to release multiple sets of resources across multiple component carriers. By enabling a single DCI message to release multiple sets of resources within and/or across multiple component carriers, control signaling within a wireless communications system 100 may be reduced.

For example, the UE 115-a, the base station 105-a, or both, may identify a communications configuration for communications between the UE 115-a and the base station 105-a on a set of (e.g., multiple) component carriers 210. For example, the communications configuration may include at least a first set of resources 230-a on the first component carrier 210-a, a second set of resources on the second component carrier 210-b, and a third set of resources 230-c on the third component carrier 210-c. In some aspects, the first set of resources 230-a, the second set of resources 230-b, the third set of resources 230-c, or any combination thereof, may include a set of downlink resources associated with an SPS grant, a set of uplink resources associated with a CG, or any combination thereof. For example, the first set of resources 230-a and the second set of resources may include sets of resources associated with SPS grants, and the third set of resources 230-c may include a set of resources associated with a CG. In this regard the sets of resources 230-a, 230-b, and 230-c may include sets of time resources and sets of frequency resources for communications between the UE 115-a and the base station 105-a.

In some aspects, UE 115-a may transmit a UE capability message 215 to the base station 105-a. In some aspects, the UE capability message 215 may indicate that the UE 115-a is configured to release two or more sets of resources 230 via a single DCI message 225. Additionally or alternatively, the UE capability message 215 may indicate that the UE 115-b is configured to release two or more sets of resources 230 across multiple component carriers 210 via a single DCI message 225. In some cases, the UE 115-a may transmit the UE capability message 215 based on identifying the communications configuration for communications between the UE 115-a and the base station 105-a.

The base station 105-a may transmit an RRC message 220 to the UE 115-a. In some aspects, the base station 105-a may transmit the RRC message 220 to the UE 115-a based on identifying the communications configuration for communications between the UE 115-a and the base station 105-a, receiving the UE capability message 215, or both. In some aspects, the RRC message 220 may indicate, to the UE 115-a, how the UE 115-a is to interpret DCI messages 225 received from the base station 105-a which are configured to release sets of resources 230. In this regard, the RRC message 220 may include an indication of a release configuration for interpreting DCI messages 225 for releasing sets of resources 230.

In some aspects, the release configuration (e.g., release configuration indicated via the RRC message 220) may indicate sets of mapping pairs, where each mapping pair of the release configuration may include (e.g., identify, indicate) a component carrier 210 and a resource for communications between the UE 115-a and the base station 105-a. For example, a first mapping pair may include {CC0, SPS/CG index 1}, where the first mapping pair indicates an association between the first component carrier 210-a (CC0) and an index associated with an SPS grant or CG resource (e.g., set of resources 230-a) on the first component carrier 210-a. By way of another example, a second mapping pair may include {CC2, SPS/CG index 1}, where the second mapping pair indicates an association between the third component carrier 210-c (CC2) and an index associated with an SPS grant or CG resource (e.g., set of resources 230-c) on the second component carrier 210-c. The release configuration may include any number of mapping pairs. Additionally, while the release configuration is shown and described as being signaled to the UE 115-a via the RRC message 220, the UE 115-a may receive the release configuration via any other signaling. Additionally or alternatively, the UE 115-a may be pre-configured with the release configuration.

In some aspects, the release configuration may include one or more configurations (e.g., tables, indices, storage objects) associated with releasing resources 230. In some aspects, each configuration may include associations between one or more field values (e.g., HPN field values, component carrier field values, CIF values) of DCI messages 225 and the mapping pairs. For example, a configuration may include a table, where the configuration includes associations between HPN field values and one or more mapping pairs, as shown in Table 1 below:

TABLE 1

Configuration (e.g., Table) Indicating Associations Between HPN Field Values and Mapping Pairs

| HPN Field Value | {CC#, SPS index} or {CC#, CG index} |
|---|---|
| 0 | {0, 0}, {0, 1} |
| 1 | {0, 0}, {1, 0}, {0, 1}, {1, 1} |
| 2 | {0, 0}, {2, 1}, {2, 4}, {3, 6}, {0, 8} |
| 3 | {1, 1}, {2, 2} |
| ... | ... |
| 15 | All Sets of Resources |

As shown in Table 1 above, the configuration may indicate that a second HPN field value is associated with two mapping pairs (e.g., HPN field value 0={CC0, SPS/CG index 0}, {CC0, SPS/CG index 1}), and a fourth HPN field value (e.g., HPN field value 3) is associated with a single mapping pair (e.g., HPN field value 3={CC1, SPS/CG index 1}). The release configuration may include a number of configurations, where each configuration may indicate any number of associations between field values (e.g., HPN field values, component carrier field values, CIF values) and mapping pairs. The quantity of associations between field values and mapping pairs (e.g., the quantity of rows of the Table 1) may be configurable. Moreover, quantity of bits in the HPN field may depend on the quantity of associations that determines the quantity of rows of the Table 1. For example, if there are N quantity of rows in Table 1 as a result of associations between field values and mapping pairs, then the quantity of bits in the HPN field used to indicate mapping pairs may be defined as $\lceil \log_2(N) \rceil$.

In some aspects, the base station 105-b may determine to release one or more sets of resources 230 based on the communications configuration for communications between the UE 115-a and the base station 105-a. In some aspects, the base station 105-a may identify one or more configurations for releasing sets of resources 230 based on identifying the communications configuration for communications between the UE 115-a and the base station 105-a, the UE capability message 215, the RRC message 220, identifying the sets of resources to be released, or any combination thereof. Additionally, the base station 105-b may select one or more configurations (e.g., tables) which will be referenced by the UE 115-a to identify sets of resources 230 which are to be released. In some aspects, the base station 105-a may select the one or more configurations based on a component carrier 210 on which the DCI message 225 will be transmitted, field values indicated in the DCI message 225, or any combination thereof.

In some aspects, the base station 105-a may transmit a DCI message 225 to the UE 115-a based on determining the one or more sets of resources 230 which are to be released. The base station 105-a may transmit the DCI message 225 on a component carrier 210 of the set of component carriers 210 of the UE 115-a. For example, as shown in FIG. 2, the base station 105-a may transmit the DCI message 225 on the first component carrier 210-a. In some aspects, the UE 115-a may receive the DCI message 225 based on identifying the communications configuration for communications between the UE 115-a and the base station 105-a, transmitting the UE capability message 215, receiving the RRC message 220, or any combination thereof.

In some aspects, the DCI message 225 may include one or more field values indicating that the UE 115-a is to release one or more sets of resources 230. For example, in cases where the communications configuration for communications between the UE 115-a and the base station 105-a includes the first set of resources 230-a on the first component carrier 210-a, the second set of resources 230-a on the second component carrier 210-b, and the third set of resources 230-c on the third component carrier 210-c, the DCI message 225 may include on or more field values indicating that the UE 115-a is to release the first set of resources 230-a and the second set of resources 230-b. The one or more field values indicating that the UE 115-a is to release sets of resources 230 may include, but are not limited to, HPN field values, CIF values, or both. Moreover, in some aspects, the one or more field values may be associated with field values indicated in the one or more configurations (e.g., Table 1 above) of the release configuration. In this regard, the one or more field values indicated in the DCI message 225 may be used to reference the one or more configurations of the resource configuration to identify sets of resources 230 which are to be released.

The UE 115-a may be configured to receive DCI messages 225 configured to release sets of resources 230 within one or more component carriers 210 of the UE 115-a. For example, in some cases, the UE 115-a may be configured to receive the DCI message 225 within each component carrier 210 of the UE 115-a. By way of another example, the UE 115-b may be configured to receive the DCI message 225 within only a subset of component carriers of the UE 115-a (e.g., only within the first component carrier 210-a). In this example, indications for release of sets of resources 230 may be limited to a given set of component carriers 210, such that DCI messages 225 received on a component carrier 210 not included in the given set of component carriers 210 may not efficiently and/or successfully release sets of resources 230. In such cases, the subset of component carriers 210 over which DCI messages 225 releasing sets of resources 230 may be received may be pre-configured, signaled to the UE 115-a (e.g., via the RRC message 220), or any combination thereof.

In some aspects, the UE 115-a, the base station 105-a, or both, may determine that the DCI message 225 is configured to release one or more sets of resources 230. In some aspects, the UE 115-a and/or the base station 105-a may determine that the DCI message 225 is configured to release sets of resources 230 based on a new data indicator (NDI) field of the DCI message 225. For example, in some cases, a first value of the NDI field (e.g., NDI=0) within the DCI message 225 may indicate that the DCI message 225 is configured for release and/or activation of sets of resources 230 (e.g., release and/or activation of SPS grants and/or CGs), and a second value of the NDI field (e.g., NDI=1) within the DCI message 225 may indicate that the DCI message 225 is configured for scheduling transmissions or re-transmissions of sets of resources 230 (e.g., scheduling re-transmissions of SPS grants and/or CGs). In this example, the UE 115-a and/or the base station 105-a may determine that the DCI message 225 is configured to release sets of resources 230 based on the NDI field of the DCI message 225 indicating the first value (e.g., NDI=0).

Additionally or alternatively, the UE 115-a and/or the base station 105-a may determine that the DCI message 225 is configured to release sets of resources 230 based on at least a portion of the DCI message 225 being scrambled (e.g., encoded) according to a radio network temporary identifier (RNTI) associated with release (e.g., a coding scheme radio network temporary identifier (CS-RNTI)). For example, the base station 105-b may scramble (e.g., encode) at least a portion (e.g., CRC portion) of the DCI message 225 via CS-RNTI such that a format of the DCI message 225 is associated with cross-carrier scheduling, cross-carrier activation, cross-carrier release, or any combination thereof. In this example, the UE 115-a may determine that the DCI message 225 is configured to release one or more sets of resources 230 based on a portion of the DCI message 225 being scrambled (e.g., encoded) according to CS-RNTI, based on the NDI field, or both.

In some aspects, upon determining that the DCI message 225 is configured for releasing sets of resources 230, the UE 115-a may additionally validate (e.g., determine, confirm) that the DCI message 225 is configured for releasing sets of resources based on values (e.g., bit values) of fields within the DCI message 225 (e.g., RV field, MCS field, FDRA field, or any combination thereof). Additionally or alternatively, the UE 115-a may validate that the DCI message 225 is configured for releasing sets of resources 230 based on types of FDRA fields within the DCI message 225.

For example, in cases where the DCI message 225 includes one of DCI formats 0_0, 0_1, or 0_2, the UE 115-a may validate that the DCI message 225 is configured to release sets of resources 230 if the RV fields of the DCI message 225 are set to a first value (e.g., RV field=0), the MCS fields of the DCI message 225 are set to a second value (e.g., MCS field=1), and the FDRA fields of the DCI message 225 are set to a first value (e.g., FDRA field=0) for FDRA Type 2 with μ=1 for all component carriers 210 in which resources 230 are to be released, and to a second value (e.g., FDRA field=1) for all component carriers 210 which do not include resources 230 which are to be released.

Additionally or alternatively, the UE 115-a may validate that the DCI message 225 is configured to release sets of resources 230 if at least one component carrier 210 which includes sets of resources 230 to be released includes an FDRA field set to the first value (e.g., FDRA field=0) for FDRA Type 2 with μ=1. In this example, the at least one component carrier 210 including FDRA field=0 used for validation may include any component carrier 210 of the set of component carriers 210. For instance, the at least one component carrier 210 including FDRA field=0 used for validation may include the component carrier 210 having the highest or lowest cell index among the component carriers 210 on which sets of resources 230 are to be released, the same component carrier 210 as the component carrier 210 on which the DCI message 225 was received (e.g., component carrier 210-a), a component carrier 210 associated with a set of resources 230 within the communications configuration for communications between the UE 115-a and the base station 105-a, or any combination thereof. In this regard, in some cases, the UE 115-a may validate that the DCI message 225 is configured to release resources based on only a subset of the FDRA fields associated with the set of component carriers 210.

By way of another example, in cases where the DCI message 225 includes one of DCI formats 1_0, 1_1, or 1_2, the UE 115-a may validate that the DCI message 225 is configured to release sets of resources 230 if the RV fields of the DCI message 225 are set to a first value (e.g., RV field=0), the MCS fields of the DCI message 225 are set to a second value (e.g., MCS field=1), and the FDRA fields of the DCI message 225 are set to a first value (e.g., FDRA field=0) for FDRA Type 0 for dynamic switch for all component carriers 210 in which sets of resources 230 are to be released, and to a second value (e.g., FDRA field=1) for FDRA Type 1 for all component carriers 210 which do not include sets of resources 230 which are to be released. Additionally or alternatively, the UE 115-a may validate that the DCI message 225 is configured to release sets of resources 230 if at least all the component carriers 210 which include sets of resources 230 to be released include an FDRA field set to the first value (e.g., FDRA field=0) for FDRA Type 0 for dynamic switch.

Accordingly, the UE 115-b may validate that the DCI message is configured for releasing sets of resources based on various parameters or fields associated with one or more component carriers including, but not limited to, determined FDRA field values, determined types of FDRA fields, RV field values, MCS field values, or any combination thereof.

In some aspects, the UE 115-a, the base station 105-a, or both, may identify one or more configurations for releasing sets of resources 230. In some aspects, the UE 115-a, the base station 105-a, or both, may identify the one or more configurations for releasing sets of resources 230 based on identifying the communications configuration for communications between the UE 115-a and the base station 105-a, the UE capability message 215, the RRC message 220, the DCI message 225, determining and/or validating that the DCI message 225 is configured to release sets of resources 230, or any combination thereof. For example, the UE 115-a may identify one or more configurations (e.g., Table 1 above) associated with releasing sets of resources 230 based on a release configuration received from the base station 105-a (e.g., release configuration indicated in the RRC message 220).

In some cases, each configuration may include associations between one or more field values (e.g., HPN field values, component carrier field values, CIF values) of DCI messages 225 and the mapping pairs, as shown in Table 1 above. In this regard, the UE 115-a, the base station 105-a, or both, may identify and reference the one or more configurations to determine which sets of resources 230 are to be released. In some cases, the UE 115-a and/or the base station 105-a may identify and utilize a single configuration to identify sets of resources 230 which are to be released. In this regard, the single configuration may be common across all component carriers 210 and bandwidth parts (BWPs) where the sets of resources 230 may be released, and may be referenced regardless of which component carrier 210 the DCI message 225 is received on. In additional or alternative cases, the UE 115-a and/or the base station 105-a may identify multiple configurations associated with releasing sets of resources 230. For example, each component carrier 210 of the set of component carriers 210 may include a separate configuration, such that the UE 115-a may identify a first configuration associated with the first component carrier 210-a, a second configuration associated with the second component carrier 210-b, and a third configuration associated with the third component carrier 210-c.

Upon identifying the one or more configurations, the UE 115-a, the base station 105-a, or both, may select a configuration which will be referenced to identify sets of resources 230 which are to be released. In some aspects, the UE 115-a, the base station 105-a, or both, may identify the one or more configurations for releasing sets of resources 230 based on identifying the communications configuration for communications between the UE 115-a and the base station 105-a, the UE capability message 215, the RRC message 220, the DCI message 225, determining and/or validating that the DCI message 225 is configured to release sets of resources 230, identifying the one or more configurations, or any combination thereof.

In cases where the UE 115-a and/or the base station 105-a identify only a single configuration (e.g., single configuration which is common across all component carriers) for releasing resources, the UE 115-a and/or the base station 105-a may select the single configuration. In other cases where the UE 115-a and/or the base station 105-a identify multiple configurations for releasing resources, the UE 115-a and/or the base station 105-a may select a configuration from the identified configurations based on the component carrier 210 on which the DCI message 225 was received, a component carrier field value (e.g., CIF value) indicated in the DCI message 225, or both. For example, in some cases, a first configuration may be associated with the first component carrier 210-a, and a second configuration may be associated with the second component carrier 210-b. In this example, the UE 115-a may select the first configuration in cases where the DCI message 225 is received on the first component carrier 210-a, and may select the second configuration in cases where the DCI message 225 is received on the second component carrier 210-b.

Additionally or alternatively, each identified configuration may be associated with a different component carrier field value (e.g., CIF value). For example, in some cases, a first configuration may be associated with a first component carrier field value (e.g., first CIF value), and a second configuration may be associated with a second component carrier field value (e.g., second CIF value). In this example, the UE 115-*a* may select the first configuration in cases where the DCI message 225 indicates the first component carrier field value, and may select the second configuration in cases where the DCI message 225 indicates the second component carrier field value. In this example, the one or more field values indicated in the DCI message 225 may include the one or more component carrier field values (e.g., CIF values).

In some aspects, the UE 115-*a* and/or the base station 105-*a* may select a given configuration based the component carrier 210 on which the DCI message 225 was received and a field value (e.g., component carrier field value) indicated in the DCI message 225. For example, in some cases, each component carrier 210 may be associated with multiple configurations, where each configuration is associated with a respective component carrier field value. In this example, the UE 115-*a* and/or the base station 105-*a* may select the configuration based on determining the component carrier on which the DCI message was received and the component carrier field value indicated in the DCI message 225.

The UE 115-*a*, the base station 105-*a*, or both, may identify one or more sets of resources 230 which are to be released. In some aspects, the UE 115-*a*, the base station 105-*a*, or both, may identify the one or more sets of resources 230 which are to be released based on identifying the communications configuration for communications between the UE 115-*a* and the base station 105-*a*, the UE capability message 215, the RRC message 220, the DCI message 225, determining and/or validating that the DCI message 225 is configured to release sets of resources 230, identifying and/or selecting the one or more configurations, or any combination thereof.

In some aspects, the UE 115-*a* and/or the base station 105-*a* may identify the sets of resources 230 which are to be released based on the selected configuration and one or more field values (e.g., HPN field values, component carrier field values, CIF values) indicated in the DCI message 225. For example, in cases where the UE 115-*a* selects a configuration including associations between HPN field values and mapping pairs (e.g., Table 1), the UE 115-*a* may identify one or more sets of resources 230 to be released by referencing the configuration and identifying the sets of resources 230 associated with the mapping pairs corresponding to the HPN field value. For instance, the UE 115-*b* may identify the DCI message includes a HPN field value of 3, and may reference the selected configuration (e.g., Table 1) to determine the HPN field value of 3 is associated with two mapping pairs: {CC1, SPS/CG index 1}, {CC2, SPS/CG index 2} (e.g., HPN field value 3={CC1, SPS/CG index 1}, {CC2, SPS/CG index 2}). In this example, the UE 115-*a* may identify the sets of resources corresponding to the SPS and CG index 1 on CC1 are to be released, and that the sets of resources corresponding to the SPS and CG index 2 on CC2 are to be released.

By way of another example, the UE 115-*a* and/or the base station 105-*a* may identify sets of resources 230 to be released based on multiple field values. For example, the DCI message 225 may include a component carrier field value (e.g., CIF value) and a second field value (e.g., HPN field value). In this example, the component carrier field value (e.g., CIF value) may be associated with the first component carrier 210-*a* and the second component carrier 210-*b*, and the second field value may be associated with one or more sets of resources 230 (e.g., sets of resources 230-*a* and 230-*b*). These associations may be indicated in one or more configurations. In this example, the UE 115-*a* may identify the first component carrier 210-*a* and the second component carrier 210-*b* based on the component carrier field value; and may identify the first set of resources 230-*a* and the second set of resources 230-*b* based on the second field value. In this regard, the UE 115-*a* may determine that the first set of resources 230-*a* and the second set of resources 230-*b* are to be released on the first component carrier 210-*a* and the second component carrier 210-*b*, respectively.

Accordingly, the UE 115-*a* and/or the base station 105-*a* may identify sets of resources 230 to be released on one or multiple component carriers 210 based on a combination of multiple field values (e.g., HPN field values, component carrier field values, CIF values). In other words, multiple sets of resources 230 which are to be released across multiple component carriers 210 may be jointly indicated by multiple field values within the DCI message 225.

Upon identifying the sets of resources 230 which are to be released, the UE 115-*a* may release the sets of resources 230. In this regard, the UE 115-*a* may release the sets of resources 230 based on identifying the communications configuration for communications between the UE 115-*a* and the base station 105-*a*, the UE capability message 215, the RRC message 220, the DCI message 225, determining and/or validating that the DCI message 225 is configured to release sets of resources 230, identifying and/or selecting the one or more configurations, identifying the sets of resources 230 to be released, or any combination thereof. In some aspects, the UE 115-*a* may release the sets of resources 230 by refraining from using the sets of resources 230. In some aspects, the UE 115-*a* may transmit an uplink transmission (e.g., acknowledgement message) to the base station 105-*a* indicating that the sets of resources 230 have been released.

In some aspects, the UE 115-*a* may release the sets of resources 230 based on a time at which the DCI message 225 indicating the release of the sets of resources 230 was received. In particular, the UE 115-*a* may not expect to receive a DCI message 225 releasing a set of resources 230 immediately preceding the set of resources 230. Moreover, even if the UE 115-*a* receives the DCI message 225 before the set of resources 230 which are to be released, the UE 115-*a* may be unable to perform the necessary processing to successfully release the set of resources 230 before using the set of resources 230. In this regard, the UE 115-*a* may release the sets of resources 230 based on receiving the DCI message 225 indicating the release within a time period which allows the UE 115-*a* to successfully release the sets of resources 230.

For example, the UE 115-*a* may identify that the DCI message 225 indicates the release of the first set of resources 230-*a* on the first component carrier 210-*a* and the second set of resources 230-*b* on the second component carrier 210-*b*. In this example, the UE 115-*a* may identify a time period (T) in which the first set of resources 230-*a*, the second set of resources 230-*b*, or both, may not be released. In some aspects, the time period may include a quantity of symbols preceding the first set of resources 230-*a*, the second set of resources 230-*b*, or both. For instance, in cases where the first set of resources 230-*a* comes before the second set of resources 230-*b* in the time domain, the time period may include a quantity of symbols preceding the first set of resources 230-*a*. In some aspects, the time period may be based on a subcarrier spacing (SCS) associated with the first set of resources 230-*a*, an SCS associated with the second set of resources 230-*b*, an SCS associated with the first component carrier 210-*a* and/or the second component carrier 210-*b*, an SCS of the component carrier 210 on which the DCI message 225 was received, or any combination thereof. In some cases, the UE 115-a may determine a single time period for the identified sets of resources 230 which are to be released. Additionally or alternatively, the UE 115-a may determine a separate time period for each respective set of resources 230 which are to be released (e.g., a first time period for the first set of resources 230-a, a second time period for the second set of resources 230-b).

Continuing with the same example, the UE 115-a may release the first set of resources 230-a, the second set of resources 230-b, or both, based on determining that the DCI message 225 was received outside of (e.g., prior to) the time period. Conversely, the UE 115-a may refrain from releasing the first set of resources 230-a, the second set of resources 230-b, or both, based on determining that the DCI message 225 was received within the time period.

In some aspects, the UE 115-a, the base station 105-a, or both, may determine that the sets of resources 230 are released. In some aspects, the UE 115-a, the base station 105-a, or both, may determine that the sets of resources 230 are released based on identifying the communications configuration for communications between the UE 115-a and the base station 105-a, the UE capability message 215, the RRC message 220, the DCI message 225, determining and/or validating that the DCI message 225 is configured to release sets of resources 230, identifying and/or selecting the one or more configurations, identifying the sets of resources 230 to be released, releasing the sets of resources, or any combination thereof. For example, the UE 115-a and/or the base station 105-a may determine that the sets of resources 230 are released based on the DCI message 225, the release configuration (e.g., release configuration indicated in the RRC message 220), the identified and/or selected configurations, the field values (e.g., HPN field values, component carrier field values, CIF values) indicated in the DCI message 225, or any combination thereof.

Techniques described herein may enable multiple a single DCI message to release multiple sets of resources within and/or across multiple component carriers. For example, techniques described herein may enable a single DCI message to release a first set of resources (e.g., SPS grant, CG grant) within a first component carrier at the UE 115, and release a second set of resources (e.g., SPS grant, CG grant) within a second component carrier at the UE 115. By enabling the release of multiple sets of resources within and/or across multiple component carriers, control signaling overhead within the wireless communications system 200 may be reduced, and flexibility of releasing sets of resources may be improved.

Figure 3:
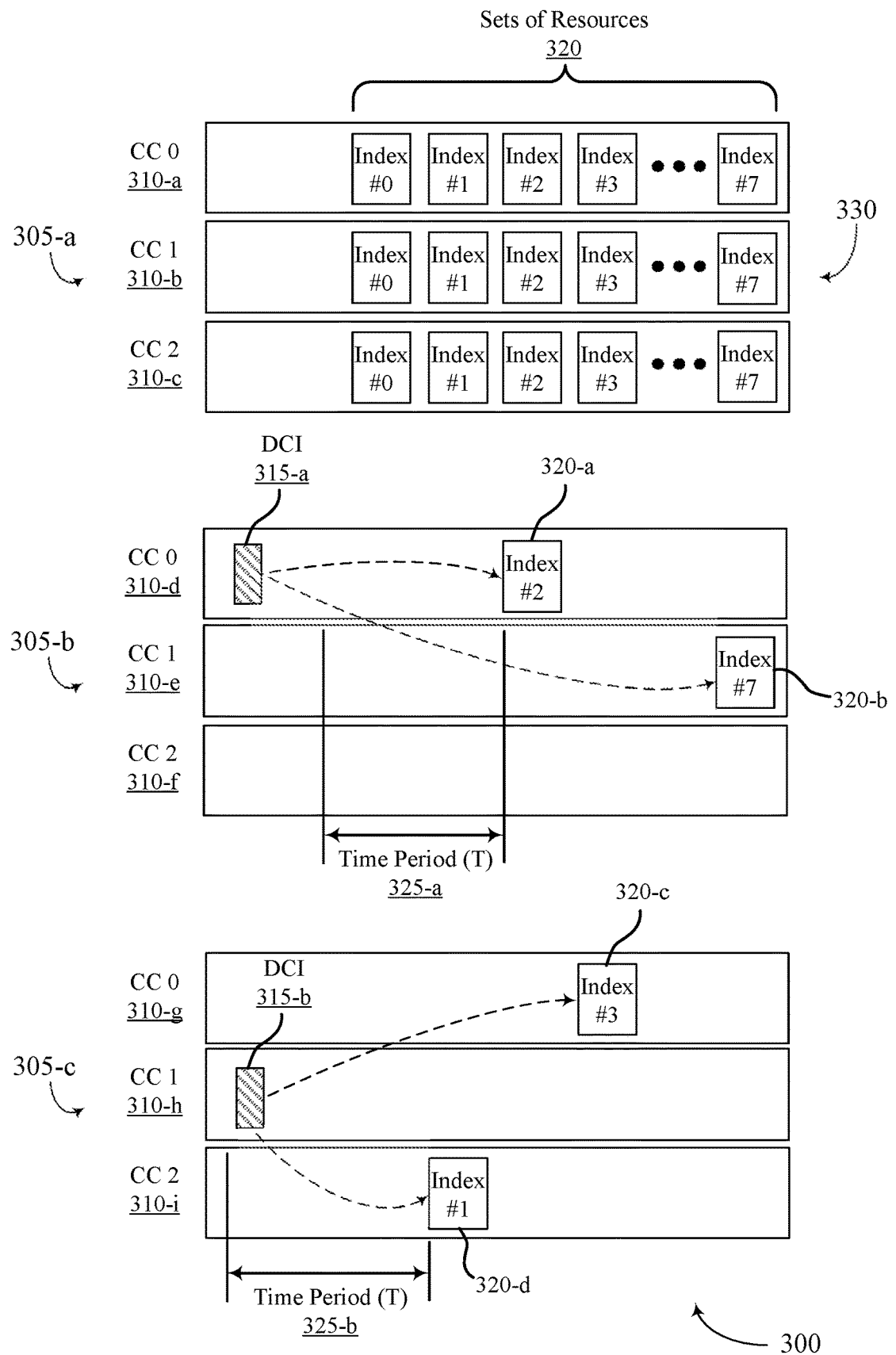
FIG. 3 illustrates an example of a resource allocation scheme that supports techniques for releasing multiple sets of semi-persistent scheduling and configured grant resources in accordance with aspects of the present disclosure.

FIG. 3 illustrates an example of a resource allocation scheme 300 that supports techniques for releasing multiple sets of SPS and CG resources in accordance with aspects of the present disclosure. In some examples, resource allocation scheme 300 may implement aspects of wireless communications system 100 or 200. In some aspects, the resource allocation scheme 300 in FIG. 3 illustrates a first resource configuration 305-a, a second resource configuration 305-b, and a third resource configuration 305-c.

In some cases, a UE 115, a base station 105, or both, may identify a communications configuration for communications between the UE 115 and the base station 105 on a set of (e.g., multiple) component carriers 310. In some aspects, the communications configuration may include at least a first set of resources on the first component carrier 310-a, and a second set of resources on the second component carrier 310-b. For example, referring to resource configuration 305-a, the UE 115 and/or the base station 105 may determine a communications configuration 330, where the communications configuration 330 includes sets of resources across a first component carrier 310-a, a second component carrier 310-b, and a third component carrier 310-c. In some aspects, the sets of resources 320 may include a sets of downlink resources associated with an SPS grant, sets of uplink resources associated with a CG, or any combination thereof.

As noted previously herein, techniques described herein may enable a single DCI message 315 to release multiple sets of resources 320 across multiple component carriers 310. For example, referring to resource configuration 305-b illustrated in FIG. 3, a base station 105 may transmit a DCI message 315-a to a UE 115 over a first component carrier 310-d. In some aspects, the UE 115 may be configured to determine that the DCI message 315-a is configured to release sets of resources, and may be configured to interpret the DCI message 315-a based on a configuration (e.g., table) received from the base station 105. In this regard, UE 115 may be configured to identify and select one or more configurations which will be referenced to determine which sets of resources 320 will be released. The UE 115 may be configured to identify and select one or more configurations which will be referenced to determine which sets of resources will be released based on a component carrier 310 on which the DCI message 315-a was received, field values (e.g., HPN field values, component carrier field values, CIF values) indicated in the DCI message 315-a, or any combination thereof.

Continuing with reference to resource configuration 305-b, in some cases, the UE 115 may identify and utilize a single configuration to identify sets of resources 320 which are to be released. In this regard, the single configuration may be common across all component carriers 310-d, 310-e, and 310-f and BWPs where the sets of resources 320 may be released, and may be referenced regardless of which component carrier 310 the DCI message 315-a is received on. In additional or alternative cases, the UE 115 may identify multiple configurations associated with releasing sets of resources 320. For example, each component carrier 310 of the set of component carriers 310 may include a separate configuration, such that the UE 115 may identify a first configuration associated with the first component carrier 310-d, a second configuration associated with the second component carrier 310-e, and a third configuration associated with the third component carrier 310-f.

Upon identifying the one or more configurations, the UE 115 may select a configuration which will be referenced to identify sets of resources 320 which are to be released. In cases where the UE 115 identifies only a single configuration (e.g., single configuration which is common across all component carriers 310) for releasing resources 320, the UE 115 may select the single configuration. In other cases where the UE 115 identifies multiple configurations for releasing resources 320, the UE 115 may select a configuration from the identified configurations based on the component carrier 310 on which the DCI message 315-a was received, a component carrier field value (e.g., CIF value) indicated in the DCI message 315-a, or both. For example, in some cases, a first configuration may be associated with the first component carrier 310-d, and a second configuration may be associated with the second component carrier 310-e. In this example, the UE 115 may select the first configuration based on receiving the DCI message 315-a on the first component carrier 310-d. By way of another example, the UE 115-a may determine that the DCI message 315-a includes a field value (e.g., CIF value) associated with the given configuration, and may select the given configuration based on the field value.

Upon identifying the configuration and/or release configuration, the UE 115 may identify one or more sets of resources 320 which are to be released. In some aspects, the UE 115 may identify the sets of resources 320 which are to be released based on the selected configuration and one or more field values (e.g., HPN field values, component carrier field values, CIF values) indicated in the DCI message 315-a. For example, the UE 115 may identify one or more sets of resources 320 to be released by referencing the configuration and identifying the sets of resources 320 associated with the mapping pairs corresponding to the HPN field value. For instance, as shown in resource configuration 305-b, the UE 115 may identify, via a configuration, that an HPN field value indicated in the DCI message 315-a is associated with a first mapping pair {CC0, SPS/CG index 2}) and a second mapping pair {CC1, SPS/CG index 7} (e.g., HPN field value={CC0, SPS/CG index 2}, {CC1, SPS/CG index 7}). In this example, the UE 115-a may identify the sets of resources corresponding to the SPS and CG index 2 on CC0 (e.g., first set of resources 320-a) are to be released, and that the sets of resources corresponding to the SPS and CG index 7 on CC1 (e.g., second set of resources 320-b) are to be released.

Accordingly, the UE 115 identify sets of resources 320 to be released on one or multiple component carriers 310 based on a combination of multiple field values (e.g., HPN field values, component carrier field values, CIF values). In other words, multiple sets of resources 320 which are to be released across multiple component carriers 310 may be jointly indicated by multiple field values within the DCI message 315-a. Subsequently, the UE 115 may release the identified sets of resources (e.g., first set of resources 320-a, second set of resources 320-b).

By way of another example, referring to resource configuration 305-c illustrated in FIG. 3, a base station 105 may transmit a DCI message 315-b to a UE 115 over a second component carrier 310-h. In some aspects, the UE 115 may be configured to determine that the DCI message 315-b is configured to release sets of resources, and may be configured to interpret the DCI message 315-b based on a configuration (e.g., tables) received from the base station 105. In some aspects, the UE 115 may be configured to identify and select one or more configurations which will be referenced to determine which sets of resources 320 will be released based on a component carrier 310 on which the DCI message 315-b was received, field values (e.g., HPN field values, component carrier field values, CIF values) indicated in the DCI message 315-b, or any combination thereof.

Continuing with reference to resource configuration 305-c, in some cases, the UE 115 may identify and utilize a single configuration to identify sets of resources 320 which are to be released. In this regard, the single configuration may be common across all component carriers 310-a, 310-b, and 310-c and BWPs where the sets of resources 320 may be released, and may be referenced regardless of which component carrier 310 the DCI message 315-a is received on. In additional or alternative cases, the UE 115 may identify multiple configurations associated with releasing sets of resources 320. For example, each component carrier 310 of the set of component carriers 310 may include a separate configuration, such that the UE 115 may identify a first configuration associated with the first component carrier 310-g, a second configuration associated with the second component carrier 310-h, and a third configuration associated with the third component carrier 310-i.

Upon identifying the one or more configurations, the UE 115 may select a configuration which will be referenced to identify sets of resources 320 which are to be released. The UE 115 may select a configuration from the identified configurations based on the component carrier 310 on which the DCI message 315-b was received, a component carrier field value (e.g., CIF value) indicated in the DCI message 315-b, or both. For example, in some cases, a first configuration may be associated with the first component carrier 310-g, and a second configuration may be associated with the second component carrier 310-h. In this example, the UE 115 may select the second configuration based on receiving the DCI message 315-b on the second component carrier 310-h. By way of another example, the UE 115 may determine that the DCI message 315-b includes a field value (e.g., CIF value) associated with the given configuration, and may select the given configuration based on the field value.

Upon identifying the configuration and/or release configuration, the UE 115 may identify one or more sets of resources 320 which are to be released. In some aspects, the UE 115 may identify the sets of resources 320 which are to be released based on the selected configuration and one or more field values (e.g., HPN field values, component carrier field values, CIF values) indicated in the DCI message 315-b. For example, the UE 115 may identify one or more sets of resources 320 to be released by referencing the configuration and identifying the sets of resources 320 associated with the mapping pairs corresponding to the HPN field value. For instance, as shown in resource configuration 305-c, the UE 115 may identify, via a configuration, that an HPN field value indicated in the DCI message 315-b is associated with a first mapping pair {CC0, SPS/CG index 3}) and a second mapping pair {CC2, SPS/CG index 1} (e.g., HPN field value={CC0, SPS/CG index 3}, {CC2, SPS/CG index 1}). In this example, the UE 115 may identify the set of resources corresponding to the SPS and CG index 3 on CC0 (e.g., first set of resources 320-c) are to be released, and that the set of resources corresponding to the SPS and CG index 1 on CC2 (e.g., second set of resources 320-d) are to be released.

As noted previously herein, the UE 115 may release the sets of resources 320 based on a time at which a DCI message 315 indicating the release of the sets of resources 320 was received. In particular, the UE 115 may not expect to receive a DCI message 315 releasing a set of resources 320 immediately preceding the set of resources 320. Moreover, even if the UE 115 receives the DCI message 315 before the set of resources 320 which are to be released, the UE 115 may be unable to perform the necessary processing to successfully release the set of resources 320 before using the set of resources 230. In this regard, the UE 115 may release the sets of resources 320 based on receiving the DCI message 315 indicating the release within a time period which allows the UE 115 to successfully release the sets of resources 320.

For example, referring to resource configuration 305-b, the UE 115 may identify that the DCI message 315-a indicates the release of the first set of resources 320-a on the first component carrier 310-d and the second set of resources 320-b on the second component carrier 310-e. In this example, the UE 115 may identify a time period 325-a in which the first set of resources 320-a, the second set of resources 320-b, or both, may not be released. In some aspects, the time period 325-a may include a quantity of symbols preceding the first set of resources 320-a, the second set of resources 320-*b*, or both. For instance, in cases where the first set of resources 320-*a* comes before the second set of resources 320-*b* in the time domain, the time period 325-*a* may include a quantity of symbols preceding the first set of resources 320-*a*. In this example illustrated in resource configuration 305-*b*, the UE 115 may release the first set of resources 320-*a* and the second set of resources 320-*b* based on receiving the DCI message 315-*a* outside of (e.g., prior to) the time period 325-*a*.

As noted previously herein, the time period 325-*a* may be based on an SCS associated with the first set of resources 320-*a*, an SCS associated with the second set of resources 320-*b*, an SCS associated with the first component carrier 310-*d* and/or the second component carrier 310-*e*, an SCS of the component carrier 310 on which the DCI message 315-*a* was received, or any combination thereof. In some cases, the UE 115 may determine a single time period 35-*a* for the identified sets of resources 320 which are to be released. Additionally or alternatively, the UE 115 may determine a separate time period 325 for each respective set of resources 320 which are to be released (e.g., a first time period 325 for the first set of resources 320-*a*, a second time period 325 for the second set of resources 320-*b*).

Similarly, referring to resource configuration 305-*c*, the UE 115 may identify that the DCI message 315-*b* indicates the release of the first set of resources 320-*c* on the first component carrier 310-*g* and the second set of resources 320-*d* on the third component carrier 310-*i*. In this example, the UE 115 may identify a time period 325-*b* in which the first set of resources 320-*c*, the second set of resources 320-, or both, may not be released. In some aspects, the time period 325-*a* may include a quantity of symbols preceding the first set of resources 320-*a*, the second set of resources 320-*b*, or both. In this example illustrated in resource configuration 305-*c*, the UE 115 may refrain from releasing the first set of resources 320-*a* and the second set of resources 320-*b* based on receiving the DCI message 315-*a* within of the time period 325-*a*.

The resource configurations 305-*a*, 305-*b*, and 305-*c* described herein may enable multiple a single DCI message 315 to release multiple sets of resources 320 within and/or across multiple component carriers 310. For example, techniques described herein may enable a single DCI message 315-*a* to release a first set of resources 320-*a* (e.g., SPS grant, CG grant) within a first component carrier 310-*d* at the UE 115, and release a second set of resources 320-*b* (e.g., SPS grant, CG grant) within a second component carrier 310-*e* at the UE 115. By enabling the release of multiple sets of resources 320 within and/or across multiple component carriers 310, control signaling overhead within the wireless communications system 100 and 200 may be reduced, and flexibility of releasing sets of resources 320 may be improved.

Figure 4:
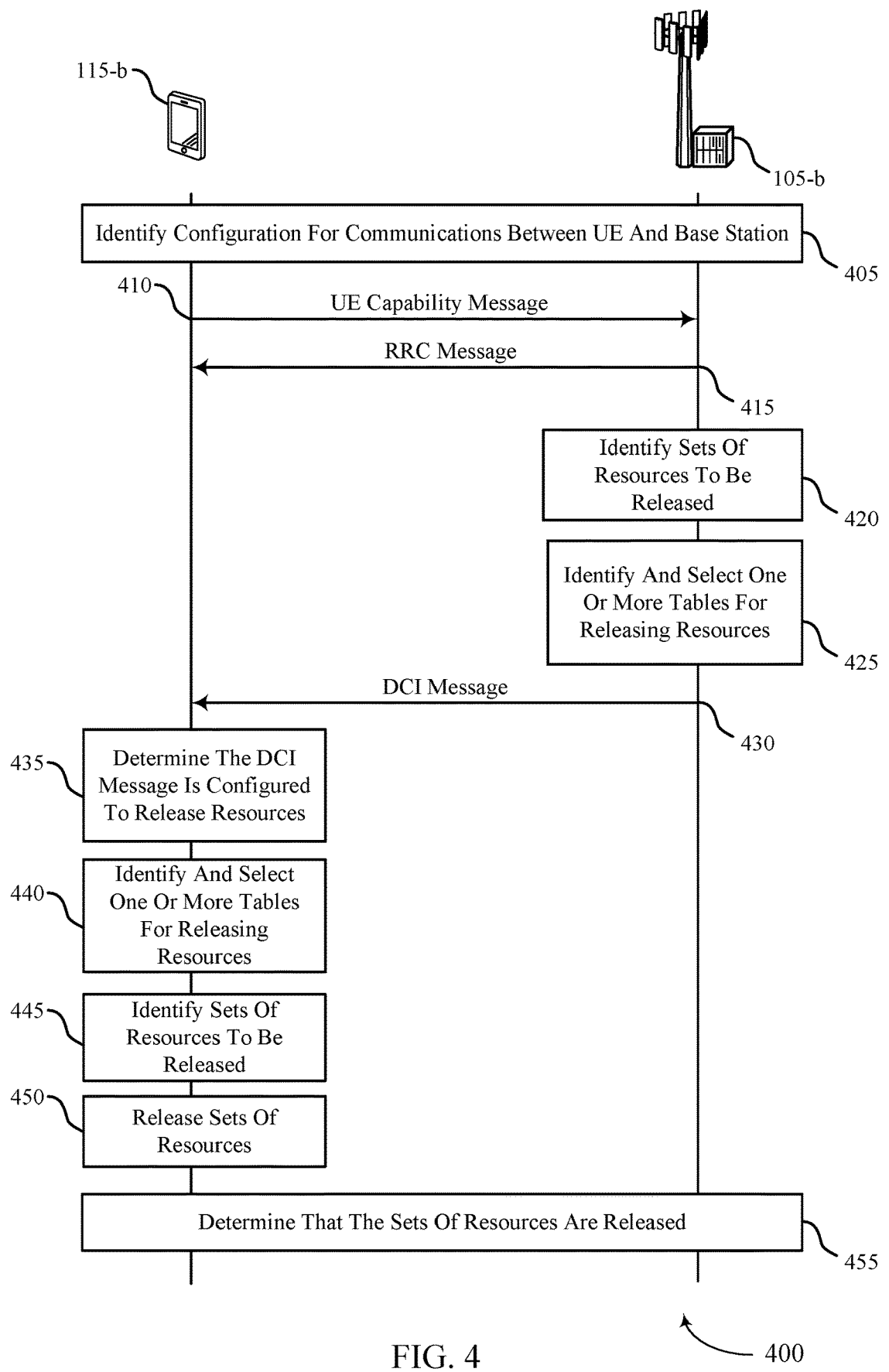
FIG. 4 illustrates an example of a process flow that supports techniques for releasing multiple sets of semi-persistent scheduling and configured grant resources in accordance with aspects of the present disclosure.

FIG. 4 illustrates an example of a process flow 400 that supports techniques for releasing multiple sets of SPS and CG resources in accordance with aspects of the present disclosure. In some examples, process flow 400 may implement, or be implemented by, aspects of wireless communications system 100 or 200, resource allocation scheme 300, or any combination thereof. The process flow 400 may illustrate receiving a DCI, determining the DCI message is configured for releasing sets of resources, identifying sets of resources to be released, and determining the sets of resources are released, as described with reference to FIGS. 1-5, among other aspects.

In some aspects, process flow 400 may include a UE 115-*b* and a base station 105-*b* which may be examples of corresponding devices as described herein. The UE 115-*b* illustrated in FIG. 4 may be an example of the UE 115-*a* illustrated in FIG. 2. Similarly, the base station 105-*b* illustrated in FIG. 4 may be an example of the base station 105-*a* illustrated in FIG. 2.

In some aspects, the operations illustrated in process flow 400 may be performed by hardware (e.g., including circuitry, processing blocks, logic components, and other components), code (e.g., software or firmware) executed by a processor, or any combination thereof. Alternative examples of the following may be implemented, where some steps are performed in a different order than described or are not performed at all. In some cases, steps may include additional features not mentioned below, or further steps may be added.

At 405, the UE 115-*b*, the base station 105-*b*, or both, may identify a communications configuration for communications between the UE 115-*b* and the base station 105-*b* on a set of (e.g., multiple) component carriers. In this regard, the communications configuration may include at least a first set of resources on a first component carrier of the set of component carriers, and a second set of resources on a second component carrier of the set of component carriers. In some aspects, the first set of resources, the second set of resources, or both, may include a set of downlink resources associated with an SPS grant, a set of uplink resources associated with a CG, or any combination thereof. In this regard the first and second sets of resources may include sets of time resources and sets of frequency resources for communications between the UE 115-*b* and the base station 105-*b*.

At 410, the UE 115-*b* may transmit a UE capability message to the base station 105-*b*. In some aspects, the UE capability message may indicate that the UE 115-*b* is configured to release two or more sets of resources via a single DCI message. Additionally or alternatively, the UE capability message may indicate that the UE 115-*b* is configured to release two or more sets of resources across multiple component carriers via a single DCI message. In some cases, the UE 115-*b* may transmit the UE capability message based on identifying the communications configuration for communications between the UE 115-*b* and the base station 105-*b* at 405.

At 415, the base station 105-*b* may transmit an RRC message to the UE 115-*b*. In some aspects, the base station 105-*b* may transmit the RRC message to the UE 115-*b* based on identifying the communications configuration for communications between the UE 115-*b* and the base station 105-*b* at 405, receiving the UE capability message at 410, or both.

In some aspects, the RRC message may indicate, to the UE 115-*b*, how the UE 115-*b* is to interpret DCI messages received from the base station 105-*b* which are configured to release sets of resources. In this regard, the RRC message may include an indication of a release configuration for interpreting DCI messages for releasing sets of resources. The release configuration may indicate sets of mapping pairs, where each mapping pair of the release configuration may include (e.g., identify, indicate) a component carrier and a resource for communications between the UE 115-*b* and the base station 105-*b*. For example, a first mapping pair may include {CC1, SPS index}, where the first mapping pair indicates an association between a first component carrier (CC1) and an index associated with an SPS grant on the first component carrier. By way of another example, a second mapping pair may include {CC2, CG index}, where the second mapping pair indicates an association between a second component carrier (CC2) and an index associated with a CG on the second component carrier.

In some aspects, the release configuration may include one or more configurations associated with releasing resources. In some aspects, each configuration may include associations between one or more field values (e.g., HPN field values, component carrier field values, CIF values) of DCI messages and the mapping pairs. For example, a configuration may include associations between HPN field values and one or more mapping pairs. For instance, a configuration may indicate that a first HPN field value is associated with a single mapping pair (e.g., HPN field value 1={CC1, SPS index}), and a second HPN field value is associated with two mapping pairs (e.g., e.g., HPN field value 2={CC1, SPS index}, {CC2, CG index}). The release configuration may include any number of configurations, where each configuration may indicate any number of associations between field values and mapping pairs.

At 420, the base station 105-b may identify one or more sets of resources which are to be released. In some aspects, the base station 105-b may identify the sets of resources which are to be released based on identifying the communications configuration for communications between the UE 115-b and the base station 105-b at 405.

At 435, the base station 105-b may identify one or more configurations for releasing sets of resources. In some aspects, the base station 105-b, may identify the one or more configurations for releasing sets of resources based on identifying the communications configuration for communications between the UE 115-b and the base station 105-b at 405, receiving the UE capability message at 410, transmitting the RRC message at 415, receiving the DCI message at 420, determining the DCI message is configured to release resources at 425, validating that the DCI message is configured to release resources at 430, or any combination thereof. Additionally, the base station 105-b may select one or more configurations which will be referenced by the UE 115-b to identify sets of resources which are to be released. In some aspects, the base station 105-b may select the one or more configurations based on a component carrier on which the DCI message will be transmitted, field values indicated in the DCI message, or any combination thereof.

At 430, the base station 105-b may transmit a DCI message to the UE 115-b. The base station 105-b may transmit the DCI message on a component carrier of the set of component carriers at the UE 115-b. For example, the base station 105-b may transmit the DCI message on a first component carrier of the UE 115-b. In some aspects, the base station 105-b may transmit the DCI message based on identifying the communications configuration for communications between the UE 115-b and the base station 105-b at 405, receiving the UE capability message at 410, transmitting the RRC message at 415, identifying the sets of resources to be released at 420, identifying and/or selecting the one or more configurations at 425, or any combination thereof.

In some aspects, the DCI message may include one or more field values indicating that the UE 115-b is to release one or more sets of resources. For example, in cases where the configuration identified at 405 includes a first set of resources on a first component carrier and a second set of resources on a second component carrier, the DCI message may include on or more field values indicating that the UE 115-b is to release the first and second sets of resources. The one or more field values indicating that the UE 115-b is to release resources may include, but are not limited to, HPN field values, CIF values, or both. Moreover, in some aspects, the one or more field values may be associated with field values indicated in the one or more configurations of the release configuration. In this regard, the one or more field values indicated in the DCI message may be used to reference the one or more configurations of the resource configuration to identify sets of resources which are to be released.

At 435, the UE 115-b, the base station 105-b, or both, may determine that the DCI message transmitted/received at 430 is configured to release one or more sets of resources. In some aspects, the UE 115-b and/or the base station 105-b may determine that the DCI message is configured to release sets of resources based on an NDI field of the DCI message, based on whether at least a portion of the DCI message was scrambled according to CS-RNTI, or any combination thereof. For example, in some cases, a first value of the NDI field (e.g., NDI=0) within the DCI message may indicate that the DCI message is configured for release and/or activation of sets of resources (e.g., release and/or activation of SPS grants and/or CGs), and a second value of the NDI field (e.g., NDI=1) within the DCI message may indicate that the DCI message is configured for scheduling transmissions or re-transmissions of resources (e.g., scheduling re-transmissions of SPS grants and/or CGs). In this example, the UE 115-b and/or the base station 105-b may determine that the DCI message received at 420 is configured to release resources based on the NDI field of the DCI message indicating the first value (e.g., NDI=0).

In some aspects, the UE 115-b may validate (e.g., determine, confirm) that the DCI message received at 420 is configured for releasing sets of resources. In some aspects, the UE 115-b may validate that the DCI message is configured for releasing sets of resources based on determining that the DCI message is configured to release sets of resources at 435.

In some aspects, the UE 115-b may validate (e.g., determine) that the DCI message is configured for releasing sets of resources based on values (e.g., bit values) of fields within the DCI message (e.g., RV field, MCS field, FDRA field, or any combination thereof). Additionally or alternatively, the UE 115-b may validate that the DCI message is configured for releasing sets of resources based on types of FDRA fields within the DCI message. For example, the UE 115-b may determine FDRA field values, types of FDRA fields, or both, associated with each of the first component carrier and the second component carrier, and may validate that the DCI message is configured for releasing sets of resources based on the determined FDRA field values and the determined types of FDRA fields.

At 440, the UE 115-b, may identify and select one or more configurations for releasing sets of resources. In some aspects, the UE 115-b may identify and select the one or more configurations for releasing sets of resources based on identifying the communications configuration for communications between the UE 115-b and the base station 105-b at 405, transmitting the UE capability message at 410, receiving the RRC message at 415, receiving the DCI message at 430, determining the DCI message is configured to release resources at 435, validating that the DCI message is configured to release resources, or any combination thereof. For example, the UE 115-b may identify one or more configurations associated with releasing sets of resources based on a release configuration received from the base station 105-b (e.g., release configuration indicated in the RRC message).

As noted previously herein, each configuration may include associations between one or more field values (e.g., HPN field values, component carrier field values, CIF values) of DCI messages and the mapping pairs. In this regard, the UE 115-*b*, the base station 105-*b*, or both, may identify and reference the one or more configurations to determine which sets of resources are to be released. In some cases, the UE 115-*b* and/or the base station 105-*b* may identify and utilize a single configuration to identify sets of resources which are to be released. In this regard, the single configuration may be common across all component carriers and BWPs where the resources may be released, and may be referenced regardless of which component carrier the DCI message is received on. In additional or alternative cases, the UE 115-*b* and/or the base station 105-*b* may identify multiple configurations associated with releasing resources. For example, each component carrier of the set of component carriers may include a separate configuration, such that the UE 115-*b* may identify a first configuration associated with the first component carrier and a second configuration associated with the second component carrier.

In some aspects, may select a configuration which will be referenced to identify sets of resources which are to be released. In some aspects, the UE 115-*b* may select the one or more configurations for releasing sets of resources based on identifying the communications configuration for communications between the UE 115-*b* and the base station 105-*b* at 405, transmitting the UE capability message at 410, receiving the RRC message at 415, receiving the DCI message at 430, determining the DCI message is configured to release resources at 435, validating that the DCI message is configured to release resources, identifying the one or more configurations at 440, or any combination thereof.

In cases where the UE 115-*b* and/or the base station 105-*b* identify only a single configuration at 440 (e.g., single configuration which is common across all component carriers), the UE 115-*b* and/or the base station 105-*b* may select the single configuration at 445. In other cases where the UE 115-*b* and/or the base station 105-*b* identify multiple configurations at 440, the UE 115-*b* and/or the base station 105-*b* may select a configuration from the identified configurations based on the component carrier on which the DCI message was received, a component carrier field value (e.g., CIF value) indicated in the DCI message, or both. For example, in some cases, a first configuration may be associated with the first component carrier, and a second configuration may be associated with the second component carrier. In this example, the UE 115-*b* may select the first configuration at 440 in cases where the DCI message is received on the first component carrier, and may select the second configuration in cases where the DCI message is received on the second component carrier.

Additionally or alternatively, each identified configuration may be associated with a different component carrier field value (e.g., CIF value). For example, in some cases, a first configuration may be associated with a first component carrier field value, and a second configuration may be associated with a second component carrier field value. In this example, the UE 115-*b* may select the first configuration at 440 in cases where the DCI message indicates the first component carrier field value, and may select the second configuration in cases where the DCI message indicates the second component carrier field value. In this example, the one or more field values indicated in the DCI message may include the one or more component carrier field values (e.g., CIF values).

At 445, the UE 115-*b*, the base station 105-*b*, or both, may identify one or more sets of resources which are to be released. In some aspects, the UE 115-*b*, the base station 105-*b*, or both, may identify the one or more sets of resources which are to be released based on identifying the communications configuration for communications between the UE 115-*b* and the base station 105-*b* at 405, transmitting the UE capability message at 410, receiving the RRC message at 415, receiving the DCI message at 420, determining the DCI message is configured to release resources at 425, validating that the DCI message is configured to release resources at 430, identifying the one or more configurations at 435, selecting the configuration at 440, or any combination thereof.

In some aspects, the UE 115-*b* and/or the base station 105-*b* may identify the sets of resources which are to be released based on the selected configuration and one or more field values (e.g., HPN field values, component carrier field values, CIF values) indicated in the DCI message. For example, in cases where the UE 115-*b* selects a configuration including associations between HPN field values and mapping pairs, the UE 115-*b* may identify one or more sets of resources to be released by referencing the configuration and identifying the sets of resources associated with the mapping pairs corresponding to the HPN field value. For instance, the UE 115-*b* may identify the DCI message includes a HPN field value of 10, and may reference the selected configuration to determine the HPN field value of 10 is associated with two mapping pairs: {CC1, SPS index 4}, {CC2, CG index 3} (e.g., HPN field value 10={CC1, SPS index}, {CC2, CG index}). In this example, the UE 115-*b* may identify the sets of resources corresponding to the SPS index 4 on CC1 and the CG index 3 on CC2 are to be released.

By way of another example, the UE 115-*b* and/or the base station 105-*b* may identify sets of resources to be released based on multiple field values. For example, the DCI message received at 420 may include a component carrier field value (e.g., CIF value) and a second field value (e.g., HPN field value). In this example, the component carrier field value (e.g., CIF value) may be associated with the first component carrier and the second component carrier, and the second field value may be associated with one or more sets of resources (e.g., second field value={SPS index 2}, {CG index 7}). These associations may be indicated in one or more configurations. In this example, the UE 115-*b* may identify the first component carrier and the second component carrier based on the component carrier field value; and may identify a first set of resources (e.g., {SPS index 2}) and the second set of resources (e.g., {CG index 7}) based on the second field value. In this regard, the UE 115-*b* may determine that the sets of resources associated with {SPS index 2} and {CG index 7} are to be released on the first component carrier and the second component carrier.

Accordingly, the UE 115-*b* and/or the base station 105-*b* may identify sets of resources to be released on one or multiple component carriers based on a combination of multiple field values (e.g., HPN field values, component carrier field values, CIF values). In other words, multiple sets of resources which are to be released across multiple component carriers may be jointly indicated by multiple field values.

At 450, the UE 115-*b* may release the sets of resources. In this regard, the UE 115-*b* may release the sets of resources based on identifying the communications configuration for communications between the UE 115-*b* and the base station 105-*b* at 405, transmitting the UE capability message at 410, receiving the RRC message at 415, receiving the DCI message at 420, determining the DCI message is configured to release resources at 425, validating that the DCI message is configured to release resources at 430, identifying the one or more configurations at 435, selecting the configuration at 440, identifying the sets of resources at 445, or any combination thereof. In some aspects, the UE 115-*b* may release the sets of resources by refraining from using the sets of resources. In some aspects, the UE 115-*b* may transmit an uplink transmission (e.g., acknowledgement message) to the base station 105-*b* indicating that the sets of resources have been released.

At 455, the UE 115-*b*, the base station 105-*b*, or both, may determine that the sets of resources are released. In some aspects, the UE 115-*b*, the base station 105-*b*, or both, may determine that the sets of resources are released based on identifying the communications configuration for communications between the UE 115-*b* and the base station 105-*b* at 405, transmitting the UE capability message at 410, receiving the RRC message at 415, receiving the DCI message at 420, determining the DCI message is configured to release resources at 425, validating that the DCI message is configured to release resources at 430, identifying the one or more configurations at 435, selecting the configuration at 440, identifying the sets of resources to be released at 445, releasing the sets of resources at 450, or any combination thereof.

For example, the UE 115-*b* and/or the base station 105-*b* may determine that the sets of resources are released based on the DCI message, the release configuration (e.g., release configuration indicated in the RRC message), the identified and/or selected configurations, the field values (e.g., HPN field values, component carrier field values, CIF values) indicated in the DCI message, or any combination thereof.

Techniques described herein may enable multiple a single DCI message to release multiple sets of resources within and/or across multiple component carriers. For example, techniques described herein may enable a single DCI message to release a first set of resources (e.g., SPS grant, CG grant) within a first component carrier at the UE 115, and release a second set of resources (e.g., SPS grant, CG grant) within a second component carrier at the UE 115. By enabling the release of multiple sets of resources within and/or across multiple component carriers, control signaling overhead within the wireless communications system 100 and 200 may be reduced, and flexibility of releasing sets of resources may be improved.

Figure 5:
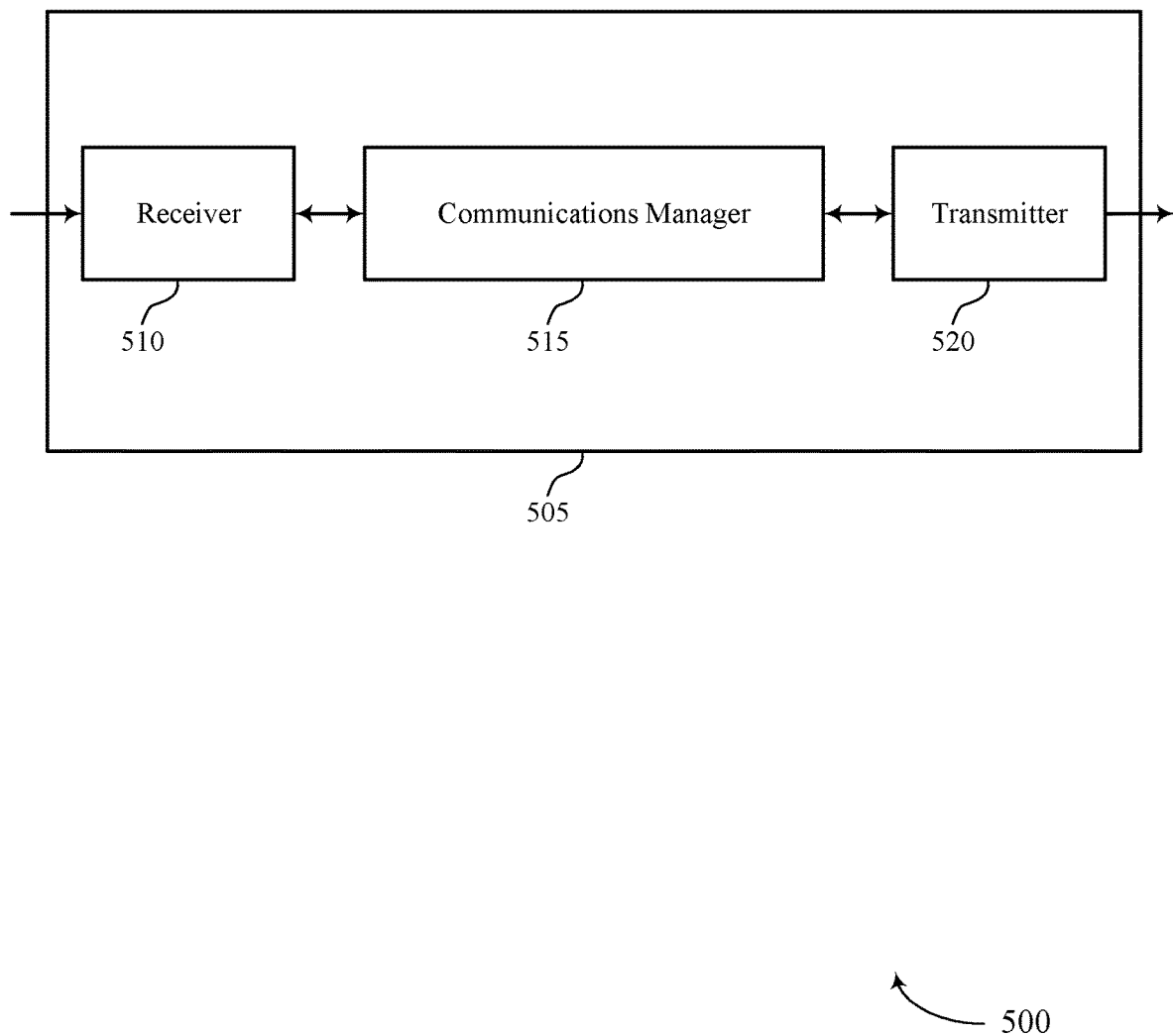
FIGS. 5 and 6 show block diagrams of devices that support techniques for releasing multiple sets of semi-persistent scheduling and configured grant resources in accordance with aspects of the present disclosure.

FIG. 5 shows a block diagram 500 of a device 505 that supports techniques for releasing multiple sets of SPS and CG resources in accordance with aspects of the present disclosure. The device 505 may be an example of aspects of a UE 115 as described herein. The device 505 may include a receiver 510, a communications manager 515, and a transmitter 520. The device 505 may also include one or more processors, memory coupled with the one or more processors, and instructions stored in the memory that are executable by the one or more processors to enable the one or more processors to perform activation and release of resources across multiple component carriers discussed herein. Each of these components may be in communication with one another (e.g., via one or more buses).

The receiver 510 may receive information such as packets, user data, or control information associated with various information channels (e.g., control channels, data channels, and information related to techniques for releasing multiple sets of SPS and CG resources, etc.). Information may be passed on to other components of the device 505. The receiver 510 may be an example of aspects of the transceiver 820 described with reference to FIG. 8. The receiver 510 may utilize a single antenna or a set of antennas.

The communications manager 515 may identify a communications configuration for a set of component carriers, the communications configuration including at least a first set of resources on a first component carrier of the set of component carriers and a second set of resources on a second component carrier of the set of component carriers, receive, from a base station, a DCI message on the first component carrier, the DCI message including one or more field values indicating that the UE is to release a plurality of sets of resources on multiple component carriers, including at least the first set of resources on the first component carrier and the second set of resources on the second component carrier, and determine, based on the received DCI message, that the first set of resources and the second set of resources are released. The communications manager 515 may be an example of aspects of the communications manager 810 described herein.

The actions performed by the communications manager 515 as described herein may be implemented to realize one or more potential advantages. For example, releasing multiple sets of resources across multiple component carriers may reduce control signaling within a wireless communications system, thereby alleviating network overhead. Moreover, by reducing the quantity of DCI messages used to release resources, power consumption of the UE 115 may be reduced.

Based on releasing multiple sets of resources across multiple component carriers via a single DCI message, a processor of the UE 115 (e.g., a processor controlling the receiver 510, the communications manager 515, the transmitter 520, etc.) may reduce processing resources used for wireless communications. For example, by releasing multiple sets of resources via a single DCI message, the UE 115 may reduce a number of times the processor ramps up processing power and turns on processing units to handle downlink reception of DCI messages.

The communications manager 515, or its sub-components, may be implemented in hardware, code (e.g., software or firmware) executed by a processor, or any combination thereof. If implemented in code executed by a processor, the functions of the communications manager 515, or its sub-components may be executed by a general-purpose processor, a digital signal processor (DSP), an application-specific integrated circuit (ASIC), a field-programmable gate array (FPGA) or other programmable logic device, discrete gate or transistor logic, discrete hardware components, or any combination thereof designed to perform the functions described in the present disclosure.

The communications manager 515, or its sub-components, may be physically located at various positions, including being distributed such that portions of functions are implemented at different physical locations by one or more physical components. In some examples, the communications manager 515, or its sub-components, may be a separate and distinct component in accordance with various aspects of the present disclosure. In some examples, the communications manager 515, or its sub-components, may be combined with one or more other hardware components, including but not limited to an input/output (I/O) component, a transceiver, a network server, another computing device, one or more other components described in the present disclosure, or a combination thereof in accordance with various aspects of the present disclosure.

The transmitter 520 may transmit signals generated by other components of the device 505. In some examples, the transmitter 520 may be collocated with a receiver 510 in a transceiver module. For example, the transmitter 520 may be an example of aspects of the transceiver 820 described with reference to FIG. 8. The transmitter 520 may utilize a single antenna or a set of antennas.

Figure 6:
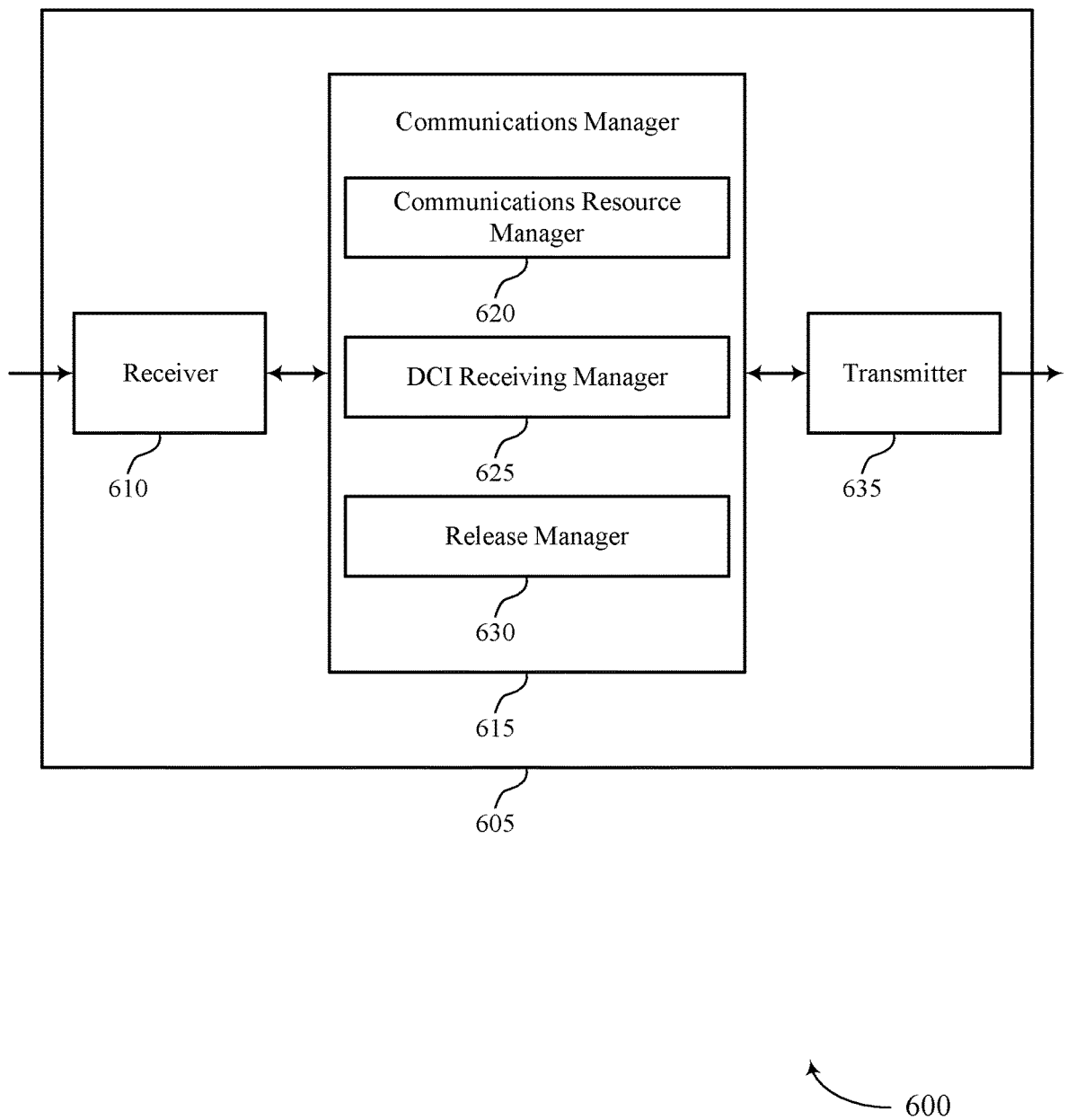

FIG. 6 shows a block diagram 600 of a device 605 that supports techniques for releasing multiple sets of SPS and CG resources in accordance with aspects of the present disclosure. The device 605 may be an example of aspects of a device 505, or a UE 115 as described herein. The device 605 may include a receiver 610, a communications manager 615, and a transmitter 635. The device 605 may also include a processor. Each of these components may be in communication with one another (e.g., via one or more buses).

The receiver 610 may receive information such as packets, user data, or control information associated with various information channels (e.g., control channels, data channels, and information related to techniques for releasing multiple sets of SPS and CG resources, etc.). Information may be passed on to other components of the device 605. The receiver 610 may be an example of aspects of the transceiver 820 described with reference to FIG. 8. The receiver 610 may utilize a single antenna or a set of antennas.

The communications manager 615 may be an example of aspects of the communications manager 515 as described herein. The communications manager 615 may include a communications resource manager 620, a DCI receiving manager 625, and a release manager 630. The communications manager 615 may be an example of aspects of the communications manager 810 described herein.

The communications resource manager 620 may identify a communications configuration for a set of component carriers, the communications configuration including at least a first set of resources on a first component carrier of the set of component carriers and a second set of resources on a second component carrier of the set of component carriers.

The DCI receiving manager 625 may receive, from a base station, a DCI message on the first component carrier, the DCI message including one or more field values indicating that the UE is to release a plurality of sets of resources on multiple component carriers, including at least the first set of resources on the first component carrier and the second set of resources on the second component carrier.

The release manager 630 may determine, based on the received DCI message, that the first set of resources and the second set of resources are released.

The transmitter 635 may transmit signals generated by other components of the device 605. In some examples, the transmitter 635 may be collocated with a receiver 610 in a transceiver module. For example, the transmitter 635 may be an example of aspects of the transceiver 820 described with reference to FIG. 8. The transmitter 635 may utilize a single antenna or a set of antennas.

In some cases, the communications resource manager 620, the DCI receiving manager 625, and the release manager 630 may each be or be at least a part of a processor (e.g., a transceiver processor, or a radio processor, or a transmitter processor, or a receiver processor). The processor may be coupled with memory and execute instructions stored in the memory that enable the processor to perform or facilitate the features of communications resource manager 620, the DCI receiving manager 625, and the release manager 630 discussed herein. A transceiver processor may be collocated with and/or communicate with (e.g., direct the operations of) a transceiver of the device. A radio processor may be collocated with and/or communicate with (e.g., direct the operations of) a radio (e.g., an NR radio, an LTE radio, a Wi-Fi radio) of the device. A transmitter processor may be collocated with and/or communicate with (e.g., direct the operations of) a transmitter of the device. A receiver processor may be collocated with and/or communicate with (e.g., direct the operations of) a receiver of the device.

Figure 7:
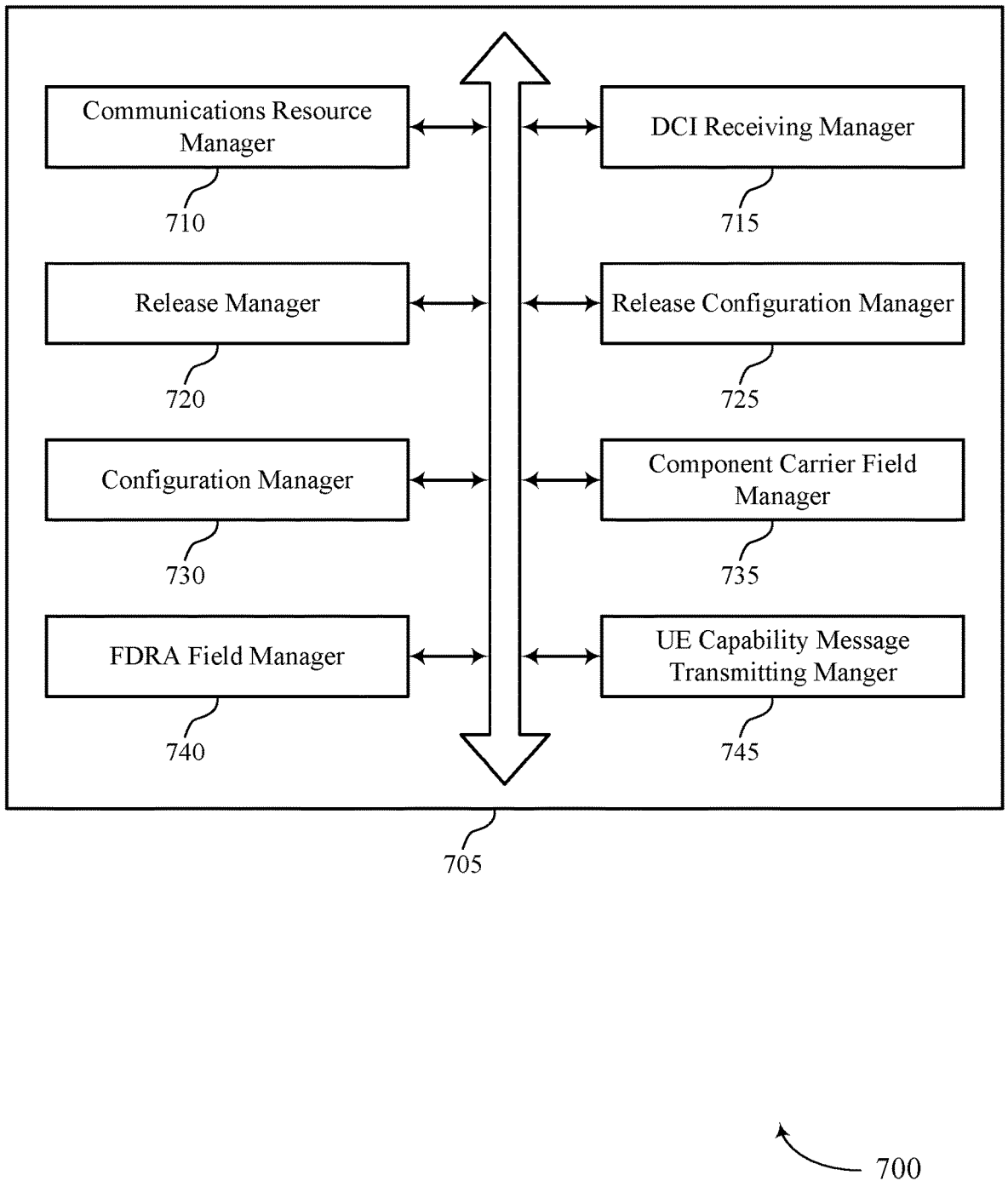
FIG. 7 shows a block diagram of a communications manager that supports techniques for releasing multiple sets of semi-persistent scheduling and configured grant resources in accordance with aspects of the present disclosure.

FIG. 7 shows a block diagram 700 of a communications manager 705 that supports techniques for releasing multiple sets of SPS and CG resources in accordance with aspects of the present disclosure. The communications manager 705 may be an example of aspects of a communications manager 515, a communications manager 615, or a communications manager 810 described herein. The communications manager 705 may include a communications resource manager 710, a DCI receiving manager 715, a release manager 720, a release configuration manager 725, a configuration manager 730, a component carrier field manager 735, an FDRA field manager 740, and a UE capability message transmitting manager 745. Each of these modules may communicate, directly or indirectly, with one another (e.g., via one or more buses).

The communications resource manager 710 may identify a communications configuration for a set of component carriers, the communications configuration including at least a first set of resources on a first component carrier of the set of component carriers and a second set of resources on a second component carrier of the set of component carriers. In some examples, the communications resource manager 710 may identify the first set of resources and the second set of resources based on the second field value. In some examples, the communications resource manager 710 may identify the first set of resources on the first component carrier and the second set of resources on the second component carrier based on a combination of the component carrier field value and the second field value. In some cases, the first set of resources and the second set of resources include a set of downlink resources associated with a SPS grant, a set of uplink resources associated with a CG, or a combination thereof.

The DCI receiving manager 715 may receive, from a base station, a DCI message on the first component carrier, the DCI message including one or more field values indicating that the UE is to release a plurality of sets of resources on multiple component carriers, including at least the first set of resources on the first component carrier and the second set of resources on the second component carrier. In some examples, the DCI receiving manager 715 may determine a time period within which the first set of resources, the second set of resources, or both, may be not released based on a subcarrier spacing associated with the first set of resources, a subcarrier spacing associated with the second set of resources, a subcarrier spacing of the first component carrier, a subcarrier spacing of the second component carrier, or any combination thereof, where determining that the first set of resources and the second set of resources are released is based on receiving the DCI message outside of the time period. In some cases, a format of the DCI message is associated with cross-carrier scheduling. In some cases, the time period includes a quantity of symbols preceding the first set of resources, the second set of resources, or both.

The release manager 720 may determine, based on the received DCI message, that the first set of resources and the second set of resources are released. In some examples, the release manager 720 may determine that the first set of resources and the second set of resources are released based on a bit value of an RV field of the DCI message, an MCS field of the DCI message, an FDRA field of the DCI message, or any combination thereof. In some examples, the release manager 720 may determine that the first set of resources and the second set of resources are released based on a value of the first frequency domain resource assignment field, a value of the second frequency domain resource assignment field, or both, including a first value. In some examples, the release manager 720 may determine that the first set of resources and the second set of resources are released based on the value of the first frequency domain resource assignment field and the value of the second frequency domain resource assignment field including the first value. In some examples, the release manager 720 may determine that the DCI message is configured to release one or more sets of resources based on a new data indicator field of the DCI message, at least a portion of the DCI message being scrambled according to a coding scheme radio network temporary identifier, or both, where determining that the first set of resources and the second set of resources are released is based on determining that the DCI message is configured to release one or more sets of resources.

The release configuration manager 725 may receive, from the base station, a release configuration indicating sets of mapping pairs, each mapping pair identifying a component carrier of the set of component carriers and a resource for communications between the UE and the base station, where determining that the first set of resources and the second set of resources are released is based on the DCI message and the release configuration.

The configuration manager 730 may identify a first configuration including associations between a set of field values for DCI messages and a set of mapping pairs, each mapping pair of the set of mapping pairs identifying a component carrier of the set of component carriers and a resource for communications between the UE and the base station, where determining that the first set of resources and the second set of resources are released is based on the first configuration and the one or more field values of the received DCI message. In some examples, the configuration manager 730 may identify a first configuration for the first component carrier and a second configuration for the second component carrier. In some examples, the configuration manager 730 may select the first configuration based on the DCI message having been received on the first component carrier, where determining that the first set of resources and the second set of resources are released is based on the selected first configuration and the indication of the received DCI message. In some examples, the configuration manager 730 may select the first configuration based on the component carrier field value, where determining that the first set of resources and the second set of resources are released is based on the selected first configuration and the one or more field values. In some cases, the one or more field values include a hybrid automatic repeat request process number field value.

The component carrier field manager 735 may receive a component carrier field value in the DCI message, the one or more field values including the component carrier field value. In some examples, the component carrier field manager 735 may receive a component carrier field value in the DCI message, where determining that the first set of resources and the second set of resources are released is based on the component carrier field value and a second field value, the one or more field values including the component carrier field value and the second field value. In some examples, the component carrier field manager 735 may identify the first component carrier and the second component carrier based on the component carrier field value. In some cases, the component carrier field value includes a carrier indicator field value.

The FDRA field manager 740 may determine that a first frequency domain resource assignment field associated with the first component carrier, a second frequency domain resource assignment field associated with the second component carrier, or both, include a second type of frequency resource assignment field. In some examples, the FDRA field manager 740 may determine that both the first frequency domain resource assignment field and the second frequency domain resource assignment field include the second type of frequency resource assignment field.

The UE capability message transmitting manager 745 may transmit, to the base station, a UE capability message indicating that the UE is configured to release two or more sets of resources via a single downlink control message, where receiving the DCI message is based on transmitting the UE capability message.

In some cases, the communications resource manager 710, the DCI receiving manager 715, the release manager 720, the release configuration manager 725, the configuration manager 730, the component carrier field manager 735, the FDRA field manager 740, and the UE capability message transmitting manager 745 may each be or be at least a part of a processor (e.g., a transceiver processor, or a radio processor, or a transmitter processor, or a receiver processor). The processor may be coupled with memory and execute instructions stored in the memory that enable the processor to perform or facilitate the features of communications resource manager 710, the DCI receiving manager 715, the release manager 720, the release configuration manager 725, the configuration manager 730, the component carrier field manager 735, the FDRA field manager 740, and the UE capability message transmitting manager 745 discussed herein.

Figure 8:
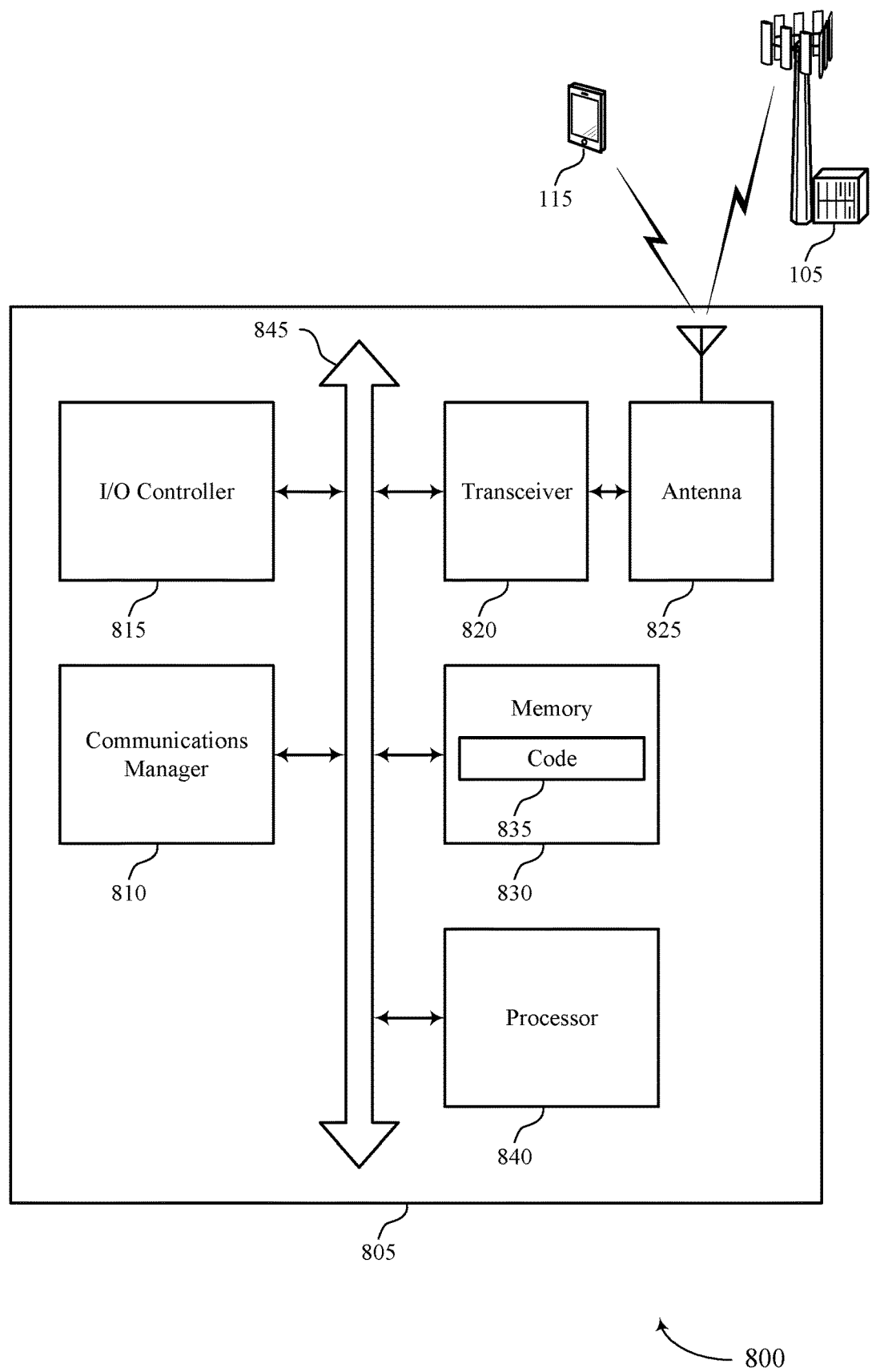
FIG. 8 shows a diagram of a system including a device that supports techniques for releasing multiple sets of semi-persistent scheduling and configured grant resources in accordance with aspects of the present disclosure.

FIG. 8 shows a diagram of a system 800 including a device 805 that supports techniques for releasing multiple sets of SPS and CG resources in accordance with aspects of the present disclosure. The device 805 may be an example of or include the components of device 505, device 605, or a UE 115 as described herein. The device 805 may include components for bi-directional voice and data communications including components for transmitting and receiving communications, including a communications manager 810, an I/O controller 815, a transceiver 820, an antenna 825, memory 830, and a processor 840. These components may be in electronic communication via one or more buses (e.g., bus 845).

The communications manager 810 may identify a communications configuration for a set of component carriers, the communications configuration including at least a first set of resources on a first component carrier of the set of component carriers and a second set of resources on a second component carrier of the set of component carriers, receive, from a base station, a DCI message on the first component carrier, the DCI message including one or more field values indicating that the UE is to release a plurality of sets of resources on multiple component carriers, including at least the first set of resources on the first component carrier and the second set of resources on the second component carrier, and determine, based on the received DCI message, that the first set of resources and the second set of resources are released.

The I/O controller 815 may manage input and output signals for the device 805. The I/O controller 815 may also manage peripherals not integrated into the device 805. In some cases, the I/O controller 815 may represent a physical connection or port to an external peripheral. In some cases, the I/O controller 815 may utilize an operating system such as iOS®, ANDROID®, MS-DOS®, MS-WINDOWS®, OS/2®, UNIX®, LINUX®, or another known operating system. In other cases, the I/O controller 815 may represent or interact with a modem, a keyboard, a mouse, a touchscreen, or a similar device. In some cases, the I/O controller 815 may be implemented as part of a processor. In some cases, a user may interact with the device 805 via the I/O controller 815 or via hardware components controlled by the I/O controller 815.

The transceiver 820 may communicate bi-directionally, via one or more antennas, wired, or wireless links as described above. For example, the transceiver 820 may represent a wireless transceiver and may communicate bi-directionally with another wireless transceiver. The transceiver 820 may also include a modem to modulate the packets and provide the modulated packets to the antennas for transmission, and to demodulate packets received from the antennas.

In some cases, the wireless device may include a single antenna 825. However, in some cases the device may have more than one antenna 825, which may be capable of concurrently transmitting or receiving multiple wireless transmissions.

The memory 830 may include random-access memory (RAM) and read-only memory (ROM). The memory 830 may store computer-readable, computer-executable code 835 including instructions that, when executed, cause the processor to perform various functions described herein. In some cases, the memory 830 may contain, among other things, a basic I/O system (BIOS) which may control basic hardware or software operation such as the interaction with peripheral components or devices.

The processor 840 may include an intelligent hardware device, (e.g., a general-purpose processor, a DSP, a central processing unit (CPU), a microcontroller, an ASIC, an FPGA, a programmable logic device, a discrete gate or transistor logic component, a discrete hardware component, or any combination thereof). In some cases, the processor 840 may be configured to operate a memory array using a memory controller. In other cases, a memory controller may be integrated into the processor 840. The processor 840 may be configured to execute computer-readable instructions stored in a memory (e.g., the memory 830) to cause the device 805 to perform various functions (e.g., functions or tasks supporting techniques for releasing multiple sets of SPS and CG resources).

The code 835 may include instructions to implement aspects of the present disclosure, including instructions to support wireless communications. The code 835 may be stored in a non-transitory computer-readable medium such as system memory or other type of memory. In some cases, the code 835 may not be directly executable by the processor 840 but may cause a computer (e.g., when compiled and executed) to perform functions described herein.

Figure 9:
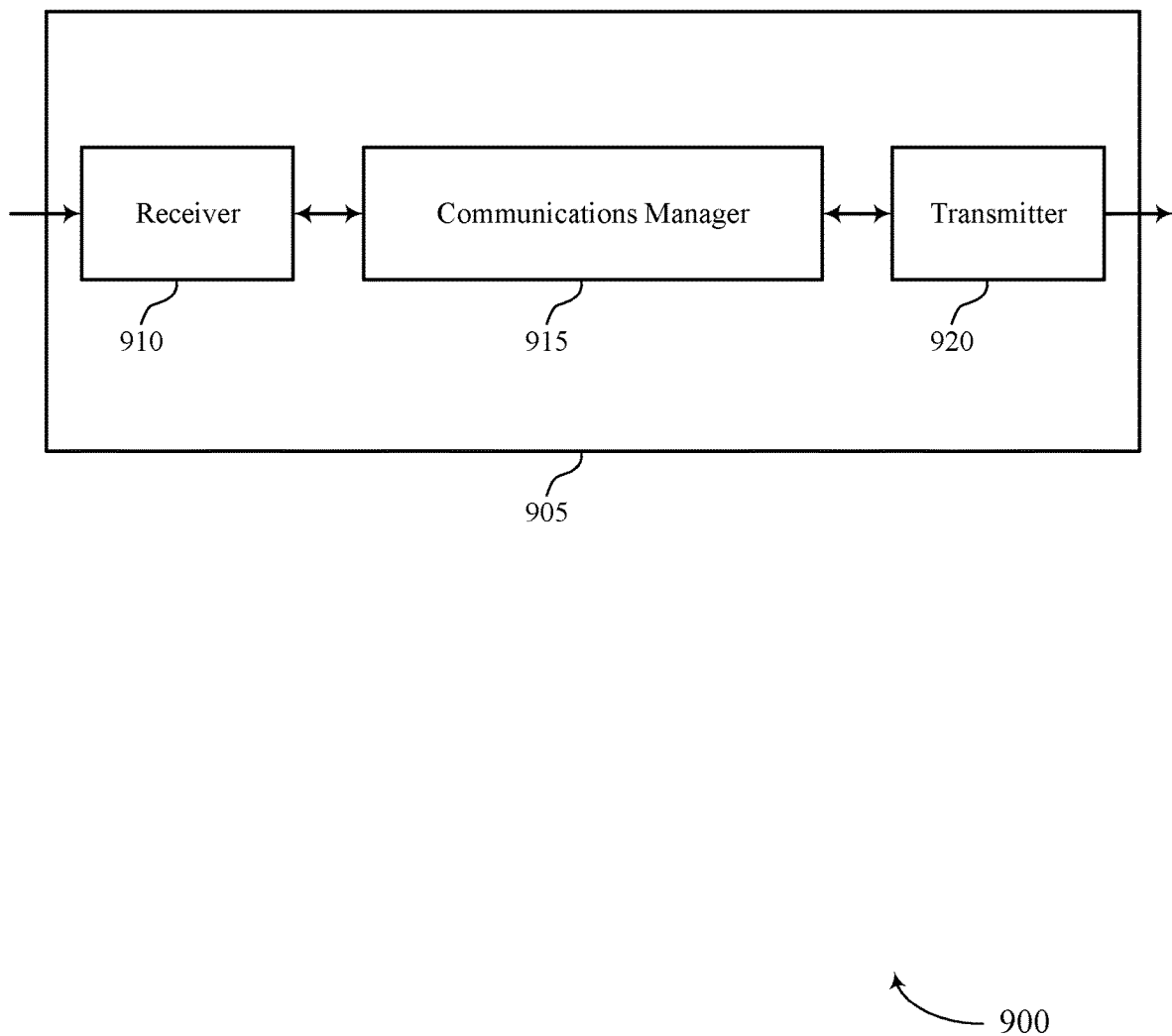
FIGS. 9 and 10 show block diagrams of devices that support techniques for releasing multiple sets of semi-persistent scheduling and configured grant resources in accordance with aspects of the present disclosure.

FIG. 9 shows a block diagram 900 of a device 905 that supports techniques for releasing multiple sets of SPS and CG resources in accordance with aspects of the present disclosure. The device 905 may be an example of aspects of a base station 105 as described herein. The device 905 may include a receiver 910, a communications manager 915, and a transmitter 920. The device 905 may also include one or more processors, memory coupled with the one or more processors, and instructions stored in the memory that are executable by the one or more processors to enable the one or more processors to perform activation and release of resources across multiple component carriers discussed herein. Each of these components may be in communication with one another (e.g., via one or more buses).

The receiver 910 may receive information such as packets, user data, or control information associated with various information channels (e.g., control channels, data channels, and information related to techniques for releasing multiple sets of SPS and CG resources, etc.). Information may be passed on to other components of the device 905. The receiver 910 may be an example of aspects of the transceiver 1220 described with reference to FIG. 12. The receiver 910 may utilize a single antenna or a set of antennas.

The communications manager 915 may identify a communications configuration for a set of component carriers, the communications configuration including at least a first set of resources on a first component carrier of the set of component carriers and a second set of resources on a second component carrier of the set of component carriers, determine to release a plurality of sets of resources on multiple component carriers, including at least the first set of resources and the second set of resources, and transmit, to a UE, a DCI message on the first component carrier, the DCI message including one or more field values indicating that the UE is to release the first set of resources on the first component carrier and the second set of resources on the second component carrier. The communications manager 915 may be an example of aspects of the communications manager 1210 described herein.

The actions performed by the communications manager 915 as described herein may be implemented to realize one or more potential advantages. For example, releasing multiple sets of resources across multiple component carriers may reduce control signaling within a wireless communications system, thereby alleviating network overhead. Moreover, by reducing the quantity of DCI messages used to release resources, power consumption of the base station 105 may be reduced.

Based on releasing multiple sets of resources across multiple component carriers via a single DCI message, a processor of the base station 105 (e.g., a processor controlling the receiver 910, the communications manager 915, the transmitter 920, etc.) may reduce processing resources used for wireless communications. For example, by releasing multiple sets of resources via a single DCI message, the base station 105 may reduce a number of times the processor ramps up processing power and turns on processing units to handle downlink transmission of DCI messages.

The communications manager 915, or its sub-components, may be implemented in hardware, code (e.g., software or firmware) executed by a processor, or any combination thereof. If implemented in code executed by a processor, the functions of the communications manager 915, or its sub-components may be executed by a general-purpose processor, a DSP, an ASIC, an FPGA or other programmable logic device, discrete gate or transistor logic, discrete hardware components, or any combination thereof designed to perform the functions described in the present disclosure.

The communications manager 915, or its sub-components, may be physically located at various positions, including being distributed such that portions of functions are implemented at different physical locations by one or more physical components. In some examples, the communications manager 915, or its sub-components, may be a separate and distinct component in accordance with various aspects of the present disclosure. In some examples, the communications manager 915, or its sub-components, may be combined with one or more other hardware components, including but not limited to an input/output (I/O) component, a transceiver, a network server, another computing device, one or more other components described in the present disclosure, or a combination thereof in accordance with various aspects of the present disclosure.

The transmitter 920 may transmit signals generated by other components of the device 905. In some examples, the transmitter 920 may be collocated with a receiver 910 in a transceiver module. For example, the transmitter 920 may be an example of aspects of the transceiver 1220 described with reference to FIG. 12. The transmitter 920 may utilize a single antenna or a set of antennas.

Figure 10:
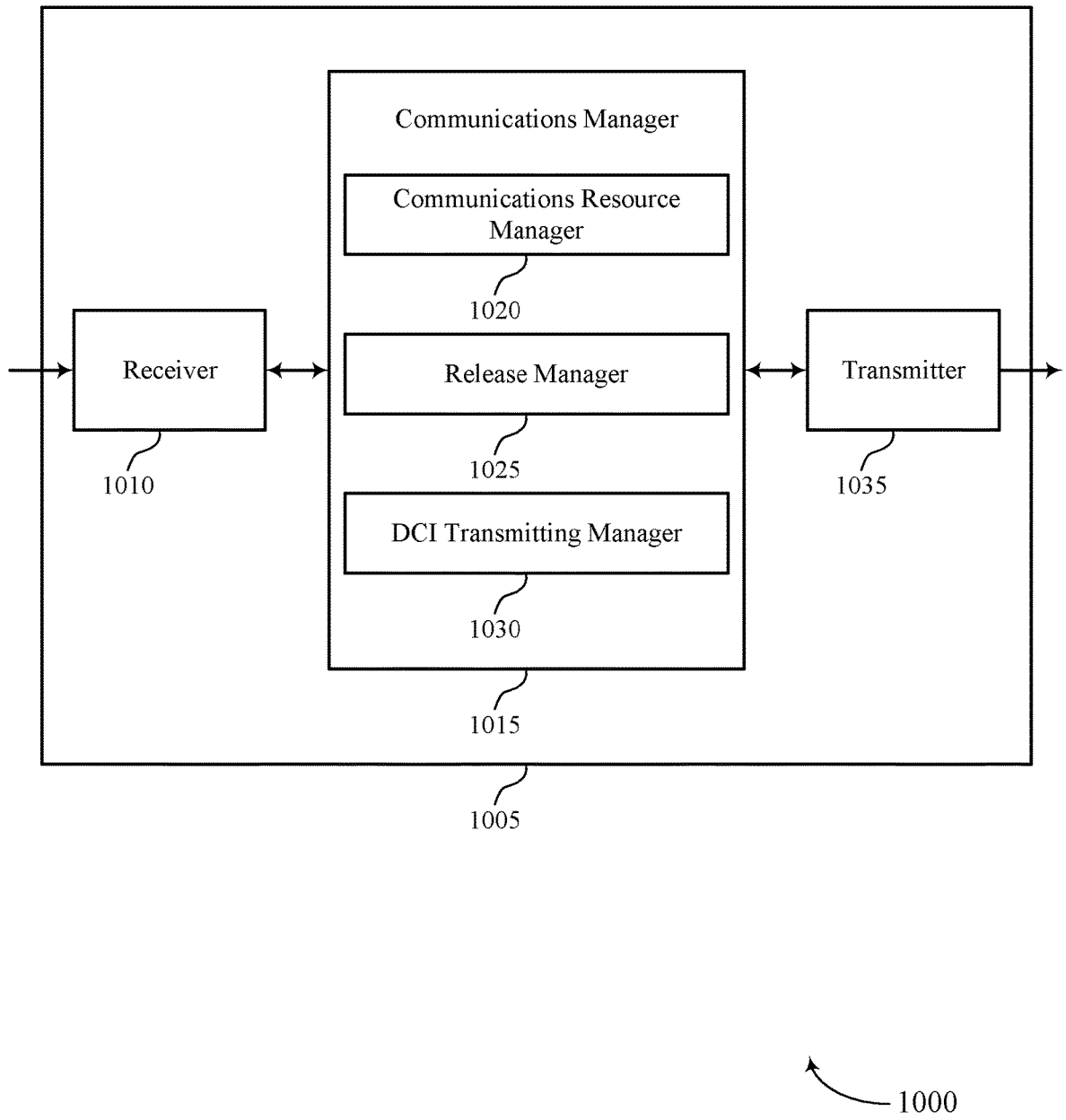

FIG. 10 shows a block diagram 1000 of a device 1005 that supports techniques for releasing multiple sets of SPS and CG resources in accordance with aspects of the present disclosure. The device 1005 may be an example of aspects of a device 905, or a base station 105 as described herein. The device 1005 may include a receiver 1010, a communications manager 1015, and a transmitter 1035. The device 1005 may also include a processor. Each of these components may be in communication with one another (e.g., via one or more buses).

The receiver 1010 may receive information such as packets, user data, or control information associated with various information channels (e.g., control channels, data channels, and information related to techniques for releasing multiple sets of SPS and CG resources, etc.). Information may be passed on to other components of the device 1005. The receiver 1010 may be an example of aspects of the transceiver 1220 described with reference to FIG. 12. The receiver 1010 may utilize a single antenna or a set of antennas.

The communications manager 1015 may be an example of aspects of the communications manager 915 as described herein. The communications manager 1015 may include a communications resource manager 1020, a release manager 1025, and a DCI transmitting manager 1030. The communications manager 1015 may be an example of aspects of the communications manager 1210 described herein.

The communications resource manager 1020 may identify a communications configuration for a set of component carriers, the communications configuration including at least a first set of resources on a first component carrier of the set of component carriers and a second set of resources on a second component carrier of the set of component carriers.

The release manager 1025 may determine to release a plurality of sets of resources on multiple component carriers, including at least the first set of resources and the second set of resources.

The DCI transmitting manager 1030 may transmit, to a UE, a DCI message on the first component carrier, the DCI message including one or more field values indicating that the UE is to release the first set of resources on the first component carrier and the second set of resources on the second component carrier.

The transmitter 1035 may transmit signals generated by other components of the device 1005. In some examples, the transmitter 1035 may be collocated with a receiver 1010 in a transceiver module. For example, the transmitter 1035 may be an example of aspects of the transceiver 1220 described with reference to FIG. 12. The transmitter 1035 may utilize a single antenna or a set of antennas.

In some cases, the communications resource manager 1020, the release manager 1025, and the DCI transmitting manager 1030 and may each be or be at least a part of a processor (e.g., a transceiver processor, or a radio processor, or a transmitter processor, or a receiver processor). The processor may be coupled with memory and execute instructions stored in the memory that enable the processor to perform or facilitate the features of communications resource manager 1020, the release manager 1025, and the DCI transmitting manager 1030 discussed herein. A transceiver processor may be collocated with and/or communicate with (e.g., direct the operations of) a transceiver of the device. A radio processor may be collocated with and/or communicate with (e.g., direct the operations of) a radio (e.g., an NR radio, an LTE radio, a Wi-Fi radio) of the device. A transmitter processor may be collocated with and/or communicate with (e.g., direct the operations of) a transmitter of the device. A receiver processor may be collocated with and/or communicate with (e.g., direct the operations of) a receiver of the device.

Figure 11:
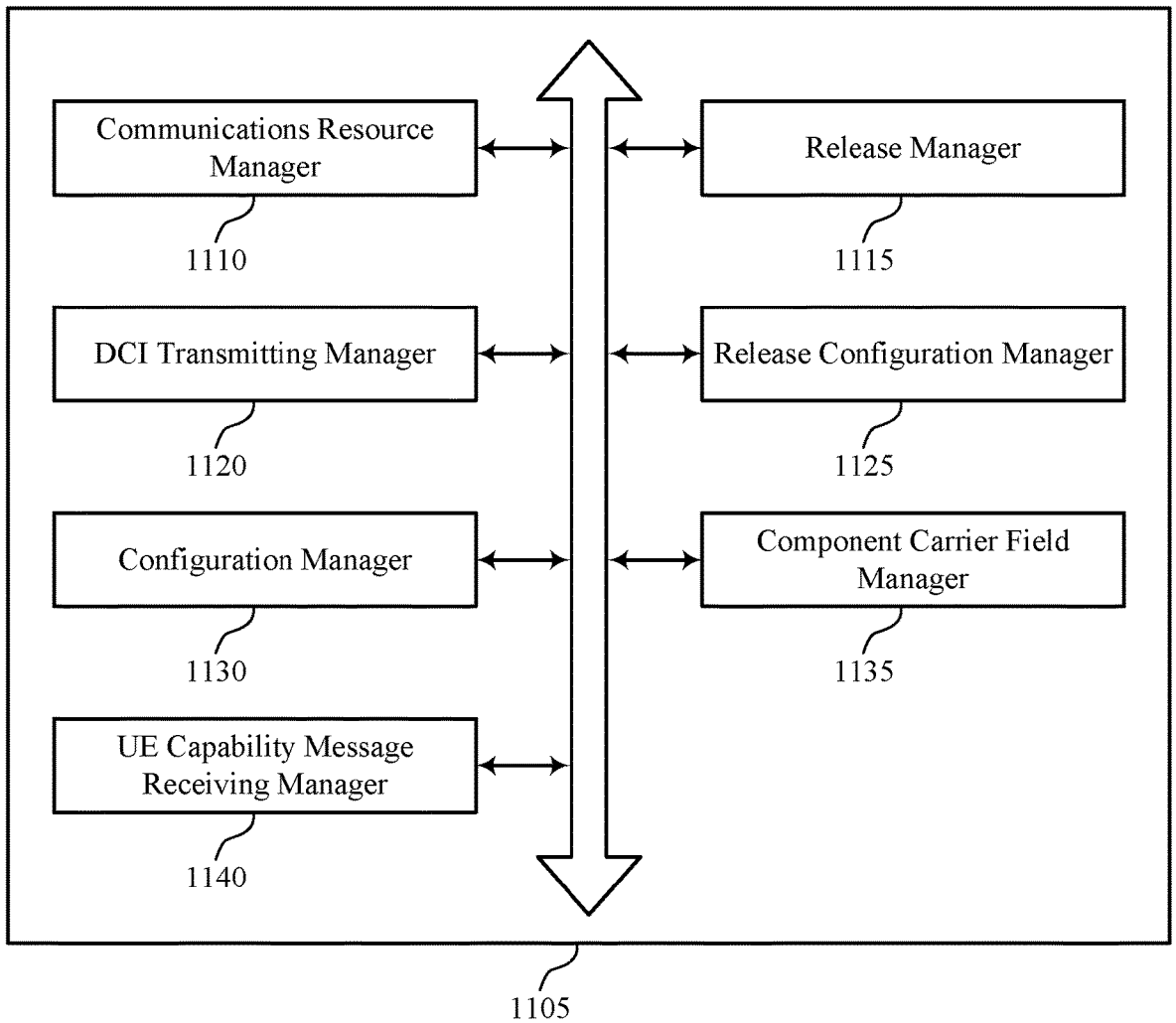
FIG. 11 shows a block diagram of a communications manager that supports techniques for releasing multiple sets of semi-persistent scheduling and configured grant resources in accordance with aspects of the present disclosure.

FIG. 11 shows a block diagram 1100 of a communications manager 1105 that supports techniques for releasing multiple sets of SPS and CG resources in accordance with aspects of the present disclosure. The communications manager 1105 may be an example of aspects of a communications manager 915, a communications manager 1015, or a communications manager 1210 described herein. The communications manager 1105 may include a communications resource manager 1110, a release manager 1115, a DCI transmitting manager 1120, a release configuration manager 1125, a configuration manager 1130, a component carrier field manager 1135, and a UE capability message receiving manager 1140. Each of these modules may communicate, directly or indirectly, with one another (e.g., via one or more buses).

The communications resource manager 1110 may identify a communications configuration for a set of component carriers, the communications configuration including at least a first set of resources on a first component carrier of the set of component carriers and a second set of resources on a second component carrier of the set of component carriers. In some cases, the first set of resources and the second set of resources include a set of downlink resources associated with a SPS grant, a set of uplink resources associated with a CG, or a combination thereof.

The release manager 1115 may determine to release a plurality of sets of resources on multiple component carriers, including at least the first set of resources and the second set of resources.

The DCI transmitting manager 1120 may transmit, to a UE, a DCI message on the first component carrier, the DCI message including one or more field values indicating that the UE is to release the first set of resources on the first component carrier and the second set of resources on the second component carrier. In some examples, the DCI transmitting manager 1120 may determine a time period within which the first set of resources, the second set of resources, or both, may not be released based on a subcarrier spacing associated with the first set of resources, a subcarrier spacing associated with the second set of resources, a subcarrier spacing of the first component carrier, a subcarrier spacing of the second component carrier, or any combination thereof, where the DCI message is transmitted within the time period. In some cases, a format of the DCI message is associated with cross-carrier scheduling. In some cases, the time period includes a quantity of symbols preceding the first set of resources, the second set of resources, or both.

The release configuration manager 1125 may transmit, to the UE, a release configuration indicating sets of mapping pairs, each mapping pair identifying a component carrier of the set of component carriers and a resource for communications between the UE and the base station, where the DCI message is transmitted based on the release configuration.

The configuration manager 1130 may identify a first configuration including associations between a set of field values for DCI messages and a set of mapping pairs, each mapping pair of the set of mapping pairs identifying a component carrier of the set of component carriers and a resource for communications between the UE and the base station, where the DCI message is transmitted based on the first configuration and the one or more field values. In some examples, the configuration manager 1130 may identify a first configuration for the first component carrier and a second configuration for the second component carrier. In some examples, the configuration manager 1130 may select the first configuration based on the DCI message to be transmitted on the first component carrier, where the DCI message is transmitted based on the selected first configuration. In some examples, the configuration manager 1130 may select the first configuration based on the component carrier field value, where the DCI message is transmitted based on the selected first configuration and the one or more field values. In some cases, the one or more field values include a hybrid automatic repeat request process number field value. In some cases, the component carrier field value includes a carrier indicator field value.

The component carrier field manager 1135 may transmit a component carrier field value in the DCI message, the one or more field values including the component carrier field value. In some examples, the component carrier field manager 1135 may transmit a component carrier field value in the DCI message, where the DCI message is transmitted based on the component carrier field value and a second field value, the one or more field values including the component carrier field value and the second field value. In some cases, the component carrier field value identifies the first component carrier and the second component carrier, and the second field value identifies the first set of resources and the second set of resources. In some cases, a combination of the component carrier field value and the second field value identifies the first set of resources on the first component carrier and the second set of resources on the second component carrier.

The UE capability message receiving manager 1140 may receive a UE capability message indicating that the UE is configured to release two or more sets of resources via a single downlink control message, where transmitting the DCI message is based on the received UE capability message.

In some cases, the communications resource manager 1110, the release manager 1115, the DCI transmitting manager 1120, the release configuration manager 1125, the configuration manager 1130, the component carrier field manager 1135, and the UE capability message receiving manager 1140 may each be or be at least a part of a processor (e.g., a transceiver processor, or a radio processor, or a transmitter processor, or a receiver processor). The processor may be coupled with memory and execute instructions stored in the memory that enable the processor to perform or facilitate the features of communications resource manager 1110, the release manager 1115, the DCI transmitting manager 1120, the release configuration manager 1125, the configuration manager 1130, the component carrier field manager 1135, and the UE capability message receiving manager 1140 discussed herein.

Figure 12:
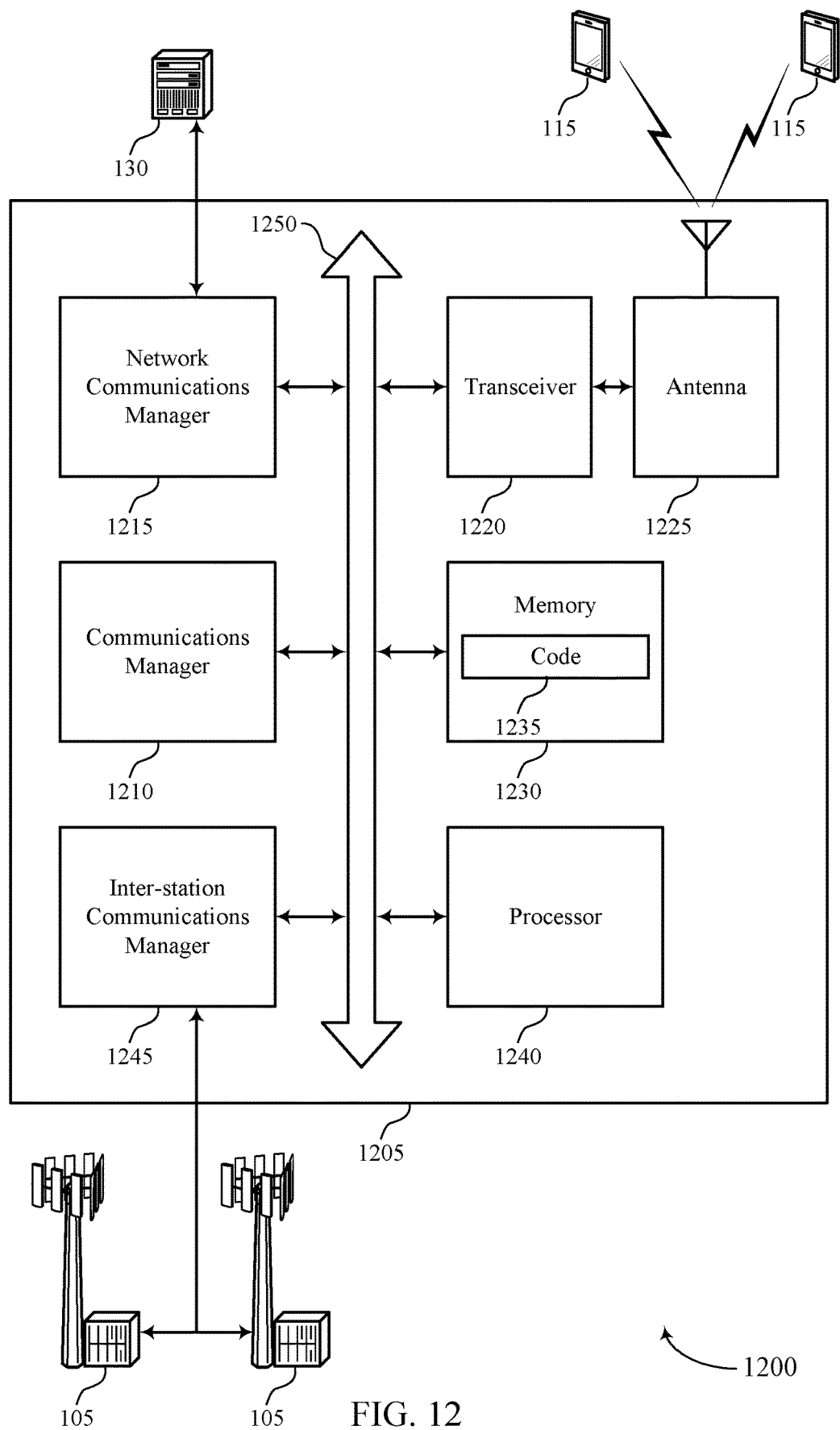
FIG. 12 shows a diagram of a system including a device that supports techniques for releasing multiple sets of semi-persistent scheduling and configured grant resources in accordance with aspects of the present disclosure.

FIG. 12 shows a diagram of a system 1200 including a device 1205 that supports techniques for releasing multiple sets of SPS and CG resources in accordance with aspects of the present disclosure. The device 1205 may be an example of or include the components of device 905, device 1005, or a base station 105 as described herein. The device 1205 may include components for bi-directional voice and data communications including components for transmitting and receiving communications, including a communications manager 1210, a network communications manager 1215, a transceiver 1220, an antenna 1225, memory 1230, a processor 1240, and an inter-station communications manager 1245. These components may be in electronic communication via one or more buses (e.g., bus 1250).

The communications manager 1210 may identify a communications configuration for a set of component carriers, the communications configuration including at least a first set of resources on a first component carrier of the set of component carriers and a second set of resources on a second component carrier of the set of component carriers, determine to release a plurality of sets of resources on multiple component carriers, including at least the first set of resources and the second set of resources, and transmit, to a UE, a DCI message on the first component carrier, the DCI message including one or more field values indicating that the UE is to release the first set of resources on the first component carrier and the second set of resources on the second component carrier.

The network communications manager 1215 may manage communications with the core network (e.g., via one or more wired backhaul links). For example, the network communications manager 1215 may manage the transfer of data communications for client devices, such as one or more UEs 115.

The transceiver 1220 may communicate bi-directionally, via one or more antennas, wired, or wireless links as described above. For example, the transceiver 1220 may represent a wireless transceiver and may communicate bi-directionally with another wireless transceiver. The transceiver 1220 may also include a modem to modulate the packets and provide the modulated packets to the antennas for transmission, and to demodulate packets received from the antennas.

In some cases, the wireless device may include a single antenna 1225. However, in some cases the device may have more than one antenna 1225, which may be capable of concurrently transmitting or receiving multiple wireless transmissions.

The memory 1230 may include RAM, ROM, or a combination thereof. The memory 1230 may store computer-readable code 1235 including instructions that, when executed by a processor (e.g., the processor 1240) cause the device to perform various functions described herein. In some cases, the memory 1230 may contain, among other things, a BIOS which may control basic hardware or software operation such as the interaction with peripheral components or devices.

The processor 1240 may include an intelligent hardware device, (e.g., a general-purpose processor, a DSP, a CPU, a microcontroller, an ASIC, an FPGA, a programmable logic device, a discrete gate or transistor logic component, a discrete hardware component, or any combination thereof). In some cases, the processor 1240 may be configured to operate a memory array using a memory controller. In some cases, a memory controller may be integrated into processor 1240. The processor 1240 may be configured to execute computer-readable instructions stored in a memory (e.g., the memory 1230) to cause the device 1205 to perform various functions (e.g., functions or tasks supporting techniques for releasing multiple sets of SPS and CG resources).

The inter-station communications manager 1245 may manage communications with other base station 105, and may include a controller or scheduler for controlling communications with UEs 115 in cooperation with other base stations 105. For example, the inter-station communications manager 1245 may coordinate scheduling for transmissions to UEs 115 for various interference mitigation techniques such as beamforming or joint transmission. In some examples, the inter-station communications manager 1245 may provide an X2 interface within an LTE/LTE-A wireless communication network technology to provide communication between base stations 105.

The code 1235 may include instructions to implement aspects of the present disclosure, including instructions to support wireless communications. The code 1235 may be stored in a non-transitory computer-readable medium such as system memory or other type of memory. In some cases, the code 1235 may not be directly executable by the processor 1240 but may cause a computer (e.g., when compiled and executed) to perform functions described herein.

Figure 13:
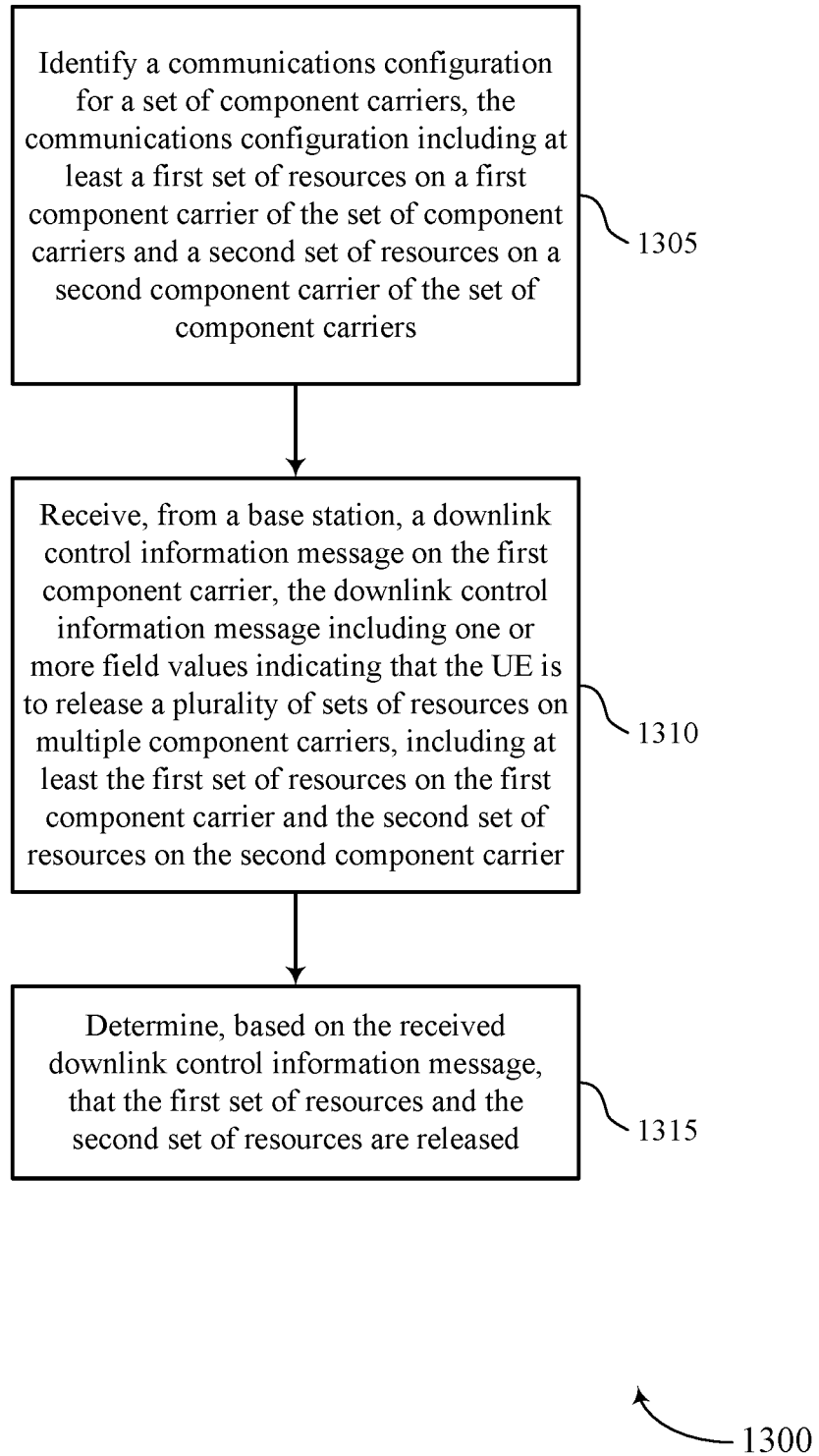
FIGS. 13 through 16 show flowcharts illustrating methods that support techniques for releasing multiple sets of semi-persistent scheduling and configured grant resources in accordance with aspects of the present disclosure.

FIG. 13 shows a flowchart illustrating a method 1300 that supports techniques for releasing multiple sets of SPS and CG resources in accordance with aspects of the present disclosure. The operations of method 1300 may be implemented by a UE 115 or its components as described herein. For example, the operations of method 1300 may be performed by a communications manager as described with reference to FIGS. 5 through 8. In some examples, a UE may execute a set of instructions to control the functional elements of the UE to perform the functions described below. Additionally or alternatively, a UE may perform aspects of the functions described below using special-purpose hardware.

At 1305, the UE may identify a communications configuration for a set of component carriers, the communications configuration including at least a first set of resources on a first component carrier of the set of component carriers and a second set of resources on a second component carrier of the set of component carriers. The operations of 1305 may be performed according to the methods described herein. In some examples, aspects of the operations of 1305 may be performed by a communications resource manager as described with reference to FIGS. 5 through 8.

At 1310, the UE may receive, from a base station, a DCI message on the first component carrier, the DCI message including one or more field values indicating that the UE is to release a plurality of sets of resources on multiple component carriers, including at least the first set of resources on the first component carrier and the second set of resources on the second component carrier. The operations of 1310 may be performed according to the methods described herein. In some examples, aspects of the operations of 1310 may be performed by a DCI receiving manager as described with reference to FIGS. 5 through 8.

At 1315, the UE may determine, based on the received DCI message, that the first set of resources and the second set of resources are released. The operations of 1315 may be performed according to the methods described herein. In some examples, aspects of the operations of 1315 may be performed by a release manager as described with reference to FIGS. 5 through 8.

Figure 14:
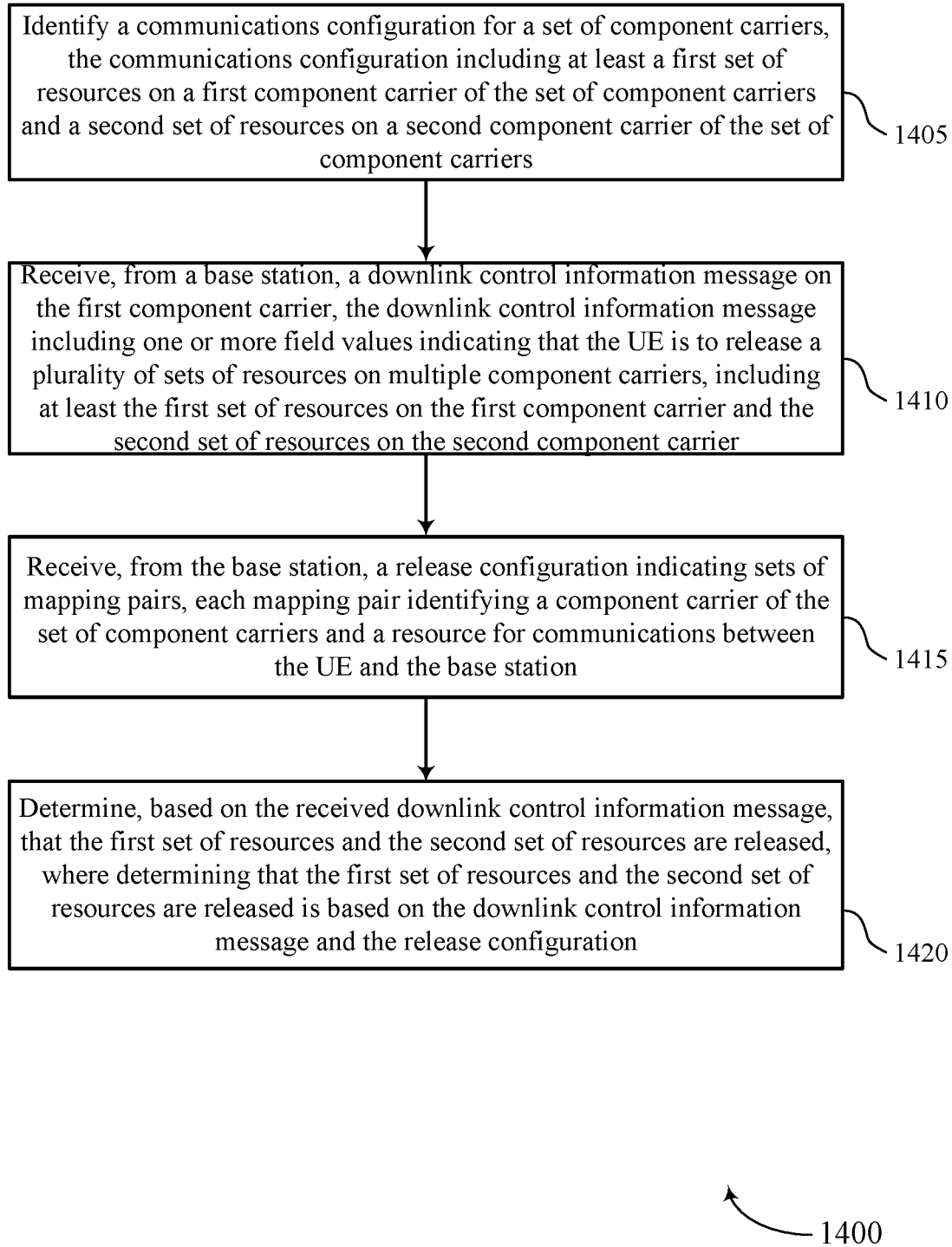

FIG. 14 shows a flowchart illustrating a method 1400 that supports techniques for releasing multiple sets of SPS and CG resources in accordance with aspects of the present disclosure. The operations of method 1400 may be implemented by a UE 115 or its components as described herein. For example, the operations of method 1400 may be performed by a communications manager as described with reference to FIGS. 5 through 8. In some examples, a UE may execute a set of instructions to control the functional elements of the UE to perform the functions described below. Additionally or alternatively, a UE may perform aspects of the functions described below using special-purpose hardware.

At 1405, the UE may identify a communications configuration for a set of component carriers, the communications configuration including at least a first set of resources on a first component carrier of the set of component carriers and a second set of resources on a second component carrier of the set of component carriers. The operations of 1405 may be performed according to the methods described herein. In some examples, aspects of the operations of 1405 may be performed by a communications resource manager as described with reference to FIGS. 5 through 8.

At 1410, the UE may receive, from a base station, a DCI message on the first component carrier, the DCI message including one or more field values indicating that the UE is to release a plurality of sets of resources on multiple component carriers, including at least the first set of resources on the first component carrier and the second set of resources on the second component carrier. The operations of 1410 may be performed according to the methods described herein. In some examples, aspects of the operations of 1410 may be performed by a DCI receiving manager as described with reference to FIGS. 5 through 8.

At 1415, the UE may receive, from the base station, a release configuration indicating sets of mapping pairs, each mapping pair identifying a component carrier of the set of component carriers and a resource for communications between the UE and the base station. The operations of 1415 may be performed according to the methods described herein. In some examples, aspects of the operations of 1415 may be performed by a release configuration manager as described with reference to FIGS. 5 through 8.

At 1420, the UE may determine, based on the received DCI message, that the first set of resources and the second set of resources are released, where determining that the first set of resources and the second set of resources are released is based on the DCI message and the release configuration. The operations of 1420 may be performed according to the methods described herein. In some examples, aspects of the operations of 1420 may be performed by a release manager as described with reference to FIGS. 5 through 8.

Figure 15:
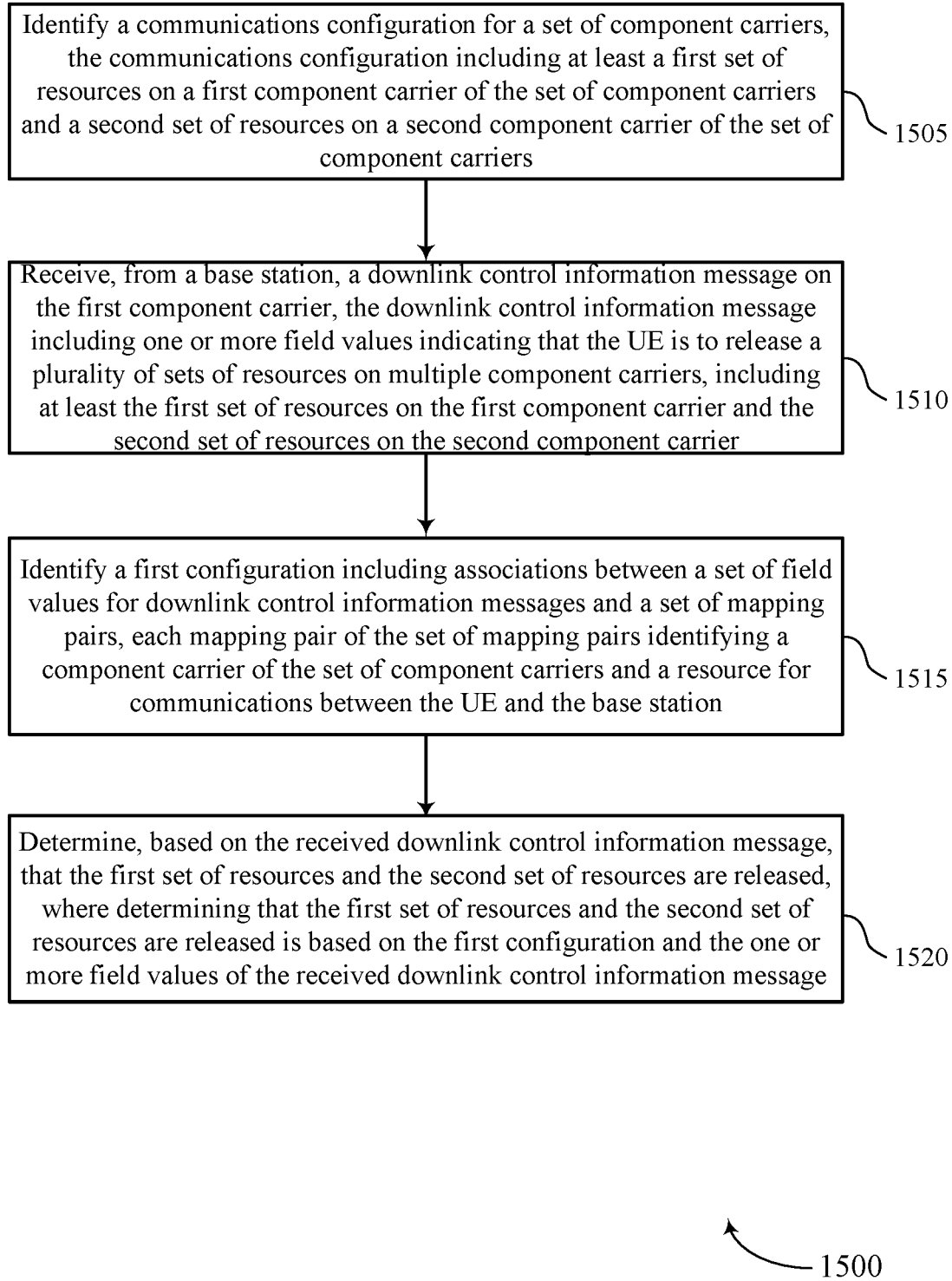

FIG. 15 shows a flowchart illustrating a method 1500 that supports techniques for releasing multiple sets of SPS and CG resources in accordance with aspects of the present disclosure. The operations of method 1500 may be implemented by a UE 115 or its components as described herein. For example, the operations of method 1500 may be performed by a communications manager as described with reference to FIGS. 5 through 8. In some examples, a UE may execute a set of instructions to control the functional elements of the UE to perform the functions described below. Additionally or alternatively, a UE may perform aspects of the functions described below using special-purpose hardware.

At 1505, the UE may identify a communications configuration for a set of component carriers, the communications configuration including at least a first set of resources on a first component carrier of the set of component carriers and a second set of resources on a second component carrier of the set of component carriers. The operations of 1505 may be performed according to the methods described herein. In some examples, aspects of the operations of 1505 may be performed by a communications resource manager as described with reference to FIGS. 5 through 8.

At 1510, the UE may receive, from a base station, a DCI message on the first component carrier, the DCI message including one or more field values indicating that the UE is to release a plurality of sets of resources on multiple component carriers, including at least the first set of resources on the first component carrier and the second set of resources on the second component carrier. The operations of 1510 may be performed according to the methods described herein. In some examples, aspects of the operations of 1510 may be performed by a DCI receiving manager as described with reference to FIGS. 5 through 8.

At 1515, the UE may identify a first configuration including associations between a set of field values for DCI messages and a set of mapping pairs, each mapping pair of the set of mapping pairs identifying a component carrier of the set of component carriers and a resource for communications between the UE and the base station. The operations of 1515 may be performed according to the methods described herein. In some examples, aspects of the operations of 1515 may be performed by a configuration manager as described with reference to FIGS. 5 through 8.

At 1520, the UE may determine, based on the received DCI message, that the first set of resources and the second set of resources are released, where determining that the first set of resources and the second set of resources are released is based on the first configuration and the one or more field values of the received DCI message. The operations of 1520 may be performed according to the methods described herein. In some examples, aspects of the operations of 1520 may be performed by a release manager as described with reference to FIGS. 5 through 8.

Figure 16:
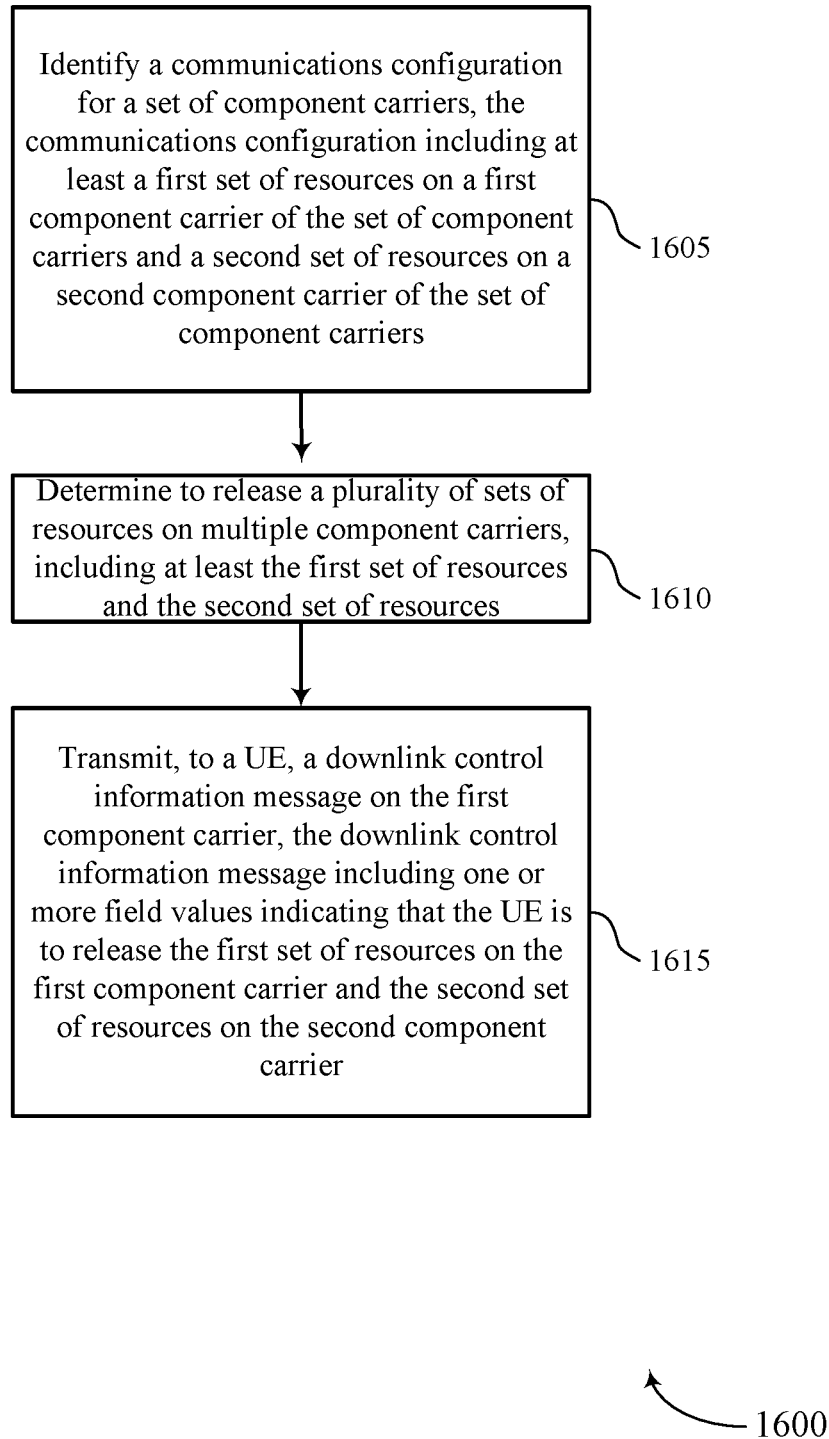

FIG. 16 shows a flowchart illustrating a method 1600 that supports techniques for releasing multiple sets of SPS and CG resources in accordance with aspects of the present disclosure. The operations of method 1600 may be implemented by a base station 105 or its components as described herein. For example, the operations of method 1600 may be performed by a communications manager as described with reference to FIGS. 9 through 12. In some examples, a base station may execute a set of instructions to control the functional elements of the base station to perform the functions described below. Additionally or alternatively, a base station may perform aspects of the functions described below using special-purpose hardware.

At 1605, the base station may identify a communications configuration for a set of component carriers, the communications configuration including at least a first set of resources on a first component carrier of the set of component carriers and a second set of resources on a second component carrier of the set of component carriers. The operations of 1605 may be performed according to the methods described herein. In some examples, aspects of the operations of 1605 may be performed by a communications resource manager as described with reference to FIGS. 9 through 12.

At 1610, the base station may determine to release a plurality of sets of resources on multiple component carriers, including at least the first set of resources and the second set of resources. The operations of 1610 may be performed according to the methods described herein. In some examples, aspects of the operations of 1610 may be performed by a release manager as described with reference to FIGS. 9 through 12.

At 1615, the base station may transmit, to a UE, a DCI message on the first component carrier, the DCI message including one or more field values indicating that the UE is to release the first set of resources on the first component carrier and the second set of resources on the second component carrier. The operations of 1615 may be performed according to the methods described herein. In some examples, aspects of the operations of 1615 may be performed by a DCI transmitting manager as described with reference to FIGS. 9 through 12.

It should be noted that the methods described herein describe possible implementations, and that the operations and the steps may be rearranged or otherwise modified and that other implementations are possible. Further, aspects from two or more of the methods may be combined.

The following provides an overview of aspects of the present disclosure:

Aspect 1: A method for wireless communication at a UE, comprising: identifying a communications configuration for a plurality of component carriers, the communications configuration including at least a first set of resources on a first component carrier of the plurality of component carriers and a second set of resources on a second component carrier of the plurality of component carriers; receiving, from a base station, a downlink control information message on the first component carrier, the downlink control information message comprising one or more field values indicating that the UE is to release a plurality of sets of resources on multiple component carriers, including at least multiple sets of resources on multiple component carriers, including at least the first set of resources on the first component carrier and the second set of resources on the second component carrier; and determining, based at least in part on the received downlink control information message, that the first set of resources and the second set of resources are released.

Aspect 2: The method of aspect 1, further comprising: receiving, from the base station, a release configuration indicating sets of mapping pairs, each mapping pair identifying a component carrier of the plurality of component carriers and a resource for communications between the UE and the base station, wherein determining that the first set of resources and the second set of resources are released is based at least in part on the downlink control information message and the release configuration.

Aspect 3: The method of any of aspects 1 through 2, further comprising: identifying a first configuration comprising associations between a plurality of field values for downlink control information messages and a plurality of mapping pairs, each mapping pair of the plurality of mapping pairs identifying a component carrier of the plurality of component carriers and a resource for communications between the UE and the base station, wherein determining that the first set of resources and the second set of resources are released is based at least in part on the first configuration and the one or more field values of the received downlink control information message.

Aspect 4: The method of aspect 3, wherein the one or more field values comprise a hybrid automatic repeat request process number field value.

Aspect 5: The method of any of aspects 1 through 4, further comprising: identifying a first configuration for the first component carrier and a second configuration for the second component carrier; and selecting the first configuration based at least in part on the downlink control information message having been received on the first component carrier, wherein determining that the first set of resources and the second set of resources are released is based at least in part on the selected first configuration and the indication of the received downlink control information message.

Aspect 6: The method of any of aspects 1 through 5, further comprising: receiving a component carrier field value in the downlink control information message, the one or more field values comprising the component carrier field value; identifying a first configuration for the first component carrier and a second configuration for the second component carrier; and selecting the first configuration based at least in part on the component carrier field value, wherein determining that the first set of resources and the second set of resources are released is based at least in part on the selected first configuration and the one or more field values.

Aspect 7: The method of aspect 6, wherein the component carrier field value comprises a carrier indicator field value.

Aspect 8: The method of any of aspects 1 through 7, further comprising: receiving a component carrier field value in the downlink control information message, wherein determining that the first set of resources and the second set of resources are released is based at least in part on the component carrier field value and a second field value, the one or more field values comprising the component carrier field value and the second field value.

Aspect 9: The method of aspect 8, wherein determining that the first set of resources and the second set of resources are released based at least in part on the component carrier field value and the second field value comprises: identifying the first component carrier and the second component carrier based at least in part on the component carrier field value; and identifying the first set of resources and the second set of resources based at least in part on the second field value.

Aspect 10: The method of any of aspects 8 through 9, wherein determining that the first set of resources and the second set of resources are released based at least in part on the component carrier field value and the second field value comprises: identifying the first set of resources on the first component carrier and the second set of resources on the second component carrier based at least in part on a combination of the component carrier field value and the second field value.

Aspect 11: The method of any of aspects 8 through 10, wherein a format of the downlink control information message is associated with cross-carrier scheduling.

Aspect 12: The method of any of aspects 1 through 11, further comprising: determining that the first set of resources and the second set of resources are released based at least in part on a bit value of a redundancy version field of the downlink control information message, a modulation and coding scheme field of the downlink control information message, a frequency domain resource assignment field of the downlink control information message, or any combination thereof.

Aspect 13: The method of aspect 12, further comprising: determining that a first frequency domain resource assignment field associated with the first component carrier, a second frequency domain resource assignment field associated with the second component carrier, or both, comprise a second type of frequency resource assignment field; and determining that the first set of resources and the second set of resources are released based at least in part on a value of the first frequency domain resource assignment field, a value of the second frequency domain resource assignment field, or both, comprising a first value.

Aspect 14: The method of aspect 13, further comprising: determining that both the first frequency domain resource assignment field and the second frequency domain resource assignment field comprise the second type of frequency resource assignment field; and determining that the first set of resources and the second set of resources are released based at least in part on the value of the first frequency domain resource assignment field and the value of the second frequency domain resource assignment field comprising the first value.

Aspect 15: The method of any of aspects 12 through 14, further comprising: determining that the downlink control information message is configured to release one or more sets of resources based at least in part on a new data indicator field of the downlink control information message, at least a portion of the downlink control information message being scrambled according to a coding scheme radio network temporary identifier, or both, wherein determining that the first set of resources and the second set of resources are released is based at least in part on determining that the downlink control information message is configured to release one or more sets of resources.

Aspect 16: The method of any of aspects 1 through 15, further comprising: transmitting, to the base station, a UE capability message indicating that the UE is configured to release two or more sets of resources via a single downlink control message, wherein receiving the downlink control information message is based at least in part on transmitting the UE capability message.

Aspect 17: The method of any of aspects 1 through 16, wherein the first set of resources and the second set of resources comprise a set of downlink resources associated with a semi-persistent scheduling grant, a set of uplink resources associated with a configured grant, or a combination thereof.

Aspect 18: The method of any of aspects 1 through 17, further comprising: determining a time period within which the first set of resources, the second set of resources, or both, may be not released based at least in part on a subcarrier spacing associated with the first set of resources, a subcarrier spacing associated with the second set of resources, a subcarrier spacing of the first component carrier, a subcarrier spacing of the second component carrier, or any combination thereof, wherein determining that the first set of resources and the second set of resources are released is based at least in part on receiving the downlink control information message outside of the time period.

Aspect 19: The method of aspect 18, wherein the time period comprises a quantity of symbols preceding the first set of resources, the second set of resources, or both.

Aspect 20: A method for wireless communication at a base station, comprising: identifying a communications configuration for a plurality of component carriers, the communications configuration including at least a first set of resources on a first component carrier of the plurality of component carriers and a second set of resources on a second component carrier of the plurality of component carriers; determining to release a plurality of sets of resources on multiple component carriers, including at least the first set of resources and the second set of resources; and transmitting, to a UE, a downlink control information message on the first component carrier, the downlink control information message comprising one or more field values indicating that the UE is to release the first set of resources on the first component carrier and the second set of resources on the second component carrier.

Aspect 21: The method of aspect 20, further comprising: transmitting, to the UE, a release configuration indicating sets of mapping pairs, each mapping pair identifying a component carrier of the plurality of component carriers and a resource for communications between the UE and the base station, wherein the downlink control information message is transmitted based at least in part on the release configuration.

Aspect 22: The method of any of aspects 20 through 21, further comprising: identifying a first configuration comprising associations between a plurality of field values for downlink control information messages and a plurality of mapping pairs, each mapping pair of the plurality of mapping pairs identifying a component carrier of the plurality of component carriers and a resource for communications between the UE and the base station, wherein the downlink control information message is transmitted based at least in part on the first configuration and the one or more field values.

Aspect 23: The method of aspect 22, wherein the one or more field values comprise a hybrid automatic repeat request process number field value.

Aspect 24: The method of any of aspects 20 through 23, further comprising: identifying a first configuration for the first component carrier and a second configuration for the second component carrier; and selecting the first configuration based at least in part on the downlink control information message to be transmitted on the first component carrier, wherein the downlink control information message is transmitted based at least in part on the selected first configuration.

Aspect 25: The method of any of aspects 20 through 24, further comprising: transmitting a component carrier field value in the downlink control information message, the one or more field values comprising the component carrier field value; identifying a first configuration for the first component carrier and a second configuration for the second component carrier; and selecting the first configuration based at least in part on the component carrier field value, wherein the downlink control information message is transmitted based at least in part on the selected first configuration and the one or more field values.

Aspect 26: The method of aspect 25, wherein the component carrier field value comprises a carrier indicator field value.

Aspect 27: The method of any of aspects 20 through 26, further comprising: transmitting a component carrier field value in the downlink control information message, wherein the downlink control information message is transmitted based at least in part on the component carrier field value and a second field value, the one or more field values comprising the component carrier field value and the second field value.

Aspect 28: The method of aspect 27, wherein the component carrier field value identifies the first component carrier and the second component carrier, and the second field value identifies the first set of resources and the second set of resources.

Aspect 29: The method of any of aspects 27 through 28, wherein a combination of the component carrier field value and the second field value identifies the first set of resources on the first component carrier and the second set of resources on the second component carrier.

Aspect 30: The method of any of aspects 27 through 29, wherein a format of the downlink control information message is associated with cross-carrier scheduling.

Aspect 31: The method of any of aspects 20 through 30, further comprising: receiving a UE capability message indicating that the UE is configured to release two or more sets of resources via a single downlink control message, wherein transmitting the downlink control information message is based at least in part on the received UE capability message.

Aspect 32: The method of any of aspects 20 through 31, wherein the first set of resources and the second set of resources comprise a set of downlink resources associated with a semi-persistent scheduling grant, a set of uplink resources associated with a configured grant, or a combination thereof.

Aspect 33: The method of any of aspects 20 through 32, further comprising: determining a time period within which the first set of resources, the second set of resources, or both, may not be released based at least in part on a subcarrier spacing associated with the first set of resources, a subcarrier spacing associated with the second set of resources, a subcarrier spacing of the first component carrier, a subcarrier spacing of the second component carrier, or any combination thereof, wherein the downlink control information message is transmitted within the time period.

Aspect 34: The method of aspect 33, wherein the time period comprises a quantity of symbols preceding the first set of resources, the second set of resources, or both.

Aspect 35: An apparatus for wireless communication at a UE, comprising a processor; memory coupled with the processor; and instructions stored in the memory and executable by the processor to cause the apparatus to perform a method of any of aspects 1 through 19.

Aspect 36: An apparatus for wireless communication at a UE, comprising at least one means for performing a method of any of aspects 1 through 19.

Aspect 37: A non-transitory computer-readable medium storing code for wireless communication at a UE, the code comprising instructions executable by a processor to perform a method of any of aspects 1 through 19.

Aspect 38: An apparatus for wireless communication at a base station, comprising a processor; memory coupled with the processor; and instructions stored in the memory and executable by the processor to cause the apparatus to perform a method of any of aspects 20 through 34.

Aspect 39: An apparatus for wireless communication at a base station, comprising at least one means for performing a method of any of aspects 20 through 34.

Aspect 40: A non-transitory computer-readable medium storing code for wireless communication at a base station, the code comprising instructions executable by a processor to perform a method of any of aspects 20 through 34.

Although aspects of an LTE, LTE-A, LTE-A Pro, or NR system may be described for purposes of example, and LTE, LTE-A, LTE-A Pro, or NR terminology may be used in much of the description, the techniques described herein are applicable beyond LTE, LTE-A, LTE-A Pro, or NR networks. For example, the described techniques may be applicable to various other wireless communications systems such as Ultra Mobile Broadband (UMB), Institute of Electrical and Electronics Engineers (IEEE) 802.11 (Wi-Fi), IEEE 802.16 (WiMAX), IEEE 802.20, Flash-OFDM, as well as other systems and radio technologies not explicitly mentioned herein.

Information and signals described herein may be represented using any of a variety of different technologies and techniques. For example, data, instructions, commands, information, signals, bits, symbols, and chips that may be referenced throughout the description may be represented by voltages, currents, electromagnetic waves, magnetic fields or particles, optical fields or particles, or any combination thereof.

The various illustrative blocks and components described in connection with the disclosure herein may be implemented or performed with a general-purpose processor, a DSP, an ASIC, a CPU, an FPGA or other programmable logic device, discrete gate or transistor logic, discrete hardware components, or any combination thereof designed to perform the functions described herein. A general-purpose processor may be a microprocessor, but in the alternative, the processor may be any processor, controller, microcontroller, or state machine. A processor may also be implemented as a combination of computing devices (e.g., a combination of a DSP and a microprocessor, multiple microprocessors, one or more microprocessors in conjunction with a DSP core, or any other such configuration).

The functions described herein may be implemented in hardware, software executed by a processor, firmware, or any combination thereof. If implemented in software executed by a processor, the functions may be stored on or transmitted over as one or more instructions or code on a computer-readable medium. Other examples and implementations are within the scope of the disclosure and appended claims. For example, due to the nature of software, functions described herein may be implemented using software executed by a processor, hardware, firmware, hardwiring, or combinations of any of these. Features implementing functions may also be physically located at various positions, including being distributed such that portions of functions are implemented at different physical locations.

Computer-readable media includes both non-transitory computer storage media and communication media including any medium that facilitates transfer of a computer program from one place to another. A non-transitory storage medium may be any available medium that may be accessed by a general-purpose or special purpose computer. By way of example, and not limitation, non-transitory computer-readable media may include RAM, read-only memory ROM, electrically erasable programmable ROM (EEPROM), flash memory, compact disk (CD) ROM or other optical disk storage, magnetic disk storage or other magnetic storage devices, or any other non-transitory medium that may be used to carry or store desired program code means in the form of instructions or data structures and that may be accessed by a general-purpose or special-purpose computer, or a general-purpose or special-purpose processor. Also, any connection is properly termed a computer-readable medium. For example, if the software is transmitted from a website, server, or other remote source using a coaxial cable, fiber optic cable, twisted pair, digital subscriber line (DSL), or wireless technologies such as infrared, radio, and microwave, then the coaxial cable, fiber optic cable, twisted pair, DSL, or wireless technologies such as infrared, radio, and microwave are included in the definition of computer-readable medium. Disk and disc, as used herein, include CD, laser disc, optical disc, digital versatile disc (DVD), floppy disk and Blu-ray disc where disks usually reproduce data magnetically, while discs reproduce data optically with lasers. Combinations of the above are also included within the scope of computer-readable media.

As used herein, including in the claims, "or" as used in a list of items (e.g., a list of items prefaced by a phrase such as "at least one of" or "one or more of") indicates an inclusive list such that, for example, a list of at least one of A, B, or C means A or B or C or AB or AC or BC or ABC (i.e., A and B and C). Also, as used herein, the phrase "based on" shall not be construed as a reference to a closed set of conditions. For example, an example step that is described as "based on condition A" may be based on both a condition A and a condition B without departing from the scope of the present disclosure. In other words, as used herein, the phrase "based on" shall be construed in the same manner as the phrase "based at least in part on."

In the appended figures, similar components or features may have the same reference label. Further, various components of the same type may be distinguished by following the reference label by a dash and a second label that distinguishes among the similar components. If just the first reference label is used in the specification, the description is applicable to any one of the similar components having the same first reference label irrespective of the second reference label, or other subsequent reference label.

The description set forth herein, in connection with the appended drawings, describes example configurations and does not represent all the examples that may be implemented or that are within the scope of the claims. The term "example" used herein means "serving as an example, instance, or illustration," and not "preferred" or "advantageous over other examples." The detailed description includes specific details for the purpose of providing an understanding of the described techniques. These techniques, however, may be practiced without these specific details. In some instances, known structures and devices are shown in block diagram form in order to avoid obscuring the concepts of the described examples.

The description herein is provided to enable a person having ordinary skill in the art to make or use the disclosure. Various modifications to the disclosure will be apparent to a person having ordinary skill in the art, and the generic principles defined herein may be applied to other variations without departing from the scope of the disclosure. Thus, the disclosure is not limited to the examples and designs described herein, but is to be accorded the broadest scope consistent with the principles and novel features disclosed herein.

What is claimed is:

1. An apparatus for wireless communication at a user equipment (UE), comprising:
   one or more processors,
   memory coupled with the one or more processors; and
   instructions stored in the memory and executable by the one or more processors to cause the apparatus to:
      identify a communications configuration scheduling a plurality of sets of resources for a plurality of component carriers, the communications configuration including at least a first set of resources on a first component carrier of the plurality of component carriers and a second set of resources on a second component carrier of the plurality of component carriers;
      receive, from a base station, a downlink control information message on the first component carrier, the downlink control information message comprising one or more field values indicating that the UE is to release at least a portion of the scheduled plurality of sets of resources on multiple component carriers, including at least the first set of resources on the first component carrier and the second set of resources on the second component carrier;
      receive, from the base station, a release configuration comprising sets of mapping pairs indicating associations between one or more component carriers of the plurality of component carriers with respective indices of resources of the one or more component carriers, wherein a set of mapping pairs of the sets of mapping pairs indicates associations of the first set of resources on the first component carrier and the second set of resources on the second component carrier, and wherein the set of mapping pairs is associated with the one or more field values; and
      determine, based at least in part on the received downlink control information message and the release configuration, that at least the portion of the scheduled plurality of sets of resources including the first set of resources and the second set of resources are released.

2. The apparatus of claim 1, wherein the instructions are further executable by the one or more processors to cause the apparatus to:
identify a first configuration comprising associations between a plurality of field values for downlink control information messages and a plurality of mapping pairs, each mapping pair of the plurality of mapping pairs identifying a component carrier of the plurality of component carriers and a resource for communications between the UE and the base station, wherein determining that the first set of resources and the second set of resources are released is based at least in part on the first configuration and the one or more field values of the received downlink control information message.

3. The apparatus of claim 2, wherein the one or more field values comprise a hybrid automatic repeat request process number field value.

4. The apparatus of claim 1, wherein the instructions are further executable by the one or more processors to cause the apparatus to:
identify a first configuration for the first component carrier and a second configuration for the second component carrier; and
select the first configuration based at least in part on the downlink control information message having been received on the first component carrier, wherein determining that the first set of resources and the second set of resources are released is based at least in part on the selected first configuration and the received downlink control information message.

5. The apparatus of claim 1, wherein the instructions are further executable by the one or more processors to cause the apparatus to:
receive a component carrier field value in the downlink control information message, the one or more field values comprising the component carrier field value;
identify a first configuration for the first component carrier and a second configuration for the second component carrier; and
select the first configuration based at least in part on the component carrier field value, wherein determining that the first set of resources and the second set of resources are released is based at least in part on the selected first configuration and the one or more field values.

6. The apparatus of claim 5, wherein the component carrier field value comprises a carrier indicator field value.

7. The apparatus of claim 1, wherein the instructions are further executable by the one or more processors to cause the apparatus to:
receive a component carrier field value in the downlink control information message, wherein determining that the first set of resources and the second set of resources are released is based at least in part on the component carrier field value and a second field value, the one or more field values comprising the component carrier field value and the second field value.

8. The apparatus of claim 7, wherein the instructions to determine that the first set of resources and the second set of resources are released based at least in part on the component carrier field value and the second field value are executable by the one or more processors to cause the apparatus to:
identify the first component carrier and the second component carrier based at least in part on the component carrier field value; and
identify the first set of resources and the second set of resources based at least in part on the second field value.

9. The apparatus of claim 7, wherein the instructions to determine that the first set of resources and the second set of resources are released based at least in part on the component carrier field value and the second field value are executable by the one or more processors to cause the apparatus to:
identify the first set of resources on the first component carrier and the second set of resources on the second component carrier based at least in part on a combination of the component carrier field value and the second field value.

10. The apparatus of claim 7, wherein a format of the downlink control information message is associated with cross-carrier scheduling.

11. The apparatus of claim 1, wherein the instructions are further executable by the one or more processors to cause the apparatus to:
determine that the first set of resources and the second set of resources are released based at least in part on a bit value of a redundancy version field of the downlink control information message, a modulation and coding scheme field of the downlink control information message, a frequency domain resource assignment field of the downlink control information message, or any combination thereof.

12. The apparatus of claim 11, wherein the instructions are further executable by the one or more processors to cause the apparatus to:
determine that a first frequency domain resource assignment field associated with the first component carrier, a second frequency domain resource assignment field associated with the second component carrier, or both, comprise a second type of frequency resource assignment field; and
determine that the first set of resources and the second set of resources are released based at least in part on a value of the first frequency domain resource assignment field, a value of the second frequency domain resource assignment field, or both, comprising a first value.

13. The apparatus of claim 12, wherein the instructions are further executable by the one or more processors to cause the apparatus to:
determine that both the first frequency domain resource assignment field and the second frequency domain resource assignment field comprise the second type of frequency resource assignment field; and
determine that the first set of resources and the second set of resources are released based at least in part on the value of the first frequency domain resource assignment field and the value of the second frequency domain resource assignment field comprising the first value.

14. The apparatus of claim 11, wherein the instructions are further executable by the one or more processors to cause the apparatus to:
determine that the downlink control information message is configured to release one or more sets of resources based at least in part on a new data indicator field of the downlink control information message, at least a portion of the downlink control information message being scrambled according to a coding scheme radio network temporary identifier, or both, wherein determining that the first set of resources and the second set of resources are released is based at least in part on determining that the downlink control information message is configured to release the one or more sets of resources.

15. The apparatus of claim 1, wherein the instructions are further executable by the one or more processors to cause the apparatus to:
transmit, to the base station, a UE capability message indicating that the UE is configured to release two or more sets of resources via a single downlink control message, wherein receiving the downlink control information message is based at least in part on transmitting the UE capability message.

16. The apparatus of claim 1, wherein the first set of resources and the second set of resources comprise a set of downlink resources associated with a semi-persistent scheduling grant, a set of uplink resources associated with a configured grant, or a combination thereof.

17. The apparatus of claim 1, wherein the instructions are further executable by the one or more processors to cause the apparatus to:
determine a time period within which the first set of resources, the second set of resources, or both, may be not released based at least in part on a subcarrier spacing associated with the first set of resources, a subcarrier spacing associated with the second set of resources, a subcarrier spacing of the first component carrier, a subcarrier spacing of the second component carrier, or any combination thereof, wherein determining that the first set of resources and the second set of resources are released is based at least in part on receiving the downlink control information message outside of the time period.

18. An apparatus for wireless communication at a base station, comprising:
one or more processors,
memory coupled with the one or more processors; and
instructions stored in the memory and executable by the one or more processors to cause the apparatus to:
identify a communications configuration scheduling a plurality of sets of resources for a plurality of component carriers, the communications configuration including at least a first set of resources on a first component carrier of the plurality of component carriers and a second set of resources on a second component carrier of the plurality of component carriers;
determine to release at least a portion of the scheduled plurality of sets of resources on multiple component carriers, including at least the first set of resources and the second set of resources;
transmit, to a user equipment (UE), a downlink control information message on the first component carrier, the downlink control information message comprising one or more field values indicating that the UE is to release at least the portion of the scheduled plurality of sets of resources including the first set of resources and the second set of resources; and
transmit, to the UE, a release configuration comprising sets of mapping pairs indicating associations between one or more component carriers of the plurality of component carriers with respective indices of resources of the one or more component carriers, wherein a set of mapping pairs of the sets of mapping pairs indicates associations of the first set of resources on the first component carrier and the second set of resources on the second component carrier, and wherein the set of mapping pairs is associated with the one or more field values.

19. The apparatus of claim 18, wherein the instructions are further executable by the one or more processors to cause the apparatus to:
identify a first configuration comprising associations between a plurality of field values for downlink control information messages and a plurality of mapping pairs, each mapping pair of the plurality of mapping pairs identifying a component carrier of the plurality of component carriers and a resource for communications between the UE and the base station, wherein the downlink control information message is transmitted based at least in part on the first configuration and the one or more field values.

20. A method for wireless communication at a user equipment (UE), comprising:
identifying a communications configuration scheduling a plurality of sets of resources for a plurality of component carriers, the communications configuration including at least a first set of resources on a first component carrier of the plurality of component carriers and a second set of resources on a second component carrier of the plurality of component carriers;
receiving, from a base station, a downlink control information message on the first component carrier, the downlink control information message comprising one or more field values indicating that the UE is to release at least a portion of the scheduled plurality of sets of resources on multiple component carriers, including at least the first set of resources on the first component carrier and the second set of resources on the second component carrier;
receiving, from the base station, a release configuration comprising sets of mapping pairs indicating associations between one or more component carriers of the plurality of component carriers with respective indices of resources of the one or more component carriers, wherein a set of mapping pairs of the sets of mapping pairs indicates associations of the first set of resources on the first component carrier and the second set of resources on the second component carrier, and wherein the set of mapping pairs is associated with the one or more field values; and
determining, based at least in part on the received downlink control information message and the release configuration, that at least the portion of the scheduled plurality of sets of resources including the first set of resources and the second set of resources are released.

21. The method of claim 20, further comprising:
identifying a first configuration comprising associations between a plurality of field values for downlink control information messages and a plurality of mapping pairs, each mapping pair of the plurality of mapping pairs identifying a component carrier of the plurality of component carriers and a resource for communications between the UE and the base station, wherein determining that the first set of resources and the second set of resources are released is based at least in part on the first configuration and the one or more field values of the received downlink control information message.

22. The method of claim 20, further comprising:
receiving a component carrier field value in the downlink control information message, the one or more field values comprising the component carrier field value;

identifying a first configuration for the first component carrier and a second configuration for the second component carrier; and selecting the first configuration based at least in part on the component carrier field value, wherein determining that the first set of resources and the second set of resources are released is based at least in part on the selected first configuration and the one or more field values.

23. The method of claim 20, further comprising:

receiving a component carrier field value in the downlink control information message, wherein determining that the first set of resources and the second set of resources are released is based at least in part on the component carrier field value and a second field value, the one or more field values comprising the component carrier field value and the second field value.

24. The method of claim 20, further comprising:

determining that the first set of resources and the second set of resources are released based at least in part on a bit value of a redundancy version field of the downlink control information message, a modulation and coding scheme field of the downlink control information message, a frequency domain resource assignment field of the downlink control information message, or any combination thereof.

25. A method for wireless communication at a base station, comprising:

identifying a communications configuration scheduling a plurality of sets of resources for a plurality of component carriers, the communications configuration including at least a first set of resources on a first component carrier of the plurality of component carriers and a second set of resources on a second component carrier of the plurality of component carriers;

determining to release at least a portion of the scheduled plurality of sets of resources on multiple component carriers, including at least the first set of resources and the second set of resources;

transmitting, to a user equipment (UE), a downlink control information message on the first component carrier, the downlink control information message comprising one or more field values indicating that the UE is to release at least the portion of the scheduled plurality of sets of resources including the first set of resources and the second set of resources; and transmitting, to the UE, a release configuration comprising sets of mapping pairs indicating associations between one or more component carriers of the plurality of component carriers with respective indices of resources of the one or more component carriers, wherein a set of mapping pairs of the sets of mapping pairs indicates associations of the first set of resources on the first component carrier and the second set of resources on the second component carrier, and wherein the set of mapping pairs is associated with the one or more field values.

26. The method of claim 25, further comprising:

identifying a first configuration comprising associations between a plurality of field values for downlink control information messages and a plurality of mapping pairs, each mapping pair of the plurality of mapping pairs identifying a component carrier of the plurality of component carriers and a resource for communications between the UE and the base station, wherein the downlink control information message is transmitted based at least in part on the first configuration and the one or more field values.

* * * * *